US008856323B2

(12) United States Patent
Enns et al.

(10) Patent No.: US 8,856,323 B2

(45) Date of Patent: Oct. 7, 2014

(54) DEVICE AND METHOD FOR FACILITATING SECURE COMMUNICATIONS OVER A CELLULAR NETWORK

(75) Inventors: Frederick Enns, Menlo Park, CA (US); Michel Veillette, Waterloo (CA); Randy Frei, San Jose, CA (US)

(73) Assignee: Trilliant Holdings, Inc., Redwood City, CA (US)

( * ) Notice: Subject to any disclaimer, the term of this patent is extended or adjusted under 35 U.S.C. 154(b) by 203 days.

(21) Appl. No.: 13/369,520

(22) Filed: Feb. 9, 2012

(65) Prior Publication Data

US 2012/0209951 A1 Aug. 16, 2012

Related U.S. Application Data

(60) Provisional application No. 61/441,375, filed on Feb. 10, 2011.

(51) Int. Cl.

| | |
|---|---|
| ***G06F 15/16*** | (2006.01) |
| ***H04L 29/08*** | (2006.01) |
| ***H04L 29/06*** | (2006.01) |

(52) U.S. Cl.

CPC .......... *H04L 67/125* (2013.01); *H04L 67/2828* (2013.01); *H04L 63/0442* (2013.01); *H04L 29/08729* (2013.01)

USPC ............ 709/224; 709/202; 709/232; 709/244

(58) Field of Classification Search

CPC ................................ H04L 41/00; Y04S 10/00

USPC .......................................................... 709/224

See application file for complete search history.

(56) References Cited

U.S. PATENT DOCUMENTS

| | | | | |
|---|---|---|---|---|
| 4,132,981 | A | 1/1979 | White | 340/203 |
| 4,190,800 | A | 2/1980 | Kelly, Jr. et al. | 325/37 |
| 4,204,195 | A | 5/1980 | Bogacki | 340/151 |
| 4,254,472 | A | 3/1981 | Juengel et al. | 364/900 |

(Continued)

FOREIGN PATENT DOCUMENTS

| | | | |
|---|---|---|---|
| EP | 0 578 041 B1 | 11/1999 | H04L 12/56 |
| EP | 0 663 746 B1 | 1/2003 | H04L 12/46 |

(Continued)

OTHER PUBLICATIONS

Hydro One Networks, Inc., Request for Proposal for Smart Metering Services, 16 pp., Mar. 4, 2005.

(Continued)

*Primary Examiner* — Michel Y Won

(74) *Attorney, Agent, or Firm* — Moser Taboada

(57) ABSTRACT

A process for communicating utility-related data over at least one network is described. the process includes: collecting utility-related data at a hub device during a first predetermined period of time; securing the utility-related data at the hub device using digital envelopes during the first predetermined period of time; initiating by the hub device an autonomous wake up process during a second predetermined period of time; sending the secure utility-related data over a first network to a designated server via at least one User Datagram protocol ("UDP") message during the second predetermined period of time; and receiving an acknowledgement of receipt message of the at least one UDP message from the designated server; wherein the first and second predetermined periods of time typically do not overlap, but may overlap.

35 Claims, 73 Drawing Sheets

(56) References Cited

U.S. PATENT DOCUMENTS

| | | | | |
|---|---|---|---|---|
| 4,322,842 | A | 3/1982 | Martinez | 370/11 |
| 4,396,915 | A | 8/1983 | Farnsworth et al. | 340/870.03 |
| 4,425,628 | A | 1/1984 | Bedard et al. | 364/900 |
| 4,638,314 | A | 1/1987 | Keller | 340/870.02 |
| 4,644,320 | A | 2/1987 | Carr et al. | 340/12.37 |
| 4,749,992 | A | 6/1988 | Fitzmeyer et al. | 340/870.02 |
| 4,792,946 | A | 12/1988 | Mayo | 370/245 |
| 4,939,726 | A | 7/1990 | Flammer et al. | 370/400 |
| 5,007,052 | A | 4/1991 | Flammer | 370/389 |
| 5,056,107 | A | 10/1991 | Johnson et al. | 375/138 |
| 5,077,753 | A | 12/1991 | Grau, Jr. et al. | 375/141 |
| 5,079,768 | A | 1/1992 | Flammer | 370/349 |
| 5,115,433 | A | 5/1992 | Baran et al. | 370/400 |
| 5,117,422 | A | 5/1992 | Hauptschein et al. | 370/255 |
| 5,130,987 | A | 7/1992 | Flammer | 370/436 |
| 5,138,615 | A | 8/1992 | Lamport et al. | 370/94.3 |
| 5,159,592 | A | 10/1992 | Perkins | 370/338 |
| 5,216,623 | A | 6/1993 | Barrett et al. | 364/550 |
| 5,276,680 | A | 1/1994 | Messenger | 370/311 |
| 5,311,581 | A | 5/1994 | Merriam et al. | 379/106.07 |
| 5,400,338 | A | 3/1995 | Flammer, III et al. | 370/255 |
| 5,430,729 | A | 7/1995 | Rahnema | 370/409 |
| 5,432,507 | A | 7/1995 | Mussino et al. | 340/870.03 |
| 5,453,977 | A | 9/1995 | Flammer, III et al. | 370/254 |
| 5,459,727 | A | 10/1995 | Vannucci | 370/332 |
| 5,463,777 | A | 10/1995 | Bialkowski et al. | 1/1 |
| 5,465,398 | A | 11/1995 | Flammer | 455/69 |
| 5,467,345 | A | 11/1995 | Cutler, Jr. et al. | 370/229 |
| 5,471,469 | A | 11/1995 | Flammer, III et al. | 370/346 |
| 5,479,400 | A | 12/1995 | Dilworth et al. | 370/331 |
| 5,488,608 | A | 1/1996 | Flammer, III | 370/400 |
| 5,515,369 | A | 5/1996 | Flammer, III et al. | 370/480 |
| 5,515,509 | A | 5/1996 | Rom | 709/228 |
| 5,528,507 | A | 6/1996 | McNamara et al. | 700/286 |
| 5,544,036 | A | 8/1996 | Brown, Jr. et al. | 364/145 |
| 5,553,094 | A | 9/1996 | Johnson et al. | 375/130 |
| 5,570,084 | A | 10/1996 | Retter et al. | 370/338 |
| 5,572,438 | A | 11/1996 | Ehlers et al. | 700/295 |
| 5,572,528 | A | 11/1996 | Shuen | 370/402 |
| 5,596,722 | A | 1/1997 | Rahnema | 709/241 |
| 5,608,721 | A | 3/1997 | Natarajan et al. | 370/238 |
| 5,608,780 | A | 3/1997 | Gerszberg et al. | 455/436 |
| 5,623,495 | A | 4/1997 | Eng et al. | 370/397 |
| 5,659,300 | A | 8/1997 | Dresselhuys et al. | 340/870.02 |
| 5,673,252 | A | 9/1997 | Johnson et al. | 370/449 |
| 5,684,710 | A | 11/1997 | Ehlers et al. | 700/293 |
| 5,696,501 | A | 12/1997 | Ouellette et al. | 340/870.02 |
| 5,696,695 | A | 12/1997 | Ehlers et al. | 700/286 |
| 5,717,718 | A | 2/1998 | Rowsell et al. | 375/260 |
| 5,719,564 | A | 2/1998 | Sears | 340/870.02 |
| 5,726,644 | A | 3/1998 | Jednacz et al. | 340/825.52 |
| 5,727,057 | A | 3/1998 | Emery et al. | 379/201.07 |
| 5,737,318 | A | 4/1998 | Melnik | 370/254 |
| 5,740,366 | A | 4/1998 | Mahany et al. | 709/227 |
| 5,748,104 | A | 5/1998 | Argyroudis et al. | 340/870.11 |
| 5,757,783 | A | 5/1998 | Eng et al. | 370/315 |
| 5,758,331 | A | 5/1998 | Johnson | 705/412 |
| 5,761,083 | A | 6/1998 | Brown, Jr. et al. | 364/492 |
| 5,767,790 | A | 6/1998 | Jovellana | 340/870.02 |
| 5,774,660 | A | 6/1998 | Brendel et al. | 709/201 |
| 5,812,531 | A | 9/1998 | Cheung et al. | 370/255 |
| 5,822,309 | A | 10/1998 | Ayanoglu et al. | 370/315 |
| 5,844,893 | A | 12/1998 | Gollnick et al. | 370/329 |
| 5,874,903 | A | 2/1999 | Shuey et al. | 340/870.02 |
| 5,880,677 | A | 3/1999 | Lestician | 340/825.06 |
| 5,892,758 | A | 4/1999 | Argyroudis | 370/335 |
| 5,894,422 | A | 4/1999 | Chasek | 364/528.26 |
| 5,896,097 | A | 4/1999 | Cardozo | 340/870.03 |
| 5,896,566 | A | 4/1999 | Averbuch et al. | 455/419 |
| 5,898,387 | A | 4/1999 | Davis et al. | 340/870.02 |
| 5,898,826 | A | 4/1999 | Pierce et al. | 714/4 |
| 5,901,067 | A | 5/1999 | Kao et al. | 700/11 |
| 5,903,566 | A | 5/1999 | Flammer, III | 370/406 |
| 5,914,672 | A | 6/1999 | Glorioso et al. | 340/870.02 |
| 5,914,673 | A | 6/1999 | Jennings et al. | 340/870.03 |
| 5,919,247 | A | 7/1999 | Van Hoff et al. | 709/217 |
| 5,920,697 | A | 7/1999 | Masters et al. | 709/219 |
| 5,926,531 | A | 7/1999 | Petite | 379/144.04 |
| 5,933,092 | A | 8/1999 | Ouellette et al. | 340/870.02 |
| 5,953,371 | A | 9/1999 | Rowsell et al. | 375/220 |
| 5,963,146 | A | 10/1999 | Johnson et al. | 340/870.01 |
| 5,963,457 | A | 10/1999 | Kanoi et al. | 364/528.26 |
| 5,974,236 | A | 10/1999 | Sherman | 709/221 |
| 5,986,574 | A | 11/1999 | Colton | 340/870.02 |
| 5,987,011 | A | 11/1999 | Toh | 370/331 |
| 5,991,806 | A | 11/1999 | McHann, Jr. | 709/224 |
| 6,014,089 | A | 1/2000 | Tracy et al. | 340/870.02 |
| 6,018,659 | A | 1/2000 | Ayyagari et al. | 455/431 |
| 6,026,133 | A | 2/2000 | Sokoler | 375/365 |
| 6,028,522 | A | 2/2000 | Petite | 340/641 |
| 6,044,062 | A | 3/2000 | Brownrigg et al. | 370/238 |
| 6,058,355 | A | 5/2000 | Ahmed et al. | 702/62 |
| 6,061,609 | A | 5/2000 | Kanoi et al. | 700/291 |
| 6,073,169 | A | 6/2000 | Shuey et al. | 709/217 |
| 6,075,777 | A | 6/2000 | Agrawal et al. | 370/329 |
| 6,078,785 | A | 6/2000 | Bush | 455/7 |
| 6,084,867 | A | 7/2000 | Meier | 370/338 |
| 6,088,659 | A | 7/2000 | Kelley et al. | 702/62 |
| 6,097,703 | A | 8/2000 | Larsen et al. | 370/254 |
| 6,108,699 | A | 8/2000 | Moiin | 709/221 |
| 6,118,269 | A | 9/2000 | Davis | 324/110 |
| 6,122,603 | A | 9/2000 | Budike, Jr. | 702/182 |
| 6,124,806 | A | 9/2000 | Cunningham et al. | 340/870.02 |
| 6,134,587 | A | 10/2000 | Okanoue | 709/222 |
| 6,137,423 | A | 10/2000 | Glorioso et al. | 340/870.02 |
| 6,150,955 | A | 11/2000 | Tracy et al. | 340/870.02 |
| 6,169,979 | B1 | 1/2001 | Johnson | 705/412 |
| 6,172,616 | B1 | 1/2001 | Johnson et al. | 340/870.12 |
| 6,195,018 | B1 | 2/2001 | Ragle et al. | 340/870.01 |
| 6,218,953 | B1 | 4/2001 | Petite | 340/641 |
| 6,233,327 | B1 | 5/2001 | Petite | 379/155 |
| 6,239,722 | B1 | 5/2001 | Colten et al. | 340/870.02 |
| 6,240,080 | B1 | 5/2001 | Okanoue et al. | 370/338 |
| 6,246,677 | B1 | 6/2001 | Nap et al. | 370/346 |
| 6,246,689 | B1 | 6/2001 | Shavitt | 370/406 |
| 6,249,516 | B1 | 6/2001 | Brownrigg et al. | 370/338 |
| 6,298,053 | B1 | 10/2001 | Flammer, III et al. | 370/349 |
| 6,300,881 | B1 | 10/2001 | Yee et al. | 340/870.02 |
| 6,304,556 | B1 | 10/2001 | Haas | 370/254 |
| 6,311,105 | B1 | 10/2001 | Budike, Jr. | 700/291 |
| 6,333,975 | B1 | 12/2001 | Brunn et al. | |
| 6,338,087 | B1 | 1/2002 | Okanoue | 709/222 |
| 6,362,745 | B1 | 3/2002 | Davis | 340/637 |
| 6,363,057 | B1 | 3/2002 | Ardalan et al. | 370/252 |
| 6,366,217 | B1 | 4/2002 | Cunningham et al. | 340/870.31 |
| 6,369,719 | B1 | 4/2002 | Tracy et al. | 340/870.02 |
| 6,369,769 | B1 | 4/2002 | Nap et al. | 343/719 |
| 6,373,399 | B1 | 4/2002 | Johnson et al. | 340/870.11 |
| 6,396,839 | B1 | 5/2002 | Ardalan et al. | 370/401 |
| 6,400,949 | B1 | 6/2002 | Bielefeld et al. | 455/434 |
| 6,407,991 | B1 | 6/2002 | Meier | 370/338 |
| 6,415,330 | B1 | 7/2002 | Okanoue | 709/245 |
| 6,430,268 | B1 | 8/2002 | Petite | 379/39 |
| 6,437,692 | B1 | 8/2002 | Petite et al. | 340/540 |
| 6,457,054 | B1 | 9/2002 | Bakshi | 709/227 |
| 6,480,497 | B1 | 11/2002 | Flammer, III et al. | 370/400 |
| 6,480,505 | B1 | 11/2002 | Johansson et al. | 370/449 |
| 6,492,910 | B1 | 12/2002 | Ragle et al. | 340/870.02 |
| 6,509,841 | B1 | 1/2003 | Colton et al. | 340/870.11 |
| 6,522,974 | B2 | 2/2003 | Sitton | 702/17 |
| 6,535,498 | B1 | 3/2003 | Larsson et al. | 370/338 |
| 6,538,577 | B1 | 3/2003 | Ehrke et al. | 340/870.02 |
| 6,553,355 | B1 | 4/2003 | Arnoux et al. | 706/13 |
| 6,556,830 | B1 | 4/2003 | Lenzo | 455/450 |
| 6,577,671 | B1 | 6/2003 | Vimpari | 375/146 |
| 6,606,708 | B1 | 8/2003 | Shifrin et al. | 726/8 |
| 6,618,578 | B1 | 9/2003 | Petite | 455/92 |
| 6,618,772 | B1 | 9/2003 | Kao et al. | 710/15 |
| 6,628,764 | B1 | 9/2003 | Petite | 379/106.01 |
| 6,633,823 | B2 | 10/2003 | Bartone et al. | 702/57 |
| 6,636,894 | B1 | 10/2003 | Short et al. | 709/225 |
| 6,650,249 | B2 | 11/2003 | Meyer et al. | 340/870.28 |
| 6,653,945 | B2 | 11/2003 | Johnson et al. | 340/870.02 |
| 6,657,552 | B2 | 12/2003 | Belski et al. | 340/870.02 |

(56) References Cited

U.S. PATENT DOCUMENTS 6,665,620 B1 12/2003 Burns et al. .................... 702/62
6,671,635 B1 12/2003 Forth et al. ...................... 702/61
6,681,110 B1 1/2004 Crookham et al. ........... 455/420
6,681,154 B2 1/2004 Nierlich et al. ............... 700/286
6,684,245 B1 1/2004 Shuey et al. ................. 709/223
6,687,901 B1 2/2004 Imamatsu ..................... 717/173
6,691,173 B2 2/2004 Morris et al. ................. 709/249
6,697,331 B1 2/2004 Riihinen et al. .............. 370/236
6,710,721 B1 3/2004 Holowick ................ 340/870.02
6,711,166 B1 3/2004 Amir et al. ................. 370/395.1
6,711,409 B1 3/2004 Zavgren, Jr. et al. ......... 455/445
6,711,512 B2 3/2004 Noh ............................... 702/65
6,714,787 B2 3/2004 Reed et al. ................... 455/445
6,718,137 B1 4/2004 Chin ................................ 398/3
6,725,281 B1 4/2004 Zintel et al. ................... 719/318
6,728,514 B2 4/2004 Bandeira et al. ............. 455/13.1
6,747,557 B1 6/2004 Petite et al. ................... 340/540
6,747,981 B2 6/2004 Ardalan et al. ............... 370/401
6,751,445 B2 6/2004 Kasperkovitz et al. ......... 455/76
6,751,455 B1 6/2004 Acampora ................. 455/414.1
6,751,672 B1 6/2004 Khalil et al. .................. 709/230
6,772,052 B1 8/2004 Amundsen et al. ........... 700/291
6,775,258 B1 8/2004 van Valkenburg et al. .... 370/338
6,778,099 B1 8/2004 Mayer et al. ............. 340/870.02
6,785,592 B1 8/2004 Smith et al. ................... 700/291
6,798,352 B2 9/2004 Holowick ................ 340/870.02
6,801,865 B2 10/2004 Gilgenbach et al. ............ 702/61
6,826,620 B1 11/2004 Mawhinney et al. ......... 709/235
6,829,216 B1 12/2004 Nakata ......................... 370/228
6,829,347 B1 12/2004 Odiaka .................... 379/220.01
6,831,921 B2 12/2004 Higgins ........................ 370/401
6,836,737 B2 12/2004 Petite et al. ..................... 702/62
6,839,775 B1 1/2005 Kao et al. ........................ 710/15
6,842,706 B1 1/2005 Baraty ............................ 702/61
6,845,091 B2 1/2005 Ogier et al. ................... 370/338
6,859,186 B2 2/2005 Lizalek et al. ................ 343/767
6,865,185 B1 3/2005 Patel et al. .................... 370/412
6,882,635 B2 4/2005 Eitan et al. .................... 370/338
6,885,309 B1 4/2005 Van Heteren ............ 340/870.11
6,891,838 B1 5/2005 Petite et al. ................... 370/401
6,900,738 B2 5/2005 Crichlow ................. 340/870.02
6,904,025 B1 6/2005 Madour et al. ................ 370/328
6,904,385 B1 6/2005 Budike, Jr. .................... 702/182
6,909,705 B1 6/2005 Lee et al. ...................... 370/338
6,914,533 B2 7/2005 Petite ........................... 340/628
6,914,893 B2 7/2005 Petite ........................... 370/338
6,946,972 B2 9/2005 Mueller et al. ........... 340/870.02
6,954,814 B1 10/2005 Leach .......................... 710/305
6,963,285 B2 11/2005 Fischer et al. ............... 340/635
6,967,452 B2 11/2005 Aiso et al. ..................... 318/466
6,970,434 B1 11/2005 Mahany et al. ............... 370/256
6,970,771 B1 11/2005 Preiss et al. .................. 700/286
6,975,613 B1 12/2005 Johansson ..................... 370/338
6,980,973 B1 12/2005 Karpenko ..................... 705/412
6,982,651 B2 1/2006 Fischer .................... 340/870.02
6,985,087 B2 1/2006 Soliman ................... 340/870.02
6,995,666 B1 2/2006 Luttrell ...................... 340/539.1
6,999,441 B2 2/2006 Flammer, III et al. ........ 370/337
7,009,379 B2 3/2006 Ramirez ....................... 324/142
7,009,493 B2 3/2006 Howard et al. ................ 340/7.1
7,010,363 B2 3/2006 Donnelly et al. ............... 700/19
7,016,336 B2 3/2006 Sorensen ...................... 370/351
7,020,701 B1 3/2006 Gelvin et al. ................. 709/224
7,042,368 B2 5/2006 Patterson et al. ........ 340/870.29
7,046,682 B2 5/2006 Carpenter et al. ............ 370/401
7,053,767 B2 5/2006 Petite et al. .................. 340/531
7,053,853 B2 5/2006 Merenda et al. .............. 343/820
7,054,271 B2 5/2006 Brownrigg et al. ........... 370/238
7,062,361 B1 6/2006 Lane ............................ 700/295
7,064,679 B2 6/2006 Ehrke et al. ............. 340/870.02
7,072,945 B1 7/2006 Nieminen et al. ............ 709/217
7,079,810 B2 7/2006 Petite et al. .................. 455/41.2
7,089,089 B2 8/2006 Cumming et al. ............ 700/295
7,102,533 B2 9/2006 Kim ........................ 340/870.02
7,103,086 B2 9/2006 Steed et al. ................... 375/132
7,103,511 B2 9/2006 Petite ........................... 702/188
7,106,044 B1 9/2006 Lee, Jr. et al. ................. 324/110
7,119,713 B2 10/2006 Shuey et al. ............. 340/870.02
7,126,494 B2 10/2006 Ardalan et al. .......... 340/870.02
7,135,850 B2 11/2006 Ramirez ....................... 324/142
7,135,956 B2 11/2006 Bartone et al. ................ 340/3.9
7,137,550 B1 11/2006 Petite ........................... 235/379
7,143,204 B1 11/2006 Kao et al. ........................ 710/18
7,145,474 B2 12/2006 Shuey et al. ............. 340/870.03
7,170,425 B2 1/2007 Christopher et al. .... 340/870.02
7,174,260 B2 2/2007 Tuff et al. ....................... 702/61
7,185,131 B2 2/2007 Leach .......................... 710/305
7,188,003 B2 3/2007 Ransom et al. ............... 700/286
7,197,046 B1 3/2007 Hariharasubrahmanian . 370/466
7,200,633 B2 4/2007 Sekiguchi et al. ............ 709/203
7,209,840 B2 4/2007 Petite et al. ..................... 702/62
7,215,926 B2 5/2007 Corbett et al. ............... 455/41.2
7,222,111 B1 5/2007 Budike, Jr. .................... 705/412
7,230,544 B2 6/2007 Van Heteren ............ 340/870.03
7,230,931 B2 6/2007 Struhsaker .................... 370/280
7,231,482 B2 6/2007 Leach .......................... 710/305
7,245,938 B2 7/2007 Sobczak et al. ............ 455/562.1
7,248,181 B2 7/2007 Patterson et al. ........ 340/870.03
7,248,861 B2 7/2007 Lazaridis et al. .......... 455/414.1
7,250,874 B2 7/2007 Mueller et al. ........... 340/870.06
7,251,570 B2 7/2007 Hancock et al. ................ 702/57
7,263,073 B2 8/2007 Petite et al. ................... 370/278
7,271,735 B2 9/2007 Rogai ...................... 340/870.02
7,274,305 B1 9/2007 Luttrell .................... 340/870.02
7,274,975 B2 9/2007 Miller ........................... 700/295
7,277,027 B2 10/2007 Ehrke et al. ............. 340/870.12
7,277,967 B2 10/2007 Kao et al. ........................ 710/18
7,289,887 B2 10/2007 Rodgers ........................ 700/295
7,295,128 B2 11/2007 Petite ........................... 340/628
7,301,476 B2 11/2007 Shuey et al. ............. 340/870.03
7,304,587 B2 12/2007 Boaz ........................ 340/870.02
7,308,370 B2 12/2007 Mason, Jr. et al. .............. 702/65
7,312,721 B2 12/2007 Mason, Jr. et al. ....... 340/870.02
7,315,257 B2 1/2008 Patterson et al. ........ 340/870.02
7,317,404 B2 1/2008 Cumeralto et al. ...... 340/870.02
7,321,316 B2 1/2008 Hancock et al. ......... 340/870.02
7,324,453 B2 1/2008 Wu et al. ....................... 370/238
7,327,998 B2 2/2008 Kumar et al. ................. 455/405
7,346,463 B2 3/2008 Petite et al. ..................... 702/62
7,348,769 B2 3/2008 Ramirez .................... 324/158.1
7,349,766 B2 3/2008 Rodgers ........................ 700/295
7,362,709 B1 4/2008 Hui et al. ...................... 370/237
7,366,113 B1 4/2008 Chandra et al. ............... 370/255
7,366,191 B2 4/2008 Higashiyama ................ 370/406
7,379,981 B2 * 5/2008 Elliott et al. .................. 709/220
7,397,907 B2 7/2008 Petite ........................... 379/155
7,406,298 B2 7/2008 Luglio et al. ................. 455/90.3
7,411,964 B2 8/2008 Suemura ....................... 370/400
7,427,927 B2 9/2008 Borleske et al. ......... 340/870.02
7,451,019 B2 11/2008 Rodgers ........................ 700/295
7,457,273 B2 11/2008 Nakanishi et al. ............ 370/338
7,468,661 B2 12/2008 Petite et al. ................... 340/540
7,487,282 B2 2/2009 Leach .......................... 710/305
7,495,578 B2 2/2009 Borleske .................. 340/870.02
7,498,873 B2 3/2009 Opshaug et al. .............. 329/315
7,505,453 B2 3/2009 Carpenter et al. ............ 370/352
7,512,234 B2 3/2009 McDonnell et al. .......... 380/247
7,515,571 B2 4/2009 Kwon et al. .................. 370/338
7,516,106 B2 4/2009 Ehlers et al. .................. 705/412
7,522,540 B1 4/2009 Maufer ......................... 370/254
7,522,639 B1 4/2009 Katz ............................ 370/503
7,539,151 B2 5/2009 Demirhan et al. ............ 370/254
7,545,285 B2 6/2009 Shuey et al. ............. 340/870.02
7,546,595 B1 6/2009 Wickham et al.
7,548,826 B2 6/2009 Witter et al. .................. 702/115
7,548,907 B2 6/2009 Wall et al. ............................. 1/1
7,554,941 B2 6/2009 Ratiu et al. .................... 370/328
7,562,024 B2 7/2009 Brooks et al. .................. 705/1.1
7,571,865 B2 8/2009 Nicodem et al. ................ 236/51
7,586,420 B2 9/2009 Fischer et al. ................ 340/635
7,599,665 B2 10/2009 Sinivaara ................... 455/67.16
7,602,747 B2 10/2009 Maksymczuk et al. ....... 370/331
7,609,673 B2 10/2009 Bergenlid et al. ............. 370/329
7,613,147 B2 11/2009 Bergenlid et al. ............. 370/329

(56) References Cited

U.S. PATENT DOCUMENTS 7,623,043 B2 11/2009 Mizra et al. ... 340/870.02
7,626,967 B2 12/2009 Yarvis et al. ... 370/338
7,650,425 B2 1/2010 Davis et al. ... 709/238
7,676,231 B2 3/2010 Demirhan et al. ... 455/452.1
7,680,041 B2 3/2010 Johansen ... 370/230
7,729,496 B2 6/2010 Hacigumus ... 380/277
7,733,224 B2 6/2010 Tran ... 340/540
7,743,224 B2 6/2010 Wang ... 711/154
7,756,538 B2 7/2010 Bonta et al. ... 455/517
7,788,491 B1 8/2010 Dawson ... 713/168
7,802,245 B2 9/2010 Sonnier et al. ... 717/171
7,814,322 B2 10/2010 Gurevich et al. ... 713/171
7,818,758 B2 10/2010 de Bonet et al. ... 719/328
7,847,706 B1 12/2010 Ross et al. ... 340/12.52
7,987,279 B2 * 7/2011 Hashimoto et al. ... 709/230
8,051,415 B2 11/2011 Suzuki ... 717/168
2001/0005368 A1 6/2001 Rune ... 370/390
2001/0010032 A1 7/2001 Ehlers et al. ... 702/62
2001/0038342 A1 11/2001 Foote ... 340/870.02
2001/0046879 A1 11/2001 Schramm et al. ... 455/525
2002/0012358 A1 1/2002 Sato ... 370/466
2002/0013679 A1 1/2002 Petite ... 702/188
2002/0031101 A1 3/2002 Petite et al. ... 370/310
2002/0051269 A1 5/2002 Margalit et al. ... 398/126
2002/0066095 A1 5/2002 Yu ... 717/173
2002/0110118 A1 8/2002 Foley ... 370/352
2002/0114303 A1 8/2002 Crosbie et al. ... 370/338
2002/0120569 A1 8/2002 Day ... 705/40
2002/0158774 A1 10/2002 Johnson et al.
2002/0174354 A1 11/2002 Bel et al. ... 713/193
2002/0186619 A1 12/2002 Reeves et al. ... 368/47
2003/0001640 A1 1/2003 Lao et al. ... 327/165
2003/0001754 A1 1/2003 Johnson et al. ... 340/870.02
2003/0014633 A1 1/2003 Gruber ... 713/170
2003/0033394 A1 2/2003 Stine ... 709/222
2003/0037268 A1 2/2003 Kistler ... 713/310
2003/0050737 A1 3/2003 Osann ... 700/276
2003/0112822 A1 6/2003 Hong et al. ... 370/469
2003/0117966 A1 6/2003 Chen ... 370/255
2003/0122686 A1 7/2003 Ehrke et al. ... 340/870.02
2003/0123481 A1 7/2003 Neale et al. ... 370/466
2003/0156715 A1 8/2003 Reeds, III et al. ... 380/37
2003/0207697 A1 11/2003 Shpak ... 455/524
2003/0229900 A1 12/2003 Reisman ... 725/87
2003/0233201 A1 12/2003 Horst et al. ... 702/62
2004/0008663 A1 1/2004 Srikrishna et al. ... 370/351
2004/0031030 A1 2/2004 Kidder et al. ... 717/172
2004/0034773 A1 2/2004 Balabine et al. ... 713/168
2004/0039817 A1 2/2004 Lee et al. ... 709/225
2004/0054775 A1 * 3/2004 Poliac et al. ... 709/224
2004/0056775 A1 3/2004 Crookham et al. ... 340/825
2004/0066310 A1 4/2004 Ehrke et al. ... 340/870.02
2004/0077341 A1 4/2004 Chandranmenon et al. ... 455/418
2004/0081086 A1 4/2004 Hippelainen et al. ... 370/227
2004/0082203 A1 4/2004 Logvinov et al. ... 439/10
2004/0100953 A1 5/2004 Chen et al. ... 370/389
2004/0113810 A1 6/2004 Mason, Jr. et al. ... 340/870.02
2004/0117788 A1 6/2004 Karaoguz et al. ... 717/177
2004/0125776 A1 7/2004 Haugli et al. ... 370/338
2004/0138787 A1 7/2004 Ransom et al. ... 700/295
2004/0140908 A1 7/2004 Gladwin et al. ... 340/870.02
2004/0157613 A1 8/2004 Steer et al. ... 455/446
2004/0183687 A1 9/2004 Petite et al. ... 340/601
2004/0185845 A1 9/2004 Abhishek et al. ... 455/422.1
2004/0193329 A1 9/2004 Ransom et al. ... 700/286
2004/0210544 A1 10/2004 Shuey et al. ... 705/412
2004/0268142 A1 12/2004 Karjala et al. ... 726/15
2005/0026569 A1 2/2005 Lim et al. ... 455/73
2005/0027859 A1 2/2005 Alvisi et al. ... 709/224
2005/0030968 A1 2/2005 Rich et al. ... 370/449
2005/0033967 A1 2/2005 Morino et al. ... 713/182
2005/0055432 A1 3/2005 Rodgers ... 709/223
2005/0058144 A1 3/2005 Ayyagari et al. ... 370/401
2005/0065742 A1 3/2005 Rodgers ... 702/62
2005/0122944 A1 6/2005 Kwon et al. ... 370/338
2005/0136972 A1 6/2005 Smith et al. ... 455/554.1
2005/0172024 A1 8/2005 Cheifot et al. ... 709/225
2005/0187928 A1 8/2005 Byers ... 1/1
2005/0193390 A1 9/2005 Suzuki et al. ... 717/178
2005/0195757 A1 9/2005 Kidder et al. ... 370/278
2005/0201397 A1 9/2005 Petite ... 370/401
2005/0228874 A1 10/2005 Edgett et al. ... 709/220
2005/0243867 A1 11/2005 Petite ... 370/474
2005/0249113 A1 11/2005 Kobayashi et al. ... 370/219
2005/0251403 A1 11/2005 Shuey ... 705/1
2005/0257215 A1 11/2005 Denby et al. ... 717/172
2005/0270173 A1 12/2005 Boaz ... 340/870.02
2005/0276243 A1 12/2005 Sugaya et al. ... 370/328
2005/0286440 A1 12/2005 Strutt et al. ... 370/253
2006/0028355 A1 2/2006 Patterson et al. ... 340/870.02
2006/0055432 A1 3/2006 Shimokawa et al. ... 327/5
2006/0056363 A1 3/2006 Ratiu et al. ... 370/338
2006/0056368 A1 3/2006 Ratiu et al. ... 370/338
2006/0077906 A1 4/2006 Maegawa et al. ... 370/254
2006/0087993 A1 4/2006 Sengupta et al. ... 370/310
2006/0098576 A1 5/2006 Brownrigg et al. ... 370/238
2006/0098604 A1 5/2006 Flammer, III et al. ... 370/337
2006/0111111 A1 5/2006 Ovadia ... 455/439
2006/0130053 A1 6/2006 Buljore et al. ... 717/173
2006/0140135 A1 6/2006 Bonta et al. ... 370/254
2006/0146717 A1 7/2006 Conner et al. ... 370/238
2006/0158347 A1 7/2006 Roche et al. ... 340/870.02
2006/0161310 A1 7/2006 Lal ... 700/295
2006/0167784 A1 7/2006 Hoffberg ... 705/37
2006/0184288 A1 8/2006 Rodgers ... 700/295
2006/0215583 A1 9/2006 Castagnoli ... 370/254
2006/0215673 A1 9/2006 Olvera-Hernandez ... 370/406
2006/0217936 A1 9/2006 Mason et al. ... 702/188
2006/0230276 A1 10/2006 Nochta ... 713/176
2006/0271244 A1 11/2006 Cumming et al. ... 700/291
2006/0271678 A1 11/2006 Jessup et al. ... 709/224
2007/0001868 A1 1/2007 Boaz ... 340/870.02
2007/0013547 A1 1/2007 Boaz ... 340/870.02
2007/0019598 A1 1/2007 Prehofer ... 370/338
2007/0036353 A1 2/2007 Reznik et al. ... 380/30
2007/0057767 A1 3/2007 Sun et al. ... 340/7.35
2007/0060147 A1 3/2007 Shin et al. ... 455/445
2007/0063866 A1 3/2007 Webb ... 340/870.02
2007/0063868 A1 3/2007 Borleske ... 340/870.03
2007/0085700 A1 4/2007 Walters et al. ... 340/870.02
2007/0087756 A1 4/2007 Hoffberg ... 455/450
2007/0089110 A1 4/2007 Li ... 717/178
2007/0101442 A1 5/2007 Bondurant ... 726/34
2007/0103324 A1 5/2007 Kosuge et al. ... 340/618
2007/0109121 A1 5/2007 Cohen ... 340/539.26
2007/0110024 A1 5/2007 Meier ... 370/351
2007/0120705 A1 5/2007 Kiiskila et al. ... 340/870.02
2007/0136817 A1 6/2007 Nguyen ... 726/26
2007/0139220 A1 6/2007 Mirza et al. ... 340/870.02
2007/0143046 A1 6/2007 Budike, Jr. ... 702/62
2007/0147268 A1 6/2007 Kelley et al. ... 370/254
2007/0169074 A1 7/2007 Koo et al. ... 717/168
2007/0169075 A1 7/2007 Lill et al. ... 717/168
2007/0169080 A1 7/2007 Friedman ... 717/168
2007/0174467 A1 7/2007 Ballou, Jr. et al. ... 709/227
2007/0177538 A1 8/2007 Christensen et al. ... 370/328
2007/0177576 A1 8/2007 Johansen et al. ... 370/351
2007/0177613 A1 8/2007 Shorty et al. ... 370/401
2007/0189249 A1 8/2007 Gurevich et al. ... 370/338
2007/0200729 A1 8/2007 Borleske et al. ... 340/870.02
2007/0201504 A1 8/2007 Christensen et al. ... 370/437
2007/0204009 A1 8/2007 Shorty et al. ... 709/218
2007/0205915 A1 9/2007 Shuey et al. ... 340/870.02
2007/0206503 A1 9/2007 Gong et al. ... 370/238
2007/0206521 A1 9/2007 Osaje ... 370/315
2007/0207811 A1 9/2007 Das et al. ... 455/450
2007/0210933 A1 9/2007 Leach ... 340/870.02
2007/0211636 A1 9/2007 Bellur et al. ... 370/238
2007/0239477 A1 10/2007 Budike, Jr. ... 705/412
2007/0248047 A1 10/2007 Shorty et al. ... 370/329
2007/0257813 A1 11/2007 Vaswani et al. ... 340/870.02
2007/0258508 A1 11/2007 Werb et al. ... 375/140
2007/0263647 A1 11/2007 Shorty et al. ... 370/406
2007/0265947 A1 11/2007 Schimpf et al. ... 705/35

(56) References Cited

U.S. PATENT DOCUMENTS

| | | | | |
|---|---|---|---|---|
| 2007/0266429 | A1 | 11/2007 | Ginter et al. | 726/12 |
| 2007/0271006 | A1 | 11/2007 | Golden et al. | 700/295 |
| 2007/0276547 | A1 | 11/2007 | Miller | 700/295 |
| 2008/0011864 | A1 | 1/2008 | Tessier et al. | 236/51 |
| 2008/0018492 | A1 | 1/2008 | Ehrke et al. | 340/870.03 |
| 2008/0024320 | A1 | 1/2008 | Ehrke et al. | 340/870.02 |
| 2008/0031145 | A1 | 2/2008 | Ethier et al. | 370/248 |
| 2008/0032703 | A1 | 2/2008 | Krumm et al. | 455/456.1 |
| 2008/0037569 | A1 | 2/2008 | Werb et al. | 370/406 |
| 2008/0042874 | A1 | 2/2008 | Rogai | 340/870.03 |
| 2008/0046388 | A1 | 2/2008 | Budike, Jr. | 705/412 |
| 2008/0048883 | A1 | 2/2008 | Boaz | 340/870.02 |
| 2008/0051036 | A1 | 2/2008 | Vaswani et al. | 455/69 |
| 2008/0063205 | A1 | 3/2008 | Braskich et al. | 380/270 |
| 2008/0068217 | A1 | 3/2008 | Van Wyk et al. | 340/870.11 |
| 2008/0068994 | A1 | 3/2008 | Garrison et al. | 370/230 |
| 2008/0068996 | A1 | 3/2008 | Clave et al. | 370/230.1 |
| 2008/0086560 | A1 | 4/2008 | Monier et al. | 709/224 |
| 2008/0089314 | A1 | 4/2008 | Meyer et al. | 370/349 |
| 2008/0095221 | A1 | 4/2008 | Picard | 375/224 |
| 2008/0097782 | A1 | 4/2008 | Budike, Jr. | 705/1.1 |
| 2008/0107034 | A1 | 5/2008 | Jetcheva et al. | 370/238 |
| 2008/0117110 | A1 | 5/2008 | Luglio et al. | 343/702 |
| 2008/0129538 | A1 | 6/2008 | Vaswani et al. | 340/870.03 |
| 2008/0130535 | A1 | 6/2008 | Shorty et al. | 370/310 |
| 2008/0130562 | A1 | 6/2008 | Shorty et al. | 370/329 |
| 2008/0132185 | A1 | 6/2008 | Elliott et al. | 455/115.4 |
| 2008/0136667 | A1 | 6/2008 | Vaswani et al. | 340/870.02 |
| 2008/0151795 | A1 | 6/2008 | Shorty et al. | 370/310 |
| 2008/0151824 | A1 | 6/2008 | Shorty et al. | 370/329 |
| 2008/0151825 | A1 | 6/2008 | Shorty et al. | 370/329 |
| 2008/0151826 | A1 | 6/2008 | Shorty et al. | 370/329 |
| 2008/0151827 | A1 | 6/2008 | Shorty et al. | 370/329 |
| 2008/0154396 | A1 | 6/2008 | Shorty et al. | 700/90 |
| 2008/0159213 | A1 | 7/2008 | Shorty et al. | 370/329 |
| 2008/0165712 | A1 | 7/2008 | Shorty et al. | 370/310 |
| 2008/0170511 | A1 | 7/2008 | Shorty et al. | 370/254 |
| 2008/0177678 | A1 | 7/2008 | Di Martini et al. | 705/512 |
| 2008/0180274 | A1 | 7/2008 | Cumeralto et al. | 340/870.02 |
| 2008/0181133 | A1 | 7/2008 | Thubert et al. | 370/255 |
| 2008/0183339 | A1 | 7/2008 | Vaswani et al. | 700/297 |
| 2008/0186202 | A1 | 8/2008 | Vaswani et al. | 340/870.03 |
| 2008/0186203 | A1 | 8/2008 | Vaswani et al. | 340/870.11 |
| 2008/0187001 | A1 | 8/2008 | Vaswani et al. | 370/466 |
| 2008/0187116 | A1 | 8/2008 | Reeves et al. | 379/106.09 |
| 2008/0189415 | A1 | 8/2008 | Vaswani et al. | 709/226 |
| 2008/0189436 | A1 | 8/2008 | Vaswani et al. | 709/242 |
| 2008/0204272 | A1 | 8/2008 | Ehrke et al. | 340/870.02 |
| 2008/0205355 | A1 | 8/2008 | Liu et al. | 370/338 |
| 2008/0219239 | A1 | 9/2008 | Bell et al. | |
| 2008/0224891 | A1 | 9/2008 | Ehrke et al. | 340/870.02 |
| 2008/0225737 | A1 | 9/2008 | Gong et al. | 370/252 |
| 2008/0238714 | A1 | 10/2008 | Ehrke et al. | 340/870.02 |
| 2008/0238716 | A1 | 10/2008 | Ehrke et al. | 340/870.03 |
| 2008/0272934 | A1 | 11/2008 | Wang et al. | 340/870.11 |
| 2008/0283620 | A1 | 11/2008 | Knapp | 236/12.16 |
| 2008/0288577 | A1 | 11/2008 | Clubb et al. | |
| 2008/0310311 | A1 | 12/2008 | Flammer et al. | 370/238 |
| 2008/0310377 | A1 | 12/2008 | Flammer et al. | 370/338 |
| 2008/0317047 | A1 | 12/2008 | Zeng et al. | 370/401 |
| 2008/0318547 | A1 | 12/2008 | Ballou, Jr. et al. | 455/410 |
| 2009/0003214 | A1 | 1/2009 | Vaswani et al. | 370/236 |
| 2009/0003232 | A1 | 1/2009 | Vaswani et al. | 370/252 |
| 2009/0003243 | A1 | 1/2009 | Vaswani et al. | 370/255 |
| 2009/0003356 | A1 | 1/2009 | Vaswani et al. | 370/400 |
| 2009/0010178 | A1 | 1/2009 | Tekippe | 370/254 |
| 2009/0034418 | A1 | 2/2009 | Flammer, III et al. | 370/238 |
| 2009/0034419 | A1 | 2/2009 | Flammer, III et al. | 370/238 |
| 2009/0034432 | A1 | 2/2009 | Bonta et al. | 370/255 |
| 2009/0043911 | A1 | 2/2009 | Flammer et al. | 709/238 |
| 2009/0046732 | A1 | 2/2009 | Pratt, Jr. et al. | 370/406 |
| 2009/0055032 | A1 | 2/2009 | Rodgers | 700/295 |
| 2009/0068947 | A1 | 3/2009 | Petite | 455/462 |
| 2009/0077405 | A1 | 3/2009 | Johansen | 713/323 |
| 2009/0079584 | A1 | 3/2009 | Grady et al. | 340/870.02 |
| 2009/0082888 | A1 | 3/2009 | Johansen | 700/94 |
| 2009/0096605 | A1 | 4/2009 | Petite et al. | 340/539.22 |
| 2009/0102737 | A1 | 4/2009 | Birnbaum et al. | 343/828 |
| 2009/0112630 | A1* | 4/2009 | Collins et al. | 705/3 |
| 2009/0115626 | A1 | 5/2009 | Vaswani et al. | 340/870.02 |
| 2009/0129575 | A1 | 5/2009 | Chakraborty et al. | 379/201.03 |
| 2009/0132220 | A1 | 5/2009 | Chakraborty et al. | 703/13 |
| 2009/0134969 | A1 | 5/2009 | Veillette | 340/3.1 |
| 2009/0135677 | A1 | 5/2009 | Veillette | 368/47 |
| 2009/0135716 | A1 | 5/2009 | Veillette | 370/221 |
| 2009/0135843 | A1 | 5/2009 | Veillette | 370/406 |
| 2009/0136042 | A1 | 5/2009 | Veillette | 380/279 |
| 2009/0138777 | A1 | 5/2009 | Veillette | 714/748 |
| 2009/0161594 | A1 | 6/2009 | Zhu et al. | 370/312 |
| 2009/0167547 | A1 | 7/2009 | Gilbert | 340/662 |
| 2009/0168846 | A1 | 7/2009 | Filippo, III et al. | 375/133 |
| 2009/0175238 | A1 | 7/2009 | Jetcheva et al. | 370/329 |
| 2009/0179771 | A1 | 7/2009 | Seal et al. | 340/870.04 |
| 2009/0201936 | A1 | 8/2009 | Dumet et al. | 370/401 |
| 2009/0235246 | A1 | 9/2009 | Seal et al. | 717/173 |
| 2009/0243840 | A1 | 10/2009 | Petite et al. | 340/539.1 |
| 2009/0245270 | A1 | 10/2009 | van Greunen et al. | 370/410 |
| 2009/0262642 | A1 | 10/2009 | van Greunen et al. | 370/216 |
| 2009/0267792 | A1 | 10/2009 | Crichlow | 340/870.02 |
| 2009/0285124 | A1 | 11/2009 | Aguirre et al. | 370/255 |
| 2009/0303972 | A1 | 12/2009 | Flammer, III et al. | 370/338 |
| 2009/0310593 | A1 | 12/2009 | Sheynblat et al. | 370/350 |
| 2009/0315699 | A1 | 12/2009 | Satish et al. | 340/533 |
| 2009/0319672 | A1 | 12/2009 | Reisman | 709/227 |
| 2009/0320073 | A1 | 12/2009 | Reisman | 725/51 |
| 2010/0017249 | A1 | 1/2010 | Fincham et al. | 705/412 |
| 2010/0037069 | A1 | 2/2010 | Deierling et al. | 713/193 |
| 2010/0037293 | A1 | 2/2010 | St. Johns et al. | 726/2 |
| 2010/0040042 | A1 | 2/2010 | van Greunen et al. | 370/350 |
| 2010/0060259 | A1 | 3/2010 | Vaswani et al. | 324/86 |
| 2010/0061272 | A1 | 3/2010 | Veillette | 370/254 |
| 2010/0061350 | A1 | 3/2010 | Flammer, III | 370/338 |
| 2010/0073193 | A1 | 3/2010 | Flammer, III | 340/870.11 |
| 2010/0074176 | A1 | 3/2010 | Flammer, III et al. | 370/328 |
| 2010/0074304 | A1 | 3/2010 | Flammer, III | 375/134 |
| 2010/0138660 | A1 | 6/2010 | Haynes et al. | 713/171 |
| 2010/0238917 | A1 | 9/2010 | Silverman et al. | 370/350 |
| 2010/0256830 | A1 | 10/2010 | Kressner et al. | 700/291 |
| 2011/0004358 | A1 | 1/2011 | Pollack et al. | 700/297 |
| 2011/0035073 | A1 | 2/2011 | Ozog | 700/291 |
| 2011/0066297 | A1* | 3/2011 | Saberi et al. | 700/287 |

FOREIGN PATENT DOCUMENTS

| | | | | |
|---|---|---|---|---|
| EP | 0 812 502 B1 | 8/2004 | H04L 12/28 |
| EP | 0 740 873 B1 | 12/2005 | H04L 12/44 |
| JP | 10-070774 | 3/1998 | H04Q 5/00 |
| JP | 10-135965 | 5/1998 | H04L 12/28 |
| WO | WO 95/12942 | 5/1995 | H04L 12/44 |
| WO | WO 96/10307 | 4/1996 | H04L 12/28 |
| WO | WO 96/10307 A1 | 4/1996 | H04L 12/28 |
| WO | WO 00/54237 | 9/2000 | G08B 23/00 |
| WO | WO 01/26334 A2 | 4/2001 | H04L 29/06 |
| WO | WO 01/55865 A1 | 8/2001 | G06F 13/00 |
| WO | WO 03/015452 | 2/2003 | H04Q 9/00 |
| WO | WO 2005/091303 | 9/2005 | G06F 9/445 |
| WO | WO 2006/059195 | 6/2006 | G05D 3/12 |
| WO | WO 2007/015822 | 8/2007 | H04L 12/28 |
| WO | WO 2007/132473 | 11/2007 | G08C 17/00 |
| WO | WO 2008/027457 | 3/2008 | G08B 23/00 |
| WO | WO 2008/033287 A2 | 3/2008 | G08B 23/00 |
| WO | WO 2008/033514 A2 | 3/2008 | G08B 25/00 |
| WO | WO 2008/038072 | 4/2008 | H04Q 7/24 |
| WO | WO 2008/092268 A1 | 8/2008 | G01D 7/06 |
| WO | WO 2009/067251 | 5/2009 | G08C 19/00 |

OTHER PUBLICATIONS

Trilliant Networks, "The Trilliant AMI Solution," RFP SCP-07003, 50 pp., Mar. 22, 2007.

"ZigBee Smart Energy Profile Specification," ZigBee Profile 0x0109, Revision 14, Document 075356r14, 202 pp., May 29, 2008.

(56) References Cited

OTHER PUBLICATIONS

Hubaux, J. P., et al. "Towards Mobile Ad-Hoc WANs: Terminodes," 2000 IEEE, Wireless Communications and Networking Conference, WCNC, vol. 3, pp. 1052-1059, 2000.
Miklos, G., et al., "Performance Aspects of Bluetooth Scatternet Formation," First Annual Workshop on Mobile and Ad Hoc Networking and Computing, MobiHOC 2000, pp. 147-148, 2000.
Eng, K. Y., et al. "BAHAMA: A Broadband Ad-Hoc Wireless ATM Local-Area Network," 1995 IEEE International Conference on Communications, ICC '95 Seattle, 'Gateway to Globalization', vol. 2, pp. 1216-1223, Jun. 18-22, 1995.
Lee, David J. Y., "Ricocheting Bluetooth," 2nd International Conference on Microwave and Millimeter Wave Technology Proceedings, ICMMT 2000, pp. 432-435, 2000.
Lilja, Tore, "Mobile Energy Supervision," Twenty-second International Telecommunications Energy Conference, 2000 INTELEC, pp. 707-712, 2000.
Parkka, Juha, et al., "A Wireless Wellness Monitor for Personal Weight Management," Proceedings of the 2000 IEEE EMBS International Conference on Information Technology Applications in Biomedicine, pp. 83-88, 2000.
Broch, J., et al., "Supporting Hierarchy and Heterogeneous Interfaces in Multi-Hop Wireless Ad Hoc Networks," Proceedings of the Fourth International Symposium on Parallel Architectures, Algorithms, and Networks (I-SPAN '99), pp. 370-375 (7 pp. with Abstract), Jun. 23-25, 1999.
Privat, G., "A System-Architecture Viewpoint on Smart Networked Devices," Microelectronic Engineering, vol. 54, Nos. 1-2, pp. 193-197, Dec. 2000.
Jonsson, U., et al., "MIPMANET-Mobile IP for Mobile Ad Hoc Networks," MobiHOC 2000, First Annual Workshop on Mobile and Ad Hoc Networking and Computing, pp. 75-85 (12 pp. with Abstract), 2000.
Kapoor, R., et al., "Multimedia Support Over Bluetooth Piconets," First Workshop on Wireless Mobile Internet, pp. 50-55, Jul. 2001.
Sung-Yuan, K., "The Embedded Bluetooth CCD Camera," TENDON, Proceedings of the IEEE Region 10 International Conference on Electrical and Electronic Technology, vol. 1, pp. 81-84 (5 pp. with Abstract), Aug. 19-22, 2001.
Lim, A., "Distributed Services for Information Dissemination in Self-Organizing Sensor Networks," Journal of the Franklin Institute, vol. 338, No. 6, pp. 707-727, Sep. 2001.
Meguerdichian, S., et al., "Localized Algorithms in Wireless Ad-Hoc Networks: Location Discovery and Sensor Exposure," ACM Symposium on Mobile Ad Hoc Networking & Computing, MobiHOC 2001, pp. 106-116, Oct. 2001.
Lilakiatsakun, W., et al. "Wireless Home Networks Based on a Hierarchical Bluetooth Scatternet Architecture," Proceedings of the Ninth IEEE International Conference on Networks, pp. 481-485 (6 pp. with Abstract), Oct. 2001.
Jha, S., et al., "Universal Network of Small Wireless Operators (UNSWo)," Proceedings of the First IEEE/ACM International Symposium on Cluster Computing and the Grid, pp. 626-631 (7 pp. with Abstract), 2001.
"AMRON Technologies Successfully Deploys Advanced Metering Solution for C&I Customers Using Bluetooth" [online], Sep. 2, 2004 [retrieved on Jan. 2, 2009], 3 pp., Retrieved from the Internet: http://www.techweb.com/showpressrelease?articleID=X234101&CompanyId=3.
Utility Intelligence, "Exclusive Distributors of Dynamic Virtual Metering" [online], Copyright 2004-2005 [retrieved on May 12, 2005], Retrieved from the Internet: http://www.empoweringutilities.com/hardware.html, 29 pp.
"AMRON Meter Management System" [online], [retrieved on May 12, 2005], 41 pp., Retrieved from the Internet: http://www.amronm5.com/products/.
Reexamination Application No. 90/008,011, filed Jul. 24, 2006, 75 pp.
Broch, Josh, et al., "A Performance Comparison of Multi-Hop Wireless Ad Hoc Network Routing Protocols," *Proceedings of the Fourth Annual ACM/IEEE International Conference in Mobile Computing and Networking* (*MobiCom* '98), Dallas, Texas, 13 pp., Oct. 25-30, 1998.
Broch, Josh, et al., "The Dynamic Source Routing Protocol for Mobile Ad Hoc Networks" [online], Mar. 13, 1998 [retrieved on Feb. 24, 2009], 31 pp., Retrieved from the Internet: http://tools.ietf.org/draft-ietf-manet-dsr-00.txt.
Katz, Randy H. and Brewer, Eric A., "The Case for Wireless Overlay Networks," *Electrical Engineering and Computer Science Department, University of California, Berkeley*, 12 pp., 1996.
Johnson, David B., "Routing in Ad Hoc Networks of Mobile Hosts," *IEEE*, pp. 158-163, 1995.
Nachum Shacham, Edwin B. Brownrigg, & Clifford A. Lynch, *A Packet Radio Network for Library Automation*, 1987 IEEE Military Communications Conference, vol. 2 at 21.3.1, (Oct. 1987). (TN-IP 0004176-82).
Nachum Shacham & Janet D. Tornow, Future Directions in Packet Radio Technology, Proc. of the IEEE Infocom 1985 at 93 (Mar. 1985). (TN-IP 0005080-86), 17 pp.
John Jubin & Janet D. Tornow, The DARPA Packet Radio Network Protocols, Proc. of the IEEE, vol. 75, No. 1 at 21 (Jan. 87). (TN-IP 0004930-41).
John Jubin, Current Packet Radio Network Protocols, Proc. of the IEEE Infocom1985 at 86 (Mar. 1985), (TN-IP 0004921-29), 9 pp.
David B. Johnson & David A. Maltz, Dynamic Source Routing in Ad Hoc Wireless Networks, reprinted in Mobile Computing, 153, Kluwer Academic Publishers (Tomasz Imielinski & Henry F. Korth eds., 1996), (TN-IP 0006929-46), 18 pp.
David B. Johnson, Mobile Host Internetworking Using IP Loose Source Routing, Carnegie Mellon University CMU-CS-93-128, DARPA Order No. 7330 (Feb. 1993), (TN-IP 0006911-28), 18 pp.
Daniel M. Frank, Transmission of IP Datagrams Over NET/ROM Networks, Proc. of the ARRL 7th Computer Networking Conference 1988 at 65 (Oct. 1988), (TN-IP 0006591-96), 6 pp.
Robert E. Kahn, et al., Advances in Packet Radio Technology, Proc. of the IEEE, vol. 66, No. 11, pp. 1468-1496 (Nov. 1978), (TN-IP 0004942-71).
Clifford A. Lynch & Edwin B. Brownrigg, Packet Radio Networks, Bergamon Press, 259-74 (1987), (TN-IP 0004018-175).
Charles E. Perkins & Pravin Bhagwat, Highly Dynamic Destination-Sequenced Distance-Vector Routing (DSDV) for Mobile Computers, ACM SIGCOMM Computer Communication Review, vol. 24, Issue 4 at 234 (Oct. 1994), (TN-IP 0005018-28), 11 pp.
William MacGregor, Jil Westcott, & Michael Beeler, Multiple Control Stations in Packet Radio Networks, 1982 IEEE Military Communications Conference, vol. 3 at 10.3-1 (Oct. 1982), (TN-IP 0004988-93), 6 pp.
Nachum Shacham & Jil Westcott, Future Directions in Packet Radio Architectures and Protocols, Proc. of the IEEE, vol. 75, No. 1 at 83 (Jan. 1987), (TN-IP 0008712-28), 17 pp.
David B. Johnson and David A. Maltz, Protocols for Adaptive Wireless and Mobile Networking, IEEE Personal Communications, Feb. 1996, p. 34-42.
Arek J. Dadej and Daniel Floreani, Interconnected Mobile Radio Networks—A step Towards Integrated Multimedia Military Communications, Communications and Networks for the Year 2000, IEEE Singapore International Conference on Networks/International Conference on Information Engineering '93, vol. 1, p. 152-156.
David A. Beyer, Accomplishments of the DARPA SURAN Program, IEEE MILCOM 1990, p. 39.6.1-8.
William S. Hortos, Application of Neural Networks to the Dynamic Spatial Distribution of Nodes within an Urban Wireless Network, SPIE, vol. 2492, p. 58-70, 1995.
Nachum Shacham and Richard G. Ogier, Network Control and Data Transport for C3I Applications, IEEE 1987, p. 30.5.1-6.
John E. Rustad, Reidar Skaug, and Andreas Aasen, New Radio Networks for Tactical Communication, IEEE Jornal on Selected Areas in Communications, vol. 8, No. 5, p.713-27, Jun. 1990.
Barry M. Leiner, Donald L. Nielson, and Fouad A. Tobagi, Issues in Packet Radio Network Design, Proceedings of the IEEE, vol. 75, No. 1, p. 6-20, Jan. 1987.
Janet Tornow, Functional Summary of the DARPA SURAP1 Network, DARPA, Sep. 1986, 17 pp.

(56) References Cited

OTHER PUBLICATIONS

John F. Shoch and Lawrence Stewart, Interconnecting Local Networks via the Packet Radio Network, Sixth Data Communications Symposium, Nov. 1979, pp. 153-158.
J.R. Cleveland, Performance and Design Considerations for Mobile Mesh Networks, IEEE MILCOM 96, vol. 1, p. 245-49.
Cmdr. R. E. Bruninga, USN, A Worldwide Packet Radio Network, Signal, vol. 42, No. 10, p. 221-230, Jun. 1988.
Nachum Shacham and Janet Tornow, Packet Radio Networking, Telecommunications, vol. 20, No. 9, p. 42-48, 64, 82, Sep. 1986.
Spencer T. Carlisle, Edison's NetComm Project, IEEE 1989, Paper No. 89CH2709-4-B5, p. B5-1-B5-4.
Brian H. Davies and T.R. Davies, The Application of Packet Switching Techniques to Combat Net Radio, Proceedings of the IEEE, vol. 75, No. 1, p. 43-55, Jan. 1987.
Fouad A. Tobagi, Richard Binder, and Barry Leiner, Packet Radio and Satellite Networks, IEEE Communications Magazine, vol. 22, No. 11, p. 24-40, Nov. 1984.
M. Scott Corson, Joseph Macker, and Stephen G. Batsell, Architectural Considerations for Mobile Mesh Networking, IEEE MILCOM 96, vol. 1, p. 225-9.
K.Y. Eng, et. al., Bahama: A Broadband Ad-Hoc Wireless ATM Local-Area Network, 1995 IEEE International Conference on Communications, vol. 2, p. 1216-23, Jun. 18-22, 1995.
J. Jonquin Garcia-Luna-Aceves, A Fail-Safe Routing Algorithm for Multihop Packet-Radio Networks, IEEE INFOCOM '86, p. 434-43, Apr. 8-10, 1986.
Johanes P. Tamtomo, A Prototype of TCP/IP-Based Internet-PRNET for Land Information Networks and Services, Department of Surveying Engineering, University of New Brunswick, Jan. 25, 1993, 118 pp.
A. Alwan, et al., Adaptive Mobile Multimedia Networks, IEEE Personal Communications, p. 34-51, Apr. 1996.
Michael Ball, et al., *Reliability of Packet Switching Broadcast Radio Networks*, IEEE Transactions on Circuits and Systems, vol. Cas-23, No. 12, p. 806-13 ,Dec. 1976.
Kenneth Brayer, Implementation and Performance of Survivable Computer Communication with Autonomous Decentralized Control, IEEE Communications Magazine, p. 34-41, Jul. 1983.
Weidong Chen and Eric Lin, *Route Optimization and Locations Updates for Mobile Hosts*, Proceedings of the 16$^{th}$ ICDCS, p. 319-326, 1996.
Daniel Cohen, Jonathan B. Postel, and Raphael Rom, *IP Addressing and Routing in a Local Wireless Network*, IEEE INFOCOM 1992, p. 5A.3.1-7.
Charles Perkins and David B. Johnson, *Mobility Support in IPv6*, Sep. 22, 1994, http//www.monarch.cs.rice.edu/internet-drafts/draft-perkins-ipv6-mobility-sup-00.txt (last visited Sep. 26, 2009.
Jonathan J. Hahn and David M. Stolle, *Packet Radio Network Routing Algorithms: A Survey*, IEEE Communications Magazine, vol. 22, No. 11, p. 41-7, Nov. 1984.
David A. Hall, *Tactical Internet System Architecture for the Task Force XXI*, IEEE 1996, p. 219-30.
Robert Hinden and Alan Sheltzer, *The DARPA Internet Gateway*, DARPA RFC 823, Sep. 1982, 45 pp.
Manuel Jimenez-Cedeno and Ramon Vasquez-Espinosa, *Centralized Packet Radio Network: A Communication Approach Suited for Data Collection in a Real-Time Flash Flood Prediction System*, Dept. of Electrical and Computer Engineering, University of Puerto Rico-Mayaguez, ACM 0-89791-568-2/93, p. 709-13, 1993.
David B. Johnson, *Routing in Ad Hoc Networks of Mobile Hosts*, Workshop on Mobile Computing Systems and Applications, Dec. 8-9, 1994, Santa Cruz, California, IEEE 1995, p. 158-63.
David B. Johnson, *Route Optimization in Mobile IP*, Nov. 28, 1994, http://www.monarch.cs.rice.edu/internet-drafts/draft-ietf-mobileip-optim-00.txt (last visited Sep. 26, 2009), 32 pp.
Mark G. Lewis and J.J. Garcia-Luna-Aceves, *Packet-Switching Applique for Tactical VHF Radios*, 1987 IEEE MILCOM Communciations Conference, Oct. 19-22, 1987, Washington, D.C., p. 21.2.1-7.
Sioe Mak and Denny Radford, *Design Considerations for Implementation of Large Scale Automatic Meter Reading Systems*, IEEE Transactions on Power Delivery, vol. 10, No. 1, p. 97-103, Jan. 1995.
Charles E. Perkins and Pravin Bhagwat, *A Mobile Networking System Based on Internet Protocol*, IEEE Personal Communications, First Quarter 1994, IEEE 1994, p. 32-41.
Richard Schulman, Richard Snyder, and Larry J. Williams, *SINCGARS Internet Controller—Heart of the Digitized Battlefield*, Proceedings of the 1996 Tactical Communications Conference, Apr. 30-May 2, 1996, Fort Wayne, Indiana, p. 417-21.
Nachum Shacham and Earl J. Craighill, *Dynamic Routing for Real-Time Data Transport in Packet Radio Networks*, Proceedings of INFOCOM 1982, IEEE 1982, p. 152-58.
R. Lee Hamilton, Jr. and Hsien-Chuen Yu, *Optimal Routing in Multihop Packet Radio Networks*, IEEE 1990, p. 389-96.
Carl A. Sunshine, *Addressing Problems in Multi-Network Systems*, Proceedings of INFOCOM 1982, IEEE 1982, p. 12-18.
J.J. Garcia-Luna-Aceves, *Routing Management in Very Large-Scale Networks*, North-Holland, Future Generations Computer Systems 4, 1988, pp. 81-93.
J.J. Garcia-Luna-Aceves, *A Minimum-hop Routing Algorithm Based on Distributed Information*, North-Holland, Computer Networks and ISDN Systems 16, 1988-1989, p. 367-382.
D. Hubner, J. Kassubek, F. Reichert, *A Distributed Multihop Protocol for Mobile Stations to Contact a Stationary Infrastructure*, Third IEE Conference on Telecommunications, Conference Publication No. 331, p. 204-7.
Jens Zander and Robert Forchheimer, *The SOFTNET Project: A Retrospect*, IEEE EUROCON, Jun. 13-17, 1988, p. 343-5.
Mario Gerla and Jack Tzu-Chich Tsai, *Multicluster, Mobile, Multimedia Radio Network*, Wireless Networks 1, J.C. Baltzer AG, Science Publishers, 1995, p. 255-265.
F. G. Harrison, *Microwave Radio in the British TeleCom Access Network*, Second IEE National Conference on Telecommunications, Conference Publication No. 300, Apr. 2-5, 1989, p. 208-13.
Chai-Keong Toh, *A Novel Distributed Routing Protocol to Support Ad-Hoc Mobile Computing*, Conference Proceedings of the 1996 IEEE Fifteenth Annual International Phoenix Conference on Computers and Communications, Mar. 27-29, 1996, p. 480-6.
Fadi F. Wahhab, *Multi-Path Routing Protocol for Rapidly Deployable Radio Networks*, Thesis submitted to the Department of Electrical Engineering and Computer Science of the University of Kansas, 1994, 59 pp.
Jil Westcott and Gregory Lauer, *Hierarchical Routing for Very Large Networks*, IEEE MILCOM 1984, Oct. 21-24, 1984, Conference Record vol. 2, p. 214-8.
International Search Report and Written Opinion for Application No. PCT/US08/13027, dated Feb. 9, 2009, 6 pp.
International Search Report and Written Opinion for Application No. PCT/US08/13023, dated Jan. 12, 2009, 10 pp.
International Search Report and Written Opinion for Application No. PCT/US08/13019, dated Jan. 12, 2009, 13 pp.
International Search Report and Written Opinion for Application No. PCT/US08/13025, dated Jan. 13, 2009, 7 pp.
International Search Report and Written Opinion for Application No. PCT/US08/13018, dated Jan. 30, 2009, 9 pp.
International Search Report and Written Opinion for Application No. PCT/US08/13020, dated Jan. 9, 2009, 8 pp.
International Search Report and Written Opinion for Application No. PCT/US08/13028, dated Jan. 15, 2009, 9 pp.
International Search Report and Written Opinion for Application No. PCT/US08/13021, dated Jan. 15, 2009, 11 pp.
International Search Report and Written Opinion for Application No. PCT/US08/13016, dated Jan. 9, 2009, 7 pp.
International Search Report and Written Opinion for Application No. PCT/US08/13024, dated Jan. 13, 2009, 9 pp.
International Search Report and Written Opinion for Application No. PCT/US08/13022, dated Jan. 27, 2009, 10 pp.
International Search Report and Written Opinion for Application No. PCT/US08/13030, dated Jan. 9, 2009, 7 pp.
International Search Report and Written Opinion for Application No. PCT/US08/12161, dated Mar. 2, 2009, 13 pp.

(56) References Cited

OTHER PUBLICATIONS

International Search Report and Written Opinion for Application No. PCT/US08/13017, dated Mar. 18, 2009, 11 pp.
International Search Report and Written Opinion for Application No. PCT/US08/13026, dated Feb. 24, 2009, 9 pp.
International Search Report and Written Opinion for Application No. PCT/US08/13029, dated Feb. 2, 2009, 8 pp.
International Search Report and Written Opinion for Application No. PCT/US08/13032, dated May 12, 2009, 14 pp.
International Search Report and Written Opinion for Application No. PCT/US09/05008, dated Oct. 22, 2009, 8 pp.
Leis, John, "TCP/IP Protocol Family," pp. 1 and 42-43, Apr. 3, 2006.
Supplementary European Search Report for Application No. EP 08 85 1869, dated Dec. 30, 2010, 7 pp.
International Search Report and Written Opinion for Application No. PCT/US10/26956, dated May 19, 2010, 2 pp.
Supplementary European Search Report for Application No. EP 08 85 1132, dated Dec. 6, 2010, 9 pp.
Baumann, R., et al., "Routing Packets Into Wireless Mesh Networks," *Wireless and Mobile Computing, Networking and Communications*, 2007, WIMOB 2007, Third IEEE International Conference, Piscataway, NJ, Oct. 8, 2007, p. 38 (XP031338321).
Levis Stanford University, J. P. Vasseur, Cisco Systems, et al., "Overview of Existing Routing Protocols for Low Power and Lossy Networks," draft-levis-r12n-overview-protocols-02.txt, IETF Standard-Working-Draft, Internet Engineering Task Force, IETF, Ch, No. 2, Nov. 17, 2007 (XP015054252) (ISSN: 0000-0004).
Culler Arch Rock, J.P. Vasseur, Cisco Systems, et al., "Routing Requirements for Low Power and Lossy Networks, draft-culler-r12n-routing-reqs-01.txt," IETF Standard-Working-Draft, Internet Engineering Task Force, IETF, Ch, No. 1, Jul. 7, 2007 (XP015050851) (ISSN: 000-0004).
Perkins, C. E., et al., "Ad Hoc On-Demand Distance Vector (AODV) Routing," Network Working Group Internet Draft, XX, Nov. 9, 2001 (XP002950167).
Postel, J., "RFC 793 Transmission Control Protocol," Sep. 1981 [retrieved on Jan. 1, 2007], Retrieved From the Internet: http://www.ietf.org/rfc/rfc0793.txt.
Supplementary European Search Report for Application No. EP 08 85 1927, dated Dec. 22, 2010, 10 pp.
Younis, M., et al., "Energy-Aware Routing in Cluster-Based Sensor Networks," Modeling, Analysis and Simulation of Computer and Telecommunications Systems, 10$^{th}$ IEEE Proceedings on Mascots, Oct. 11-16, 2002, Piscataway, NJ (XP010624424) (ISNB: 978-0-7695-1840-4).
Supplementary European Search Report for Application No. EP 08 85 3052, dated Mar. 18, 2011, 10 pp.
Supplementary European Search Report for Application No. EP 08 85 1560, dated Mar. 24, 2011, 9 pp.
Supplementary European Search Report for Application No. EP 08 85 2992, dated Mar. 23, 2011, 6 pp.
International Search Report and Written Opinion for Application No. PCT/US2011/060694, dated Apr. 9, 2012, 10 pp.
International Search Report and Written Opinion for Application No. PCT/US2011/049227, dated Jan. 31, 2012, 9 pp.
International Search Report and Written Opinion for Application No. PCT/US12/22334, dated Apr. 9, 2012, 9 pp.
International Search Report and Written Opinion for Application No. PCT/US11/56620, dated Mar. 13, 2012, 8 pp.
Supplementary European Search Report for Application No. EP 08 84 2449, dated Nov. 29, 2011, 5 pp.
Lin, Shen, et al., "A Wireless Network Based on the Combination of Zigbee and GPRS" [online], [retrieved on Feb. 16, 2012], IEEE International Conference on Networking, Sensing and Control, Apr. 6-8, 2008, 4 pp., Retrieved From the Internet: http://ieeexplore.ieee.org/xpls/abs_all.jsp?arnumber=4525223.
Telegesis, "ZigBee Gateway Makes Your Meter Smart" [online], 2005 [retrieved on Feb. 16, 2012], 1 p., Retrieved From the Internet: http://www.telegesis.com/downloads/general/SSV%20IP%20gateway%20case%20study.pdf.
Supplementary European Search Report for Application No. EP 09 81 1849, dated Dec. 13, 2011, 9 pp.
Gerla, Mario, et al., Multicasting Protocols for High-Speed, Wormhole-Routing Local Area Networks, ACM SIGCOMM Computer Communication Review, vol. 26, No. 4, Oct. 4, 1996, pp. 184-193.
International Search Report and Written Opinion for Application No. PCT/US2011/049277, dated Jan. 31, 2012, 9 pp.
International Search Report and Written Opinion for Application No. PCT/US11/21167, dated Mar. 21, 2012, 8 pp.
"UCAIug Home Area Network System Requirements Specification, A Work Product of the OpenHAN Task Force Formed by the SG Systems Working Group Under the Open Smart Grid (OpenSG) Technical Committee of the UCA® International Users Group, Version 2.0," 157 pp., Aug. 30, 2010.
"ZigBee Smart Energy Profile Specification," ZigBee Profile: 0x0109, Revision 15, Dec. 1, 2008, Document 075345r15 (SEP Document), 244 pp.
Edison Electric Institute (EEI), "Uniform Business Practices for Unbundled Electricity Metering, vol. Two," Dec. 5, 2000, 196 pp., www.naesb.org/pdf/ubp120500.pdf.
"ZigBee Smart Energy Profile Specification," ZigBee Profile: 0x0109, Revision 16, Version 1.1, Document 075356r16ZB, 332 pp., Mar. 23, 2011.
"ZigBee Over-the-Air Upgrading Cluster," ZigBee Alliance, Document 095264r18, Revision 18, Version 1.0, 63 pp., Mar. 14, 2010.
IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (WPANs)," IEEE Computer Society, 323 pp., Sep. 8, 2006.
IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (LR-WPANs)," IEEE Computer Society, 679 pp., Oct. 1, 2003.
"ZigBee Cluster Library Specification," ZigBee Alliance, Document 075123r02ZB, 420 pp., May 29, 2008.
Liu, Ryan, et al., "A Survey of PEV Impacts on Electric Utilities," *EEE PES Innovative Smart Grid Technologies Conference*, Anaheim, California, 8 pp., Jan. 17-19, 2011.
"Utility/Lab Workshop on PV Technology and Systems," DTE Energy DER Technology Adoption, DEW Analysis of Renewable, PEV & Storage, Tempe, Arizona, 36 pp., Nov. 8-9, 2010.
"Network Device: Gateway Specification," ZigBee Alliance, ZigBee Document 075468r35, Revision 35, Version No. 1.0, 301 pp., Mar. 23, 2011.
International Search Report and Written Opinion for Application No. PCT/US12/28135, dated Jul. 5, 2012, 7 pp.
Soiferman, et al.; "Wireless Utility Meter Reading" dated Mar. 8, 2007; ECE 4600—Group Design Project—Final Report; Downloaded from: URL:http://www.iic.umanitoba.ca/docs/soiferman-tang.pdf, on Nov. 10, 2012, 96 pages.
Dunkels, et al.; "Powertrace: Network-level Power Profiling for Low-power Wireless Networks" dated Mar. 2011; SICS Technical Report T2011:05; ISSN 1100-3154; Downloaded from: URL:<http://soda.swedish-ict.se/4112/> on Nov. 10, 2012; 14 pages.
International Search Report and Written Opinion mailed Dec. 10, 2012 for Application No. PCT/US12/24404; 8 pages.

* cited by examiner

FIGURE 7

```
GRIPEncoding DEFINITIONS AUTOMATIC TAGS ::=
BEGIN
FunctionCall ::= CHOICE {
   parameters FunctionParams,
   results FunctionResults }
-- Request messages format
FunctionParams ::= CHOICE { proc-params ProcedureParams}
ProcedureParams  ::= SEQUENCE {
   g-params GeneralProcParams OPTIONAL,
   d-params DataParams }
GeneralProcParams ::= CHOICE {
   none  NULL,
   timeout  Timeout }
Timeout ::= INTEGER (0..600000)
DataParams ::= CHOICE { struct [2] StructParams }
StructParams ::= CHOICE { dlmsCommandParams [0] DlmsCommandParams }
DlmsCommandParams ::= SEQUENCE {
   address ZigBeeIEEEAddress,
   data OCTET STRING }
-- Response messages format
FunctionResults ::= CHOICE { proc-results ProcedureResults }
ProcedureResults  ::= SEQUENCE {
   g-results GeneralProcResults,
   d-results DataResults OPTIONAL
}
GeneralProcResults ::= CHOICE { status Status8 }
DataResults ::= CHOICE { struct [2] StructResults }
StructResults ::= CHOICE { dlmsCommandResults [0] DlmsCommandResults }
DlmsCommandResults ::= SEQUENCE { data OCTET STRING }
-- Datatypes
ZigBeeIEEEAddress ::= OCTET STRING (SIZE(8))
Status8 ::= Integer8
Integer8 ::= INTEGER (0..255)
END
```

```
DigitalEnvelopeHeader  ::= [APPLICATION 0] SEQUENCE {
   version                 [0] Unsigned8,
   reasonCode              [1] ENUMERATED {
      smsWakeupResponse(6),
      switchGsmNetworkTest(7),
      callbackResponse(8),
      commissionRequest(9),
      otaStatusReport(10),
      otaImageRequestAlert(11),
      decommissionRequest(12),
      eMeterReport(17),
      gMeterReport(18),
      ihuReport(19),
      commsHubReport(20),
      eMeterHighPriorityReport(33),
      gMeterHighPriorityReport(34),
      ihuHighPriorityReport(35),
      commsHubHighPriorityReport(36),
      eMeterAlarm(49),
      gMeterAlarm(50),
      ihuAlarm(51),
      commsHubAlarm(52),
      pushAcknowledgement(53)
   },
   commsHubMacAddress      [2] OCTET STRING (SIZE (8)),
   sequenceNumber          [3] Unsigned32 OPTIONAL,
   deviceMacAddress        [4] OCTET STRING (SIZE (8)) OPTIONAL,
   tokenId                 [5] Unsigned32 OPTIONAL,
   pushCertificateSN       [6] INTEGER OPTIONAL,
   currentTime             [7] ZSETime OPTIONAL,
   timezoneID              [8] PrintableString OPTIONAL,
   callbackTime            [9] ZSETime OPTIONAL,
   callbackTokenId        [10] Unsigned32 OPTIONAL,
   callbackIpAddress      [11] OCTET STRING (SIZE (4)) OPTIONAL,
   callbackDomainName     [12] PrintableString OPTIONAL,
   callbackPortNum        [13] Unsigned16 OPTIONAL,
   dstStart               [14] Unsigned32 OPTIONAL,
   dstEnd                 [15] Unsigned32 OPTIONAL,
}
```

```
60 xx                              DigitalEnvelopHeader tag, length
  80 01 01                         version tag, length, value
  81 01 xx                         reasonCode tag, length, value = 0x08
  82 08 xxxxxxxxxxxxxxxx           commsHubMacAddress tag, length, value
  83 04 xxxxxxxx                   sequenceNumber tag, length, value
  84 08 xxxxxxxxxxxxxxxx           deviceMacAddress tag, length, value
  85 04 xxxxxxxx                   tokenId tag, length, value
  86 01 xx                         pushCertificateSN tag, length, value
  87 04 xxxxxxxx                   currentTime tag, length, value
  88 xx xx…                        timezoneID tag, length, value
  89 04 xxxxxxxx                   callbackTime tag, length, value
  8A 04 xxxxxxxx                   callbackTokenId tag, length, value
  8B 04 xxxxxxxx                   callbackIpAddress tag, length, value
  8C xx xx…                        callbackDomainName tag, length, value
  8D 02 xxxx                       callbackPortNum tag, length, value
  8E xx xxxxxxxx                   dstStart tag, length, value
  8F xx xxxxxxxx                   dstEnd tag, length, value
```

FIGURE 14

```
DigitalEnvelopPayload ::= [APPLICATION 0] SEQUENCE OF PayloadContent
PayloadContent ::= CHOICE {
   dlmsContent         [0] DlmsContent,
   zclContent          [1] ZclContent
}
DlmsContent ::= SEQUENCE {
   sourceAP              Unsigned16,                -- Equivalent to Source wPort
   destinationAP         Unsigned16 OPTIONAL,       -- Equivalent to DestinationwPort
   dlmsAttributes        SEQUENCE OF OCTET STRING
   -- Each OCTET STRING contains a dlms attribute composed of:
   --  class-id          2 bytes
   --  instance-id       6 bytes
   --  attribute-id      1 byte
   --  value             variable
}
ZclContent ::= SEQUENCE {
   clusterIdentifier     Unsigned16,
   sourceEndPoint        Unsigned8,
   destinationEndPoint   Unsigned8 OPTIONAL,
   zclCommands           SEQUENCE OF OCTET STRING
   -- Each OCTET STRING contains a ZCL Header and payload composed of:
   -- Frame Control       1 byte
   -- Manufacturer code   4 byte, present only if "Manufacturer specific" flag is true
   -- Transaction Seq Nbr 1 byte
   -- Command ID          1 byte
   -- Command Content     variable
}
Unsigned8  ::= OCTET STRING (SIZE (1))
Unsigned16 ::= OCTET STRING (SIZE (2)) -- Contain a big endian unsigned integer
Unsigned32 ::= OCTET STRING (SIZE (4)) -- Contain a big endian unsigned integer
ZSETime    ::= OCTET STRING (SIZE (4)) -- Contain a Zigbee UTCTime datatype
```

FIGURE 15

```
60 xx                              DigitalEnvelopePayload tag, length
  A0 xx                            dlmsContent tag, length
    80 02 xxxx                     sourceAP tag, length, value
      A2 xx                        dlmsAttributes tag, length
        04 xx                      OCTET STRING tag, length
          xx                       DLMS class-id
          xxxxxxxxxxxx             DLMS instance-id
          xx                       DLMS attribute-id
          xx xx…                   DLMS data type tag, value
        04 xx                      The previous construct is repeated when multiple
          …                        attributes are reported
```

FIGURE 16

```
60 xx                         DigitalEnvelopePayload tag, length
  A1 xx                       zclContent tag, length
    80 02 xxxx                clusterIdentifier tag, length, value
    81 01 xx                  sourceEndPoint tag, length, value
    A3 xx                     zclCommands tag, length
      04 xx                   OCTET STRING tag, length
        xx                    ZCL Frame Control
        xxxx                  ZCL Manufacturer code (Optional)
        xx                    ZCL Transaction Seq Nbr
        xx                    ZCL Command ID
        xx…                   ZCL Command ID payload
      04 xx                   The previous construct is repeated when multiple
        …                     ZCL commands are reported
```

FIGURE 17

```
ContentInfo ::= SEQUENCE {
  contentType              ContentType,
  content               [0] EXPLICIT ANY DEFINED BY contentType
}
ContentType ::= OBJECT IDENTIFIER
id-data OBJECT IDENTIFIER ::=
  { iso(1) member-body(2) us(840) rsadsi(113549) pkcs(1) pkcs7(7) 1 }
```

FIGURE 18

```
30 xx                              SEQUENCE, ContentInfo
  06 09 2A864886F70D010701         OID, 1 2 840 113549 1 7 1 = signedData
  A0 xx                            APPLICATION TAG 0, Content
   xx…                             DigitalEnvelopePayload
```

FIGURE 19

```
DigitalEnvelopEncryptedPayloadDefinition DEFINITIONS IMPLICIT TAGS ::=
BEGIN
ContentInfo ::= SEQUENCE {
  contentType OBJECT IDENTIFIER,
  content [0] Content
}
Content ::= SEQUENCE {
  encryptedData EncryptedData
}
EncryptedData ::= SEQUENCE {
   version INTEGER { v0(0) },
   encryptedContentInfo EncryptedContentInfo
}
EncryptedContentInfo ::= SEQUENCE {
   contentType OBJECT IDENTIFIER,
   contentEncryptionAlgorithm ContentEncryptionAlgorithmIdentifier,
   encryptedContent [0] IMPLICIT EncryptedContent
}
ContentEncryptionAlgorithmIdentifier ::= SEQUENCE {
   aes128cbcID OBJECT IDENTIFIER,
   aesIV OCTET STRING (SIZE(16))
}
EncryptedContent ::= OCTET STRING
id-data OBJECT IDENTIFIER
   ::= { iso(1) member-body(2) us(840) rsadsi(113549) pkcs(1) pkcs7(7) 1 }
id-encryptedData OBJECT IDENTIFIER
   ::= { iso(1) member-body(2) us(840) rsadsi(113549) pkcs(1) pkcs7(7) 6 }
id-aes128-CBC OBJECT IDENTIFIER ::= {joint-iso-itu-t(2) country(16) us(840)
   organization(1) gov(101) csor(3) nistAlgorithm(4) aes(1) aes128-CBC(2)}
END
```

FIGURE 20

```
30 xx                                  ContentInfo
  06 09 2A864886F70D010703             contentType = 1 2 840 113549 1 7 3 = encryptedData
  A0 xx                                Content
    30 xx                              EncryptedData
      02 01 00                         version = 0
      30 xx                            EncryptedContentInfo
        06 09 2A864886F70D010701       1 2 840 113549 1 7 1 = data
        30 xx                          ContentEncryptionAlgorithm
          06 09 608648016503040102     2 16 840 1 101 3 4 1 2 = aes128-CBC
          04 10 xxxxxxxxxxxxxxxxxxxxxxxxxxxxxxxx          OCTET STRING, aes-IV
        A0 80                          APPLICATION TAG 0, EncryptedContent
          04 xx xx…                    DigitalEnvelopPayload encrypted
```

FIGURE 24

```
06 09 2A864886F70D010702              contentType = 1 2 840 113549 1 7 2 = signedData
A0 xx                                 Content
  30 xx                               SignedData
    02 01 01                          version = 1
    31 xx                             DigestAlgorithmIdentifiers
      30 xx                           DigestAlgorithmIdentifier
        06 09 608648016503040201      algorithm = 2 16 840 1 101 3 4 2 1 = sha256
    30 xx                             EncapsulatedContentInfo
      06 09 2A864886F70D010701        contentType = 1 2 840 113549 1 7 1 = data
    A0 xx…                            Optional certificates
    A1 xx…                            Optional crls
    31 xx                             SignerInfos
      30 xx                           SignerInfo
        02 01 01                      version = 1
        30 xx                         SignerIdentifier
          30 xx xx…                   issuer
            31 xx                     RelativeDistinguishedName
              30 xx
                06 03 550406          attributeType 2 5 4 6 = countryName
                13 xx xxxx            attributeValue
            31 12                     RelativeDistinguishedName
              30 xx
                06 03 55040A          attributeType 2 5 4 10 = organizationName
                13 xx xx…             attributeValue
            31 xx                     RelativeDistinguishedName
              30 xx
                06 03 55 04 03        attributeType 2 5 4 3 = commonName
                13 xx xx…             attributeValue
          02 xx xx…                   serialNumber
        30 09                         DigestAlgorithmIdentifier
          06 09 608648016503040201  2 16 840 1 101 3 4 2 1 = sha256
        30 xx                         SignatureAlgorithmIdentifier
          06 08 2A8648CE3D040302      1 2 840 10045 4 3 2 = ecdsa-with-SHA256
        04 xx                         signature
          30 xx                       BER encoding of the ECDSA signature (r, s)
            02 xx xxxxxxxxxxxxxxxxxxxxxxxxxxxxxxxx        of the Header and the optional
Payload
                  xxxxxxxxxxxxxxxxxxxxxxxxxxxxxxxx
            02 xx xxxxxxxxxxxxxxxxxxxxxxxxxxxxxxxx
                  xxxxxxxxxxxxxxxxxxxxxxxxxxxxxxxx
```

FIGURE 27

```
60 xx                                    DigitalEnvelopHeader tag, length
  80 01 00                               version tag, length, value
  81 01 06                               reasonCode tag, length, value = 0x06
  82 08 xxxxxxxxxxxxxxxx                 commsHubMacAddress tag, length, value
  83 04 xxxxxxxx                         sequenceNumber tag, length, value
  85 04 xxxxxxxx                         tokenId tag, length, value (Present if received
                                         in the SMS Wakeup Message)
  86 01 xx                               pushCertificateSN tag, length, value
  88 xx xx…                              timezoneID tag, length, value
30 xx                                    signedData
  …
```

FIGURE 28

```
60 xx                              DigitalEnvelopHeader tag, length
  80 01 00                         version tag, length, value
  81 01 08                         reasonCode tag, length, value = 0x08
  82 08 xxxxxxxxxxxxxxxx           commsHubMacAddress tag, length, value
  83 04 xxxxxxxx                   sequenceNumber tag, length, value
  86 01 xx                         pushCertificateSN tag, length, value
  88 xx xx…                        timezoneID tag, length, value
30 xx                              envelopedDatacontaining the following payload encrypted
  …
  60 xx                            DigitalEnvelopePayload tag, length
    A1 xx                          zclContent tag, length
      80 02 FC50                   clusterIdentifier tag, length, value
      81 01 xx                     sourceEndPoint tag, length, value
      A3 xx                        zclCommands tag, length
        04 xx                      OCTET STRING tag, length
          70                       ZCL Frame Control (Frame Type=01, Manufacturer
                                   specific=1, Direction=1)
          10 C7                    ZCL Manufacturer code
          00                       ZCL Transaction Seq Nbr
          12                       ZCL Command ID = SwitchGsmNetworkTest
          xx                       Source
          xxxxxxxx                 TokenId
          xx                       CountryCode
          xx                       OperatorCode
          xx                       Rssi
          xx                       Ber
30 xx                              signedData
  …
```

FIGURE 29

```
60 xx                                   DigitalEnvelopHeader tag, length
  80 01 00                              version tag, length, value
  81 01 09                              reasonCode tag, length, value = 0x08
  82 08 xxxxxxxxxxxxxxxx                commsHubMacAddress tag, length, value
  83 04 xxxxxxxx                        sequenceNumber tag, length, value
  85 04 xxxxxxxx                        tokenId tag, length, value(Present if set
                                        in the Digital Envelope Acknowledgment)
  86 01 xx                              pushCertificateSN tag, length, value
  88 xx xx…                             timezoneID tag, length, value
30 xx                                   signedData
  …
```

FIGURE 30

```
60 xx                                  DigitalEnvelopHeader tag, length
  80 01 00                             version tag, length, value
  81 01 08                             reasonCode tag, length, value = 0x08
  82 08 xxxxxxxxxxxxxxxx               commsHubMacAddress tag, length, value
  83 04 xxxxxxxx                       sequenceNumber tag, length, value
30 xx                                  envelopedData containing the following payload encrypted
  …
  60 xx                                DigitalEnvelopePayload tag, length
    A1 xx                              zclContent tag, length
      80 02 FC52                       clusterIdentifier tag, length, value
      81 01 xx                         sourceEndPoint tag, length, value
      A3 xx                            zclCommands tag, length
        04 xx                          OCTET STRING tag, length
          70                           ZCL Frame Control (Frame Type=01, Manufacturer
                                       specific=1, Direction=1)
          10 C7                        ZCL Manufacturer code
          00                           ZCL Transaction Seq Nbr
          00                           ZCL Command ID = CommissionRequest
          xxxxxxxxxxxxxxxxxxxxxxxxxxxxxx                             IMSI
          xxxxxxxxxxxxxxxx                                  MacAddress
          xx                                                SerialNumber
          xxxxxxxxxxxxxxxxxxxxxxxxxxxxxxxxxxxxxxxxxxxxxxxx  WorkOrder
          xxxxxxxxxxxxxxxxxxxxxxxxxxxxxxxxxxxxxxxxxx                      ReasonCode
          xxxx                                              ControlClusterId
          xx                                                ControlEndpoint
          xx                                                MirrorEndpoint
30 xx                                  signedData
  …
  A0 xx…                               The Manufacturer Device certificate is included
  …
```

FIGURE 31

```
60 xx                              DigitalEnvelopHeader tag, length
  80 01 00                         version tag, length, value
  81 01 08                         reasonCode tag, length, value = 0x08
  82 08 xxxxxxxxxxxxxxxx           commsHubMacAddress tag, length, value
  83 04 xxxxxxxx                   sequenceNumber tag, length, value
  86 01 xx                         pushCertificateSN tag, length, value
  88 xx xx…                        timezoneID tag, length, value
30 xx                              envelopedData containing the following payload encrypted
  …
  60 xx                            DigitalEnvelopePayload tag, length
    A1 xx                          zclContent tag, length
      80 02 0019                   clusterIdentifier tag, length, value
      81 01 xx                     sourceEndPoint tag, length, value
      A3 xx                        zclCommands tag, length
        04 xx                      OCTET STRING tag, length
          70                       ZCL Frame Control (Frame Type=01, Manufacturer
                                   specific=1, Direction=1)
          10 C7                    ZCL Manufacturer code
          00                       ZCL Transaction Seq Nbr
          18                       ZCL Command ID = OTAStatusReport
          xxxxxxxx                 SetId
          xxxx                     NumOtaStatus
                                   Array of one of more:
          xxxxxxxxxxxxxxxx           Mac-Address
          xxxx                       Manufacturer-Code
          xxxx                       Image-Type
          xxxxxxxx                   Current-FileVersion
          xxxxxxxx                   Pending-FileVersion
          xx                         OtaUpgrade-Status
          xx                         Percentage-Downloaded
30 xx                              signedData
  …
  A0 xx…                           Manufacturer and Manufacturer Device certificates
  A1 xx…                           Optional CRL
  …
```

FIGURE 32

```
60 xx                          DigitalEnvelopHeader tag, length
  80 01 00                     version tag, length, value
  81 01 08                     reasonCode tag, length, value = 0x08
  82 08 xxxxxxxxxxxxxxxx       commsHubMacAddress tag, length, value
  83 04 xxxxxxxx               sequenceNumber tag, length, value
  86 01 xx                     pushCertificateSN tag, length, value
  88 xx xx…                    timezoneID tag, length, value
30 xx                          signedData
  …
```

FIGURE 33

```
60 xx                                   DigitalEnvelopHeader tag, length
  80 01 00                              version tag, length, value
  81 01 0C                              reasonCode tag, length, value = 0x0C
  82 08 xxxxxxxxxxxxxxxx                commsHubMacAddress tag, length, value
  83 04 xxxxxxxx                        sequenceNumber tag, length, value
  86 01 xx                              pushCertificateSN tag, length, value
  88 xx xx…                             timezoneID tag, length, value
30 xx                                   envelopedData containing the following payload encrypted
  …
  60 xx                                 DigitalEnvelopePayload tag, length
    A1 xx                               zclContent tag, length
      80 02 FC52                        clusterIdentifier tag, length, value
      81 01 xx                          sourceEndPoint tag, length, value
      A3 xx                             zclCommands tag, length
        04 xx                           OCTET STRING tag, length
          70                            ZCL Frame Control (Frame Type=01, Manufacturer
                                        specific=1, Direction=1)
          10 C7                         ZCL Manufacturer code
          00                            ZCL Transaction Seq Nbr
          01                            ZCL Command ID = DecommissionRequest
          xxxxxxxxxxxxxxxxxxxxxxxxxxxxxx                                        IMSI
          xxxxxxxxxxxxxxxx                                      MacAddress
          xx                                                    SerialNumber
          xxxxxxxxxxxxxxxxxxxxxxxxxxxxxxxxxxxxxxxxxxxxxxxx      WorkOrder
          xxxxxxxxxxxxxxxxxxxxxxxxxxxxxxxxxxxxxxxxxx                            ReasonCode
30 xx                                   signedData
  …
```

FIGURE 34

```
60 xx                                 DigitalEnvelopHeader tag, length
  80 01 00                            version tag, length, value
  81 01 xxx                           reasonCode tag, length, value
  82 08 xxxxxxxxxxxxxxxx              commsHubMacAddress tag, length, value
  83 04 xxxxxxxx                      sequenceNumber tag, length, value
  88 xx xx…                           timezoneID tag, length, value
30 xx                                 envelopedData containing the following payload encrypted
  …
  60 xx                               DigitalEnvelopePayload
    …
30 xx                                 signedData
  …
```

FIGURE 35

```
60 xx                          DigitalEnvelopHeader tag, length
  80 01 00                     version tag, length, value
  81 01 FF                     reasonCode tag, length, value = 0xFF
  83 04 xxxxxxxx               sequenceNumber tag, length, value
  87 04 xxxxxxxx               currentTime tag, length, value
  89 04 xxxxxxxx               callbackTime tag, length, value
  8A 04 xxxxxxxx               callbackTokenId tag, length, value
  8B 04 xxxxxxxx               callbackIpAddress tag, length, value
  8C xx xx…                    callbackDomainName tag, length, value
  8D 02 xxxx                   callbackPortNum tag, length, value
  8E xx xxxxxxxx               dstStart tag, length, value
  8F xx xxxxxxxx               dstEnd tag, length, value
30 xx                          signedData
  …
  A1 xx…                       Optional Certificates
  A1 xx…                       Optional CRL
  …
```

```
CertificateDefinition DEFINITIONS IMPLICIT TAGS ::=
BEGIN
Certificate ::= SEQUENCE {
  content Content,
  algorithmIdentifier AlgorithmIdentifier,
  signature BIT STRING }
Content ::= SEQUENCE {
  version [0] EXPLICIT INTEGER { v3(2) } ,
  serialNumber INTEGER,
  signature AlgorithmIdentifier,
  issuer Name,
  validity Validity,
  subject Name,
  subjectPublicKeyInfo SubjectPublicKeyInfo,
  extensions [3] EXPLICIT Extensions OPTIONAL }
AlgorithmIdentifier ::= SEQUENCE {
   algorithm OBJECT IDENTIFIER,
   parameters NULL OPTIONAL
}
Name ::= CHOICE { RDNSequence }
RDNSequence ::= SEQUENCE OF RelativeDistinguishedName
RelativeDistinguishedName ::= SET OF AttributeTypeAndValue
AttributeTypeAndValue ::= SEQUENCE {
   type OBJECT IDENTIFIER,
   value ANY }
Validity ::= SEQUENCE {
  notBefore Time,
  notAfter Time }
Time ::= CHOICE {
  utcTime UTCTime,
  generalizedTime GeneralizedTime }
SubjectPublicKeyInfo ::= SEQUENCE {
  algorithm AlgorithmIdentifier,
  subjectPublicKey BIT STRING }
Extensions ::= SEQUENCE OF Extension
Extension ::= SEQUENCE {
  extnId     EXTENSION.&id({ExtensionSet}),
  critical   BOOLEAN DEFAULT FALSE,
  extnValue
    OCTET STRING
     (CONTAINING EXTENSION.&ExtnType({ExtensionSet}{@extnId})
      ENCODED BY der) }
ExtensionSet EXTENSION ::= {...}
EXTENSION ::= CLASS {
  &id OBJECT IDENTIFIER UNIQUE,
  &ExtnType }
WITH SYNTAX {
  SYNTAX &ExtnType
  IDENTIFIED BY &id }
```

FIGURE 40

```
-- basicConstraints extension
basicConstraints EXTENSION ::= {
SYNTAX BasicConstraintsSyntax
  IDENTIFIED BY id-ce-basicConstraints }
BasicConstraintsSyntax ::= SEQUENCE {
  cA BOOLEAN DEFAULT FALSE,
  pathLenConstraint INTEGER (0..MAX) OPTIONAL }
-- keyUsage extension
keyUsage EXTENSION ::= {
   SYNTAX KeyUsage
   IDENTIFIED BY id-ce-keyUsage }
KeyUsage ::= BIT STRING {
   digitalSignature (0),
   contentCommitment (1),
   keyEncipherment (2),
   dataEncipherment (3),
   keyAgreement (4),
   keyCertSign (5),
   cRLSign (6),
   encipherOnly (7),
   decipherOnly (8) }
-- extKeyUsage extension
extKeyUsage EXTENSION ::= {
  SYNTAX SEQUENCE SIZE (1..MAX) OF KeyPurposeId
  IDENTIFIED BY id-ce-extKeyUsage }
-- OIDs
ecdsa-with-SHA256 OBJECT IDENTIFIER ::= { iso(1) member-body(2) us(840)
   ansi-x962(10045) signatures(4) ecdsa-with-SHA2(3) ecdsa-with-SHA256(2) }
commonName OBJECT IDENTIFIER ::=
   { joint-iso-itu-t(2) ds(5) attributeType(4) commonName(3) }
countryName OBJECT IDENTIFIER ::=
   { joint-iso-itu-t(2) ds(5) attributeType(4) countryName(6) }
organizationName OBJECT IDENTIFIER ::=
   { joint-iso-itu-t(2) ds(5) attributeType(4) organizationName(10) }
organizationUnitName OBJECT IDENTIFIER ::=
   { joint-iso-itu-t(2) ds(5) attributeType(4) organizationUnitName(11) }
id-ce-basicConstraints OBJECT IDENTIFIER ::=
   { joint-iso-itu-t(2) ds(5) certificateExtension(29) basicConstraints(19) }
id-ce-keyUsage OBJECT IDENTIFIER ::=
   { joint-iso-itu-t(2) ds(5) certificateExtension(29) keyUsage(15) }
id-ce-extKeyUsage OBJECT IDENTIFIER ::=
   { joint-iso-itu-t(2) ds(5) certificateExtension(29) extKeyUsage(37) }
serverAuth OBJECT IDENTIFIER ::= { iso(1) identified-organization(3) dod(6)
  internet(1) security(5) mechanisms(5) pkix(7) keyPurpose(3) serverAuth(1) }
clientAuth OBJECT IDENTIFIER ::= { iso(1) identified-organization(3) dod(6)
  internet(1) security(5) mechanisms(5) pkix(7) keyPurpose(3) clientAuth(2) }
ecPublicKey OBJECT IDENTIFIER ::=
   { iso(1) member-body(2) us(840) ansi-x962(10045) keyType(2) ecPublicKey(1) }
prime256v1 OBJECT IDENTIFIER ::=
   { iso(1) member-body(2) us(840) ansi-x962(10045) curves(3) prime(1) prime256v1(7) }
END
```

DEVICE AND METHOD FOR FACILITATING SECURE COMMUNICATIONS OVER A CELLULAR NETWORK

CROSS-REFERENCE TO RELATED APPLICATIONS

This application claims benefit of priority to U.S. Provisional Patent Application No. 61/441,375 filed Feb. 10, 2011 entitled DEVICE AND METHOD FOR FACILITATING SECURE COMMUNICATIONS OVER A CELLULAR NETWORK, which is incorporated herein by reference in its entirety.

BACKGROUND

1. Field of Embodiments

The embodiments described herein are generally directed to improved communications between HAN devices and head-end systems utilizing a communications hub function over a WAN such as a cellular network.

2. Summary of Related Art

FIG. 1*a* sets forth an exemplary system for communicating data between service providers, e.g., utility services providers (electricity, gas, solar etc.), and meters, e.g., smart meters and/or other in-home devices (hereafter IHDs) capable of providing utility related data (referred to herein as Reporting Devices). The IHDs could also include energy consuming devices such as HVAC units, pool pumps and the like and energy producing units such as solar devices. More particularly, the system 10 includes Reporting Devices 15, communication hubs (hereafter Comms Hubs) 20, wide are network (WAN) 25, head-end system (hereafter HES) 30 and back-end customer system (hereafter BES) 35. More particularly, the Comms Hub coordinates communication between the HES and the Reporting Devices. In a preferred embodiment, there is a single Comms Hub per subscriber premise. For multi-dwelling units, a single Comms Hub may operate such that it appears to be multiple Comms Hubs, i.e., the single Comms Hub is able to group information to/from particular dwellings within the multi-dwelling unit. For example, as shown in FIG. 1, Premise A includes Reporting Devices 15A and Comms Hub 20A, Premise B includes Reporting Devices 15B and Comms Hub 20B and Premise C includes Reporting Devices 15C and Comms Hub 20C. The Comms Hub 20 could be a stand-alone component or, alternatively, integrated with one of the Reporting Devices 15.

In order to track utility use data and provide such data or information related thereto to the service provider and/or the subscriber, there must be communications from the Reporting Devices. Traditionally, such information had to be taken directly from the meter, i.e., a person had to walk up to the meter(s) at the subscriber premise and literally read the meter. Technology progressed, and the process was arguably improved through the use of stand-off or drive by meter reading, whereby a person could take readings using, e.g., RF communications, from a truck driving by and/or walking by a premise. Currently, technology has advanced to the point where meter readings can be communicated remotely using WANs, e.g., cellular networks, without the need for a person to physically view or approach the individual meters or the subscriber premises. While this system and process is promising, there are some implementation hurdles due to the need to scale to millions, potentially billions, of subscriber premises and reporting devices. WAN bandwidth is not unlimited and it is clearly susceptible to overload. This degree of scaling presents challenges to the communication and processing processes as described further herein.

Referring back to FIG. 1, the current process for managing communications between the Reporting Devices 15 and the HES 30 is burdensome both on the WAN and the processing power of the components. Currently, Reporting Devices 15 are configured to report usage, alarm and other utility related data to their respective Comms Hubs 20. For example, individual Reporting Devices 15 may be programmed to report readings to the Comms Hub 20 which records the reported information at half-hour intervals and the Comms Hub in turn reports the totality of the collected and recorded information at a predetermined time to the HES in a batch process. The details of the local data reporting process within the Premise is not the subject of this patent application. Descriptions of such processes are known and available to those skilled in the art and described in the Attachments hereto which are incorporated by reference in their entirety. Using known batch processes, even if the Comms Hub reports data to the HES during off-peak cell usage times, the shear volume of communications can either overwhelm a network, such as a cell network or become prohibitively expensive, i.e., use of the cell is often subject to per call or per message tariffs.

By way of specific example, current processes for using system 10 of FIG. 1 require the following steps as shown in FIG. 1*b*. In the prior art process, when the HES wants to get info from Comms Hub, the HES sends a Short Message Service ("SMS"), Message #1 (M#1) which tells the Comms Hub to wake up. When the Comms Hub wakes up, it establishes a high speed connection to the WAN, with instructions regarding where data from the Comms Hub needs to go M#2. In operation, M#2 facilitates using the high speed data connection of the WAN cloud (e.g., GPRS on GSM, CDMA2000 or the like), establishment of 2-way data communication between the Comms Hub and the HES. The WAN cloud mobile operator sets up an IP address for the Comms Hub so that is can communicate in both directions with the HES across the cell phone data network and the IP virtual LAN (IP-VLAN) to the HES. Accordingly, the connection for both WAN's cellular data network and IP network are established. The HES next sends an information request using the IP network to the Comms Hub M#3. In certain limited circumstances, the Comms Hub may send an acknowledgement message to the HES to acknowledge receipt of the information request M#4. Otherwise, the Comms Hub sends a response to the HES information request (M#3) which is M#5. The HES sends an acknowledgement message to the Comms Hub to acknowledge receipt of the response to the information request (M#5) which is M#6.

Accordingly, under the prior art messaging process, the HES must send an SMS message every time it wants to wake up a Comms Hub and wait for a reply to request information. Since the HES's request for meter read info from thousands and even millions of Comms Hubs, there are equally as many SMS messages to be sent each day. SMS messages are traditionally tariffed individually or tariffed with enough restrictions as to make their use precious. The SMS wakeup and response step takes time because SMS delivery can be slow and it takes time to set up the GPRS data network connection. This slows down the HES process and waists HES processing resources. As such, this wake up step is an expensive step in the prior art process. Further, the handshake-based IP protocols, e.g., TCP/TLS, of the prior art process requires multiple messages within a single thread and real-time securitization which contributes to latency including decreased throughput, increased time on network, and increased processing time. There is a need in the art to utilize the existing infrastructure of FIG. 1*a* in such a way that the SMS and IP message volume and latency are reduced/minimized, but there is no compromise in security.

SUMMARY

In accordance with an embodiment described herein, a process for communicating utility-related data over at least one network includes: collecting utility-related data at a hub device during a first predetermined period of time; securing the utility-related data at the hub device using digital envelopes during the first predetermined period of time; initiating by the hub device an autonomous wake up process during a second predetermined period of time; sending the secure utility-related data over a first network to a designated server via at least one User Datagram protocol ("UDP") message during the second predetermined period of time; and receiving an acknowledgement of receipt message of the at least one UDP message from the designated server.

In accordance with an embodiment described herein, a process for communicating utility-related data over at least one network includes: collecting utility-related data from a first network at a hub device during a first predetermined period of time; securing the utility-related data at the hub device using digital envelopes during the first predetermined period of time; initiating by the hub device an autonomous wake up process during a second predetermined period of time; sending the secure utility-related data from the hub device over a second network to a designated server via at least one User Datagram protocol ("UDP") message during the second predetermined period of time; and receiving an acknowledgement of receipt message of the at least one UDP message from the designated server.

BRIEF DESCRIPTION OF THE FIGURES

FIG. 7 is an exemplary SendDLMSCommand request and response format;

FIG. 12 is an exemplary digital envelope header format;

FIG. 13 is an exemplary encoded digital envelope header byte stream;

FIG. 14 is an exemplary digital envelope payload format;

FIG. 15 is an exemplary encoded dlmsContent byte stream;

FIG. 16 is an exemplary encoded zclContent byte stream;

FIG. 17 is an exemplary CMS Data structure;

FIG. 18 is an exemplary encoded CMS Data byte stream;

FIG. 19 is an exemplary EncryptedData content type;

FIG. 20 is an exemplary encoded EncryptedData content type byte stream;

FIG. 24 is an exemplary SignedData content type byte stream;

FIG. 27 is an exemplary "SMS Wakeup Response" Digital Envelope byte stream;

FIG. 28 is an exemplary "Switch GSM Network Test" Digital Envelope byte stream;

FIG. 29 is an exemplary "Call-back response" Digital Envelope byte stream;

FIG. 30 is an exemplary "CommissionRequest" Digital Envelope byte stream;

FIG. 31 is an exemplary "OTA Status Report" Digital Envelope byte stream;

FIG. 32 is an exemplary "OTA Image Request Alert" Digital Envelope byte stream;

FIG. 33 is an exemplary "DecommissionRequest" Digital Envelope byte stream;

FIG. 34 is an exemplary octet stream of a report or alarm Digital Envelope;

FIG. 35 is an exemplary "Acknowledgement" Digital Envelope byte stream;

FIG. 40 is an exemplary certificate structure;

DESCRIPTION OF THE PREFERRED EMBODIMENTS

Figure 1A:
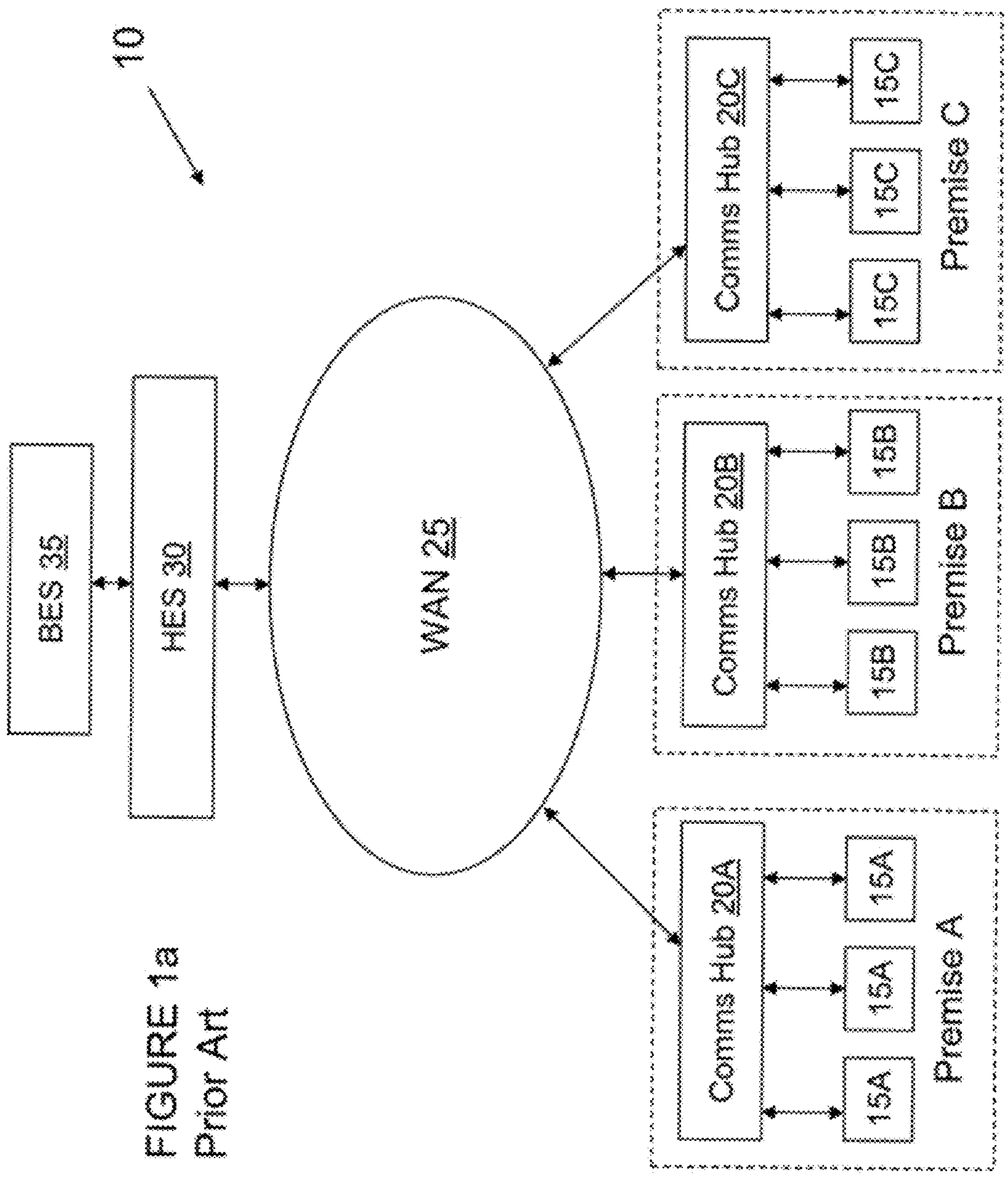
FIG. 1*a* is a prior art network component architecture for use with the prior art communications processes described with respect to FIG. 1*b;*

This document includes the following acronyms and terms as defined in the tables set forth below:

| Acronym | Description |
|---|---|
| ACSE | Association Control Service Element (DLMS UA) |
| APDU | Application Protocol Data Unit |
| API | Application Programming Interface |
| APS | Application Protocol Sub-layer (ZigBee) |
| ASE | Application Service Element (DLMS UA) |
| CBKE | Certificate Based Key Establishment (ZigBee) |
| COSEM | Companion Specification for Energy Meters (DLMS UA) |
| DE | Digital Envelope |
| DLMS | Device Language Message Specification (DLMS UA) |
| DLMS UA | DLMS Users Association |
| DNS | Domain Name Server (IETF) |
| DST | Daylight Savings Time (local time) |
| EUI | Extended Unique Identifier |
| GPRS | General Packet Radio Service (DLMS UA) |
| GSM | Global System for Mobile Communications (IEC) |
| HAN | Home Area Network |
| HES | Head End System |
| HHT | Hand Held Terminal |
| IC | Interface Class (DLMS UA) (standards group) |
| IEEE | Institute of Electrical and Electronics Engineers (standards group) |
| IETF | Internet Engineering Task Force (standards group) |
| IHD | In-Home Device |
| IP | Internet Protocol (IETF) |
| IPv4 | Internet Protocol Version 4 (IETF) |
| ISMI | International Mobile Subscriber Identity |
| MAC | Medium Access Control (IEEE) |
| MLD | Management Logical Device (DLMS UA) |
| MSE | Manufacturer Specified Extension (additional ZigBee clusters) |

-continued

| Acronym | Description |
|---|---|
| MSIN | Mobile Subscriber Identification Number (part of IMSI) |
| OTA | Over The Air |
| PAN | Personal Area Network (IEEE) |
| PPP | Point to Point Protocol (IETF) |
| RPC | Remote Procedure Call |
| SMS | Short Message Service (IETF) |
| TCP | Transmission Communication Protocol (IETF) |
| TLS | Transport Layer Security (IETF) |
| TOU | Time Of Use |
| UDP | User Datagram Protocol (IETF) |
| UTC | Coordinated Universal Time |
| WAN | Wide Area Network |
| WPDU | Wrapper Protocol Data Unit (DLMS UA) |
| xDLMS | Extended Device Language Message Specification (DLMS UA) |
| ZCL | ZigBee Cluster Library |
| ZGD | ZigBee Gateway Device |

| Term | Description |
|---|---|
| Application Service Element | DLMS/COSEM Application Service Elements: ACSE and xDLMS |
| Association Control Service Element | DLMS/COSEM application layer service that controls the association of client application processes |
| channel mask | Channels available for use by the HAN devices |
| cluster | A related set of attributes and methods |
| Comms Hub | Communications hub that connects to the WAN and the HAN networks. It reports metering information and manages the metering and in-home devices. |
| E-meter | Electricity meter |
| EUI-64 | The 64 bit, IEEE administered EUI used to identify devices and as the MAC address |
| G-meter | Gas meter |
| Interface Class | (COSEM) an Interface Class (IC) is a generic format of a COSEM object specifying attributes, their data types, and the method for the server and client |
| Inter-PAN | Limited functionality connection established without forming a network |
| MAC address | The 64 bit globally unique address assigned to each IEEE802 device, which includes the HAN devices. The address is structured, and it identifies the manufacturer |
| Management Logical Device | DLMS/COSEM element that reveals the internal protocol structure of a physical device |
| mobile operator | WAN GSM/GPRS system operator (e.g., Vodafone) |
| PAN coordinator | (IEEE802.15.4) the controller of the IEEE802.15.4 network |
| push | A Comms Hub initiated message to the Head End System |
| short address | The 16 bit IEEE802.15.4 address assigned to a device on joining the HAN network |
| smart meter network | The WAN and HAN networks and Comms Hub that provides communication services to the Head End System and HAN devices |

The following documents are incorporated herein by reference in their entirety: "UCAIug Home Area Network System Requirements Specification: A Work Product of the OpenHAN Task Force formed by the SG Systems Working Group under the Open Smart Grid (OpenSG) Technical Committee of the UCA International Users Group," Version 2.0—Aug. 30, 2010; "ZigBee Smart Energy Profile Specification," ZigBee Profile: 0x0109; Revision 16, version 1.1, Mar. 23, 2011, Document 075356r16; ZigBee Smart Energy Test Specification, May 2008 ZigBee Document 075384r17; ZigBee Cluster Library Specification, ZigBee Document 075123r02ZB; and Institute of Electrical and Electronics Engineers, Inc., IEEE Std. 802.15.4-2003 & 2006, IEEE Standard for Information Technology—Telecommunications and Information Exchange between Systems—Local and Metropolitan Area Networks—Specific Requirements—Part 15.4: Wireless Medium Access Control (MAC) and Physical Layer (PHY) Specifications for Low Rate Wireless Personal Area Networks (WPANs); "Network Specification" Version 1.00, ZigBee Document 02130r10; "Draft Smart Energy Profile Specification" ZigBee Document 105638r08ZB Rev. 16 Ver. 0.9 Jul. 20, 2010; "ZigBee SE 1.x Extensions for UK" Revision 1.0, filename: Zigbee_SE1.x_Extensions_UK_rep1.doc, Date: 23-Nov.-2010; "ZigBee Over-The_Air Upgrading Cluster" ZigBee Document 095264r18, Rev. 18, Version 1.0, Mar. 14, 2010; and "Network Device: Gateway Specification" Version 1.0, ZigBee Document 075468r35, Rev 35, Mar. 23, 2011. Further, many of these documents and the subject matter therein is updated periodically and those updates are appreciated by one skilled in the art and considered to be included herein.

As shown in the figures and discussed further herein, the Comms Hub acts as a coordinator and gateway between the WAN and HAN. Accordingly, the Comms Hub processor or processors are configured with necessary programming, e.g., firmware, in order to interface with the separate networks.

Figure 2A:
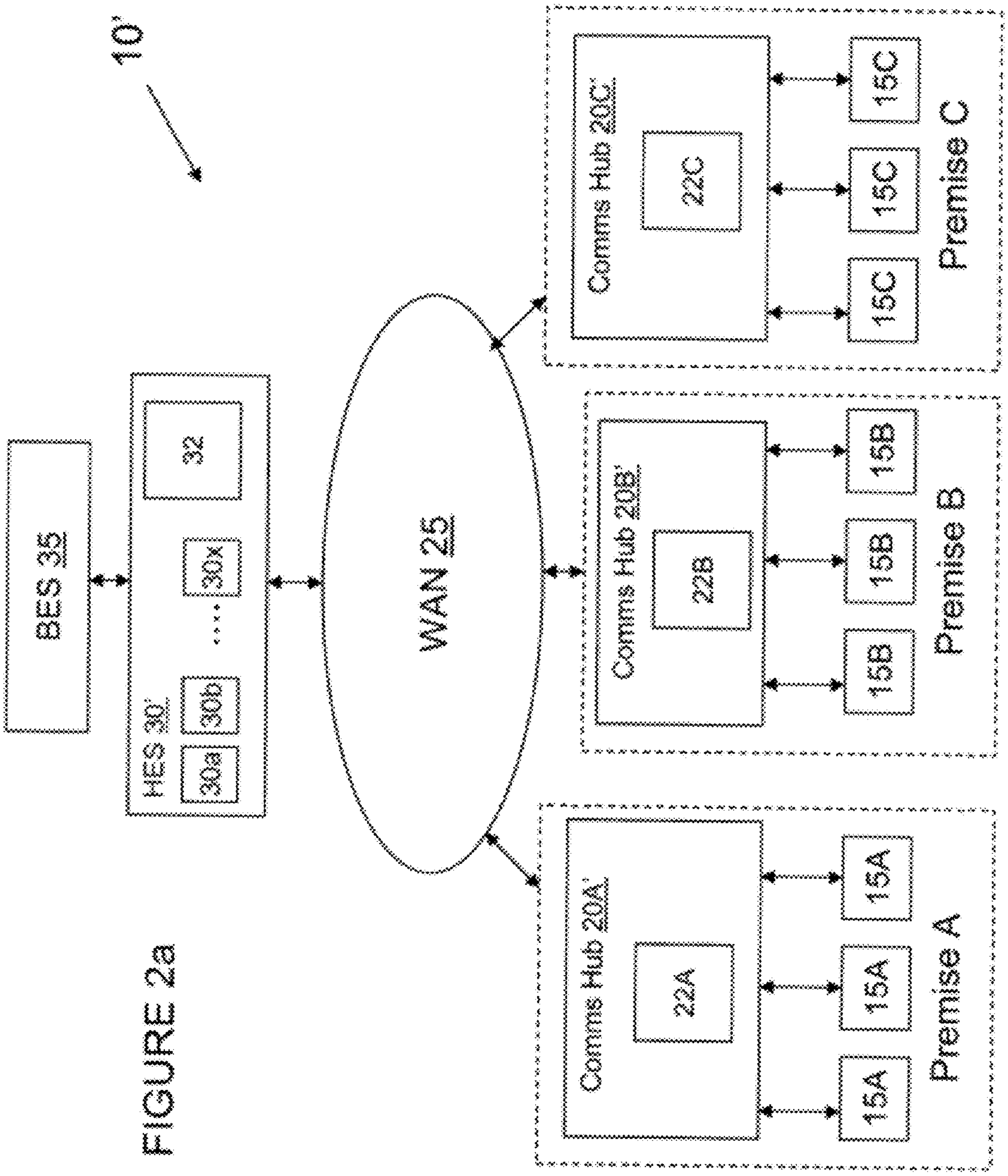
FIGS. 2*a*-2*c* are network component architectures for use with the communications processes described in accordance with preferred embodiments.

FIG. 2*a* illustrates, generally, the network component architecture 10' for use with the communications processes described in the preferred embodiments. While the underlying component infrastructure is similar to that of FIG. 1*a*, there are additions thereto as illustrated for facilitating the improved communications processes. More particularly, the HES 30' includes one or more task processors 30*a*, 30*b*, . . . 30*x* for performing individual tasks as described herein. In addition, the HES includes at least UDP and DE processing functionality 32 as described below. Similarly, Comms Hub 20A, Comms Hub 20B and Comms Hub 20C include at least UDP and DE processing functionality 22A, 22B and 22C to facilitate to the processes described herein.

Figure 2B:
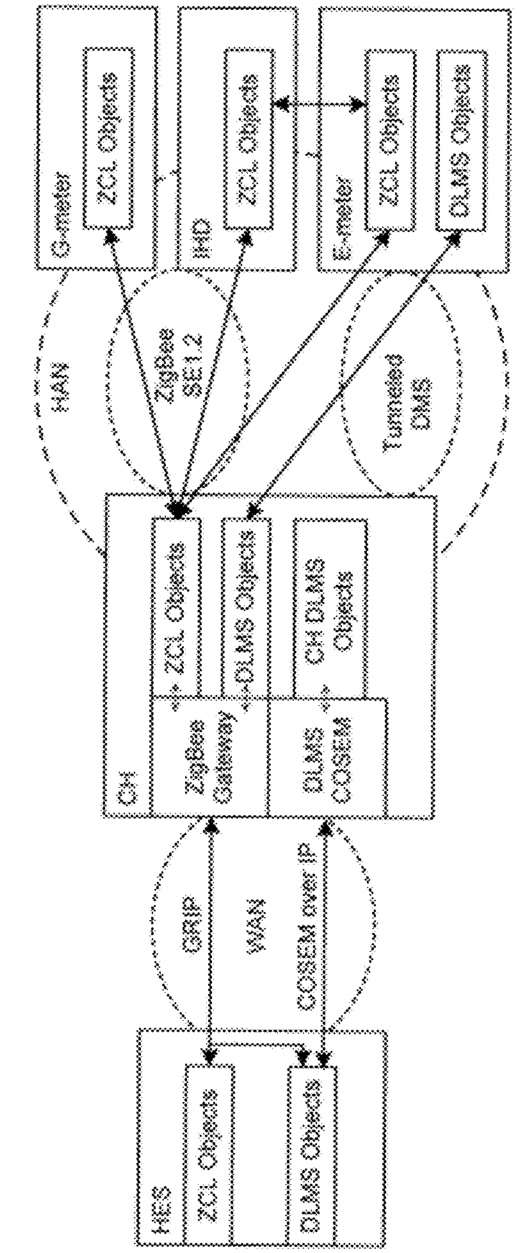
Figure 2C:
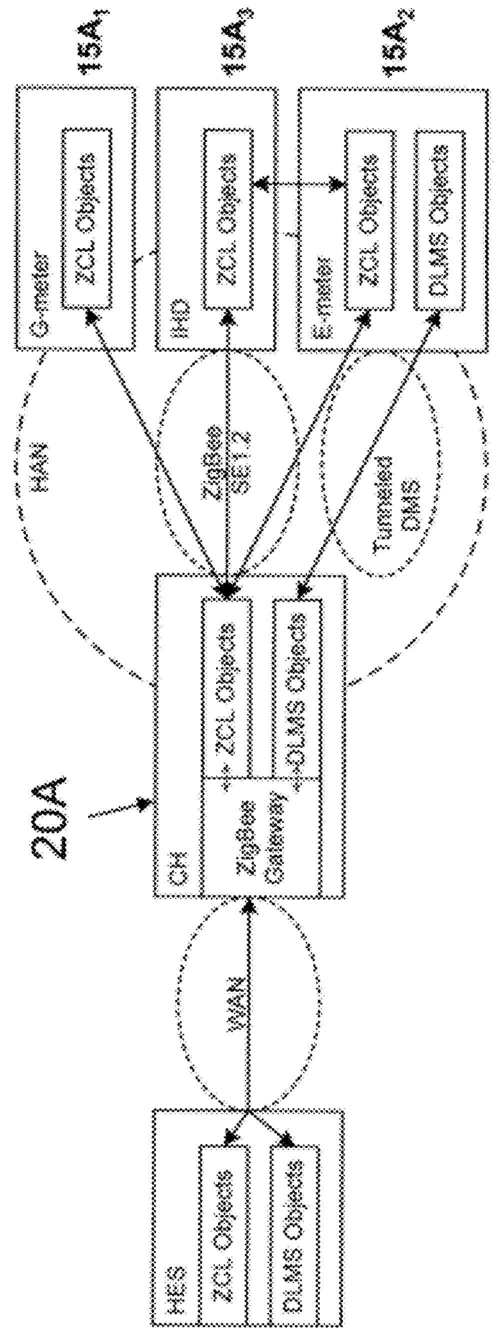

A more particular exemplary implementation of the general network component architecture 10' is illustrated in FIGS. 2*b* and 2*c*. The exemplary smart meter system of FIGS. 2*b* and 2*c* implement a mix of DLMS and ZigBee objects. One skilled in the art recognizes that these are exemplary objects and the architecture may be expanded to accommodate other protocols as well. In these deployments a Comms Hub 20A is in communication with one G-meter 15$A_1$, one E-meter 15$A_2$ and an IHD 15$A_3$. Deployments with multiple meters use the same ZigBee Gateway structure in the Comms Hub. The COSEM communication profiles for use on IPv4 networks provide the HES with the ability to communicate with the DLMS objects of the different Application Processes (AP) of an IP addressed node, i.e., the Comms Hubs (as shown in FIG. 2*b*). The DLMS protocol, supported on IP port 4059 of the Comms Hub cannot be used natively to access the DLMS objects implemented by HAN nodes such as the E-meters or the HHT. This protocol also cannot be used to access the ZigBee ZCL objects implemented by the Comms Hub or any of the different ZigBee HAN nodes. The ZigBee Gateway protocol is used to communicate DLMS messages to the DLMS HAN devices as shown in FIG. 2*c*.

As is understood by those skilled in the art, the ZigBee Gateway specification implements remote interactions with ZigBee devices. The ZigBee Gateway protocol accesses both DLMS and ZCL objects on the Comms Hub and any of the devices on the ZigBee network.

Figure 3A:
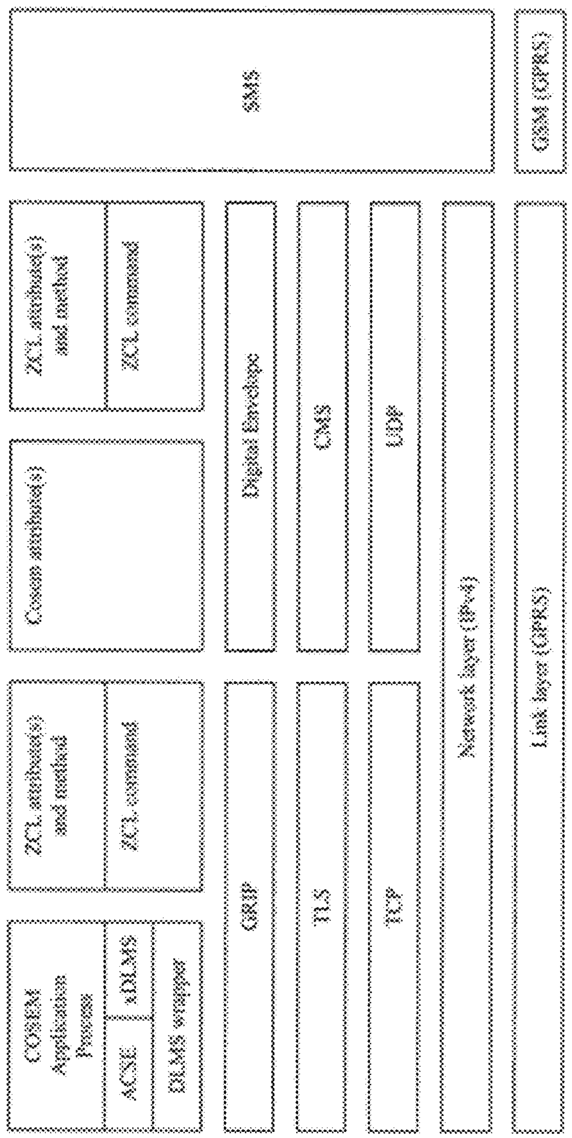
FIGS. 3*a*-3*b* are exemplary Comms Hub protocol stacks for the WAN and HAN networks in accordance with preferred embodiments.
Figure 3B:
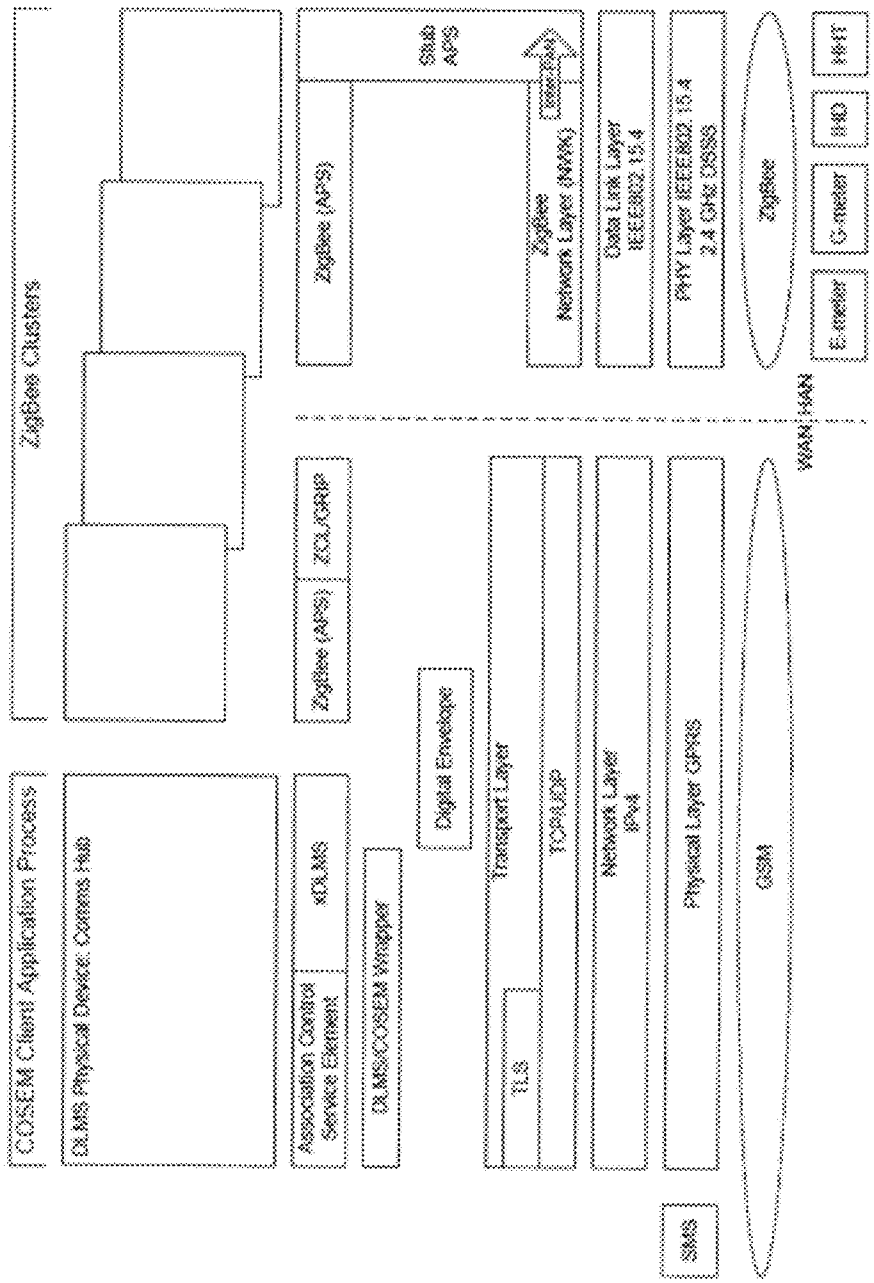

FIGS. 3*a* and 3*b* illustrate exemplary Comms Hub protocol stacks for the WAN and HAN networks. For the WAN stack, the GSM WAN network connects the HES to the Comms Hub. The WAN stack uses either SMS or GPRS to access the higher layers. SMS is used when the HES initiates contact with the Comms Hub. The SMS tells the Comms Hub to set up a WAN connection to communicate with the HES. SMS is used sparingly to minimize its impact on the mobile operator's WAN and reduce the operational costs of the smart meter network. The Comms Hub is not required to send SMS messages.

The GPRS protocol is used to gain access to the mobile data network and to frame the data transmissions over the WAN. It is a connection-oriented protocol, and the connection is initiated by the Comms Hub. The data transmitted over the GPRS connection uses the IPv4 Network Layer and an IETF Transport Layer protocol. The IP transport port numbers are used to direct messages to different devices. The DLMS/COSEM TCP and UDP port 4059 is used for the Comms Hub's DLMS physical device client application process. The ZigBee Gateway Device's (ZG) IP port assignment, 17756, allows the HES to communicate directly with the ZigBee clusters in the Comms Flub. These clusters include the control clusters for the E-meter(s), the IHD(s), and G-meter(s).

TCP/TLS is used at the IP transport layer for HES initiated communications and UDP/DE for push messages from the Comms Hub.

WAN messages use TLS security protocol for TCP and digital envelope security for UDP. The digital envelop layer is above the transport layer and below the xDLMS layer and the ZigBee APS layer.

TCP/TLS DLMS messages use the DLMS/COSEM transport layer wrapper. This wrapper identifies the source and destination client application processes within the device.

The DLMS/COSEM application sub-layer Association Control Service Element provides services for the client application processes. These services include setting up the association of the client application processes between devices. The xDLMS services include get, set, action, event notification, and trigger event notification.

The ZigBee ZCL and Grip layer is used by the ZigBee Gateway described further below. The ZigBee Gateway allows the HES to communicate with the DLMS and ZigBee objects in the HAN devices and Comms Hub.

The following paragraphs summarize various examples of the paths that messages may take either up or down through the stacks illustrated in FIGS. 3*a* and 3*b*. These listings represent general flows through the stack, not steps, and are intended to be exemplary. Further, additional stack/layer details, message flows, and message formats are described throughout the specification.

In a first use case, a HES to Comms Hub stack sequence flow for a TCP DLMS get message sent to an E-meter by the HES through the Comms Hub communication layers includes the following flows (the WAN registration is already established): GPRS; IPv4 (destination address=the Comms Hub IP address); IP transport destination port (set to the ZigBee gateway, 17756); TCP (session established with the Comms Hub); TLS (decrypted at the Comms Hub using the TLS session key); ZigBee Gateway Grip header procedure call, sendDLMScommand, addressed to the E-meter's MAC address and ZigBee DLMS Tunnel cluster: (the Comms Hub places DLMS message in a ZigBee tunnel payload); ZigBee APS (set to the cluster source and destination IDs=Tunnel cluster); ZigBee Network (tunnel end point's short address=target E-meter address); Data Link Layer (destination address short address=target E-meter address); and PHY (IEEE802.15.4 radio).

In a second use case, a Comms Hub to HES stack sequence for a push using UDP/DE for a DLMS message sent to the HES by the Comms Hub includes the following flows: DLMS physical device application process constructs a message (the Comms Hub push aggregator message); xDLMS (send a set.request to the Head End System); DLMS/COSEM Push format: source application process tag, DLMS attributes (class ID, instance ID, attribute ID, value); Digital Envelope (encrypt and sign using certificates); UDP protocol; IP transport layer destination port (set to HES's IP transport port for the push messages, 54059); IPv4 (set to the HES's IP address); PPP; and GPRS.

In a third use case, a HES to Comms Hub stack sequence flow for a TCP ZigBee PutPrice cluster message sent to the Comms Hub Price cluster by the HES includes the following flows: GPRS; PPP; IPv4 (set to the Comms Hub's IP address); IP transport destination port (set to the gateway 17756 port); TCP (session established with the Comms Hub); TLS (decrypted at the Comms Hub using the TLS session key); ZigBee Gateway Grip header procedure call, PutPrice (addressed to Price cluster ID); and Price cluster payload.

More specifically, communications with the WAN may require registration with a GSM circuit switched network using either the 900 MHz or 1800 MHz band utilizing one or both of an external and internal antenna. This registration with the GSM circuit switched network does not create a connection to the HES.

The Head End System interface to the SMS service uses GDSP call (e.g., Vodafone API call: submitSMS( )). This call has the payload: UserName, Password, Head End System IP Address, source trusted number and token ID. Message flows are described further below.

Figure 4A:
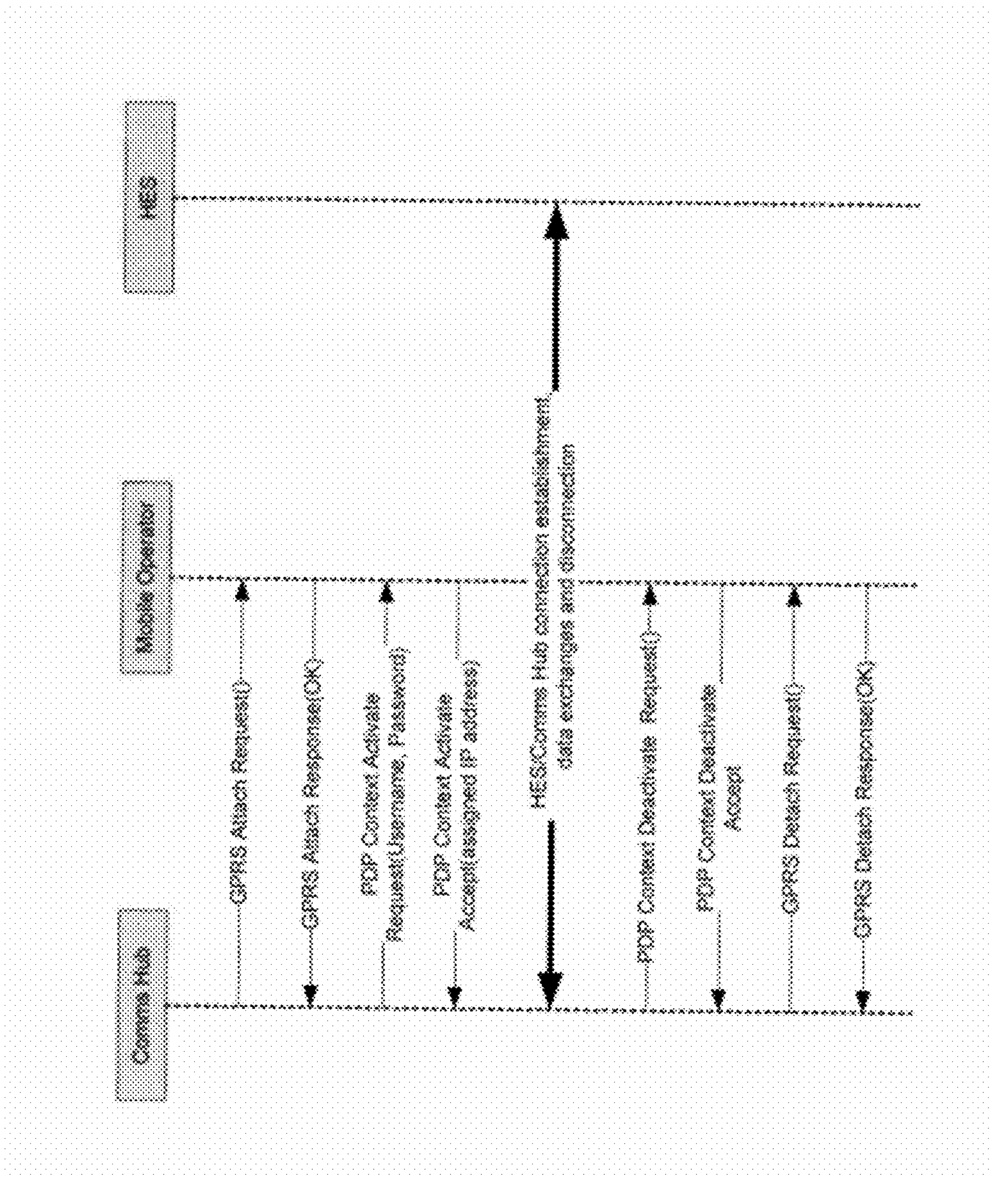
FIG. 4*a* is an exemplary GPRS connection process diagram.

The GPRS interface allows the Comms Hub to identify the mobile operator networks that are available, to connect to the selected network, and to disconnect from the network. Connections are established either by scheduled or ad hoc activities in the Comms Hub or as a result of an SMS wakeup from the Head End System. GPRS connections are not kept open by the Comms Hub. Referring generally to FIG. 4*a*, each time the Comms Hub has a group of messages to send to or receive from the Head End System; it establishes the GPRS attachment and activates the PDP (Packet Data Protocol) context. At the end of the message exchange, the Comms Hub deactivates the PDP context and detaches from GPRS. The mobile operator authenticates the Comms Hub with the IMSI (International Mobile Security Identity) information stored in the SIM (Subscriber Identity Module) and transmitted during PDP activation process.

The payload of the SMS Wakeup Message sent from the HES has the comma separated, text based, order sensitive payload fields: <control>, <TokenId>, <ip_address>, <domain_name>. Additional details are found in Table 0 below.

TABLE 0

| Name | Type | Range | Description |
|---|---|---|---|
| <Control> | Text hex string | two characters | Control flags for SMS fields |
| <TokenId> | Hex integer string | 00000000 to FFFFFFFF | SMS token ID assigned by the Head End System. Present if selected by the control flag |

TABLE 0-continued

| Name | Type | Range | Description |
|---|---|---|---|
| <IpAddress> | IP address (format: four bytes, each byte an IPV4 subaddress = w.x.y.z) | 000.000.000.000 to 255.255.255.255 | IP address of the Head End System processor requesting the response. Present if selected by the control flag |
| <DomainName> | Character string | Up to 139 characters | Fully qualified domain name of the Head End System processor requesting the response. Present if selected by the control flag |
| <PortNum> | 16 bit integer | full | The destination port number to be used by the SMS Wakeup Response, (This port payload option is only used in the development phase and is not supported by customer firewalls) |

Control is a Text hex byte that encodes the test control flag bits to be used after selecting the network as follows: bit 0 set to 1 if the token ID is present (This value will always be present if the test is requested); bit 1 set to 1 if the destination IP Address of a particular Head End System processor is present; bit 2 set to 1 if the fully qualified domain name of a particular HES process is present (Note that if both the IP address and the domain name are both present, then only the domain name is used. If neither is provided, the Comms Hub uses the configured domain name); bit 3 set to 1 if the port number of the Head End System process is included; bits 4-7 reserved and set to 0 (Example: "05" text string sets the flag bits for the token ID, and domain name).

TokenId is the Token ID of the command assigned by the Head End System for inclusion with the push SMS wakeup response message sent by the Comms Hub. ip_address is destination IP address of the target Head End System to be used by the Comms Hub for the SMS wakeup response message. DomainName is the destination fully qualified domain name of the target Head End System to be used by the Comms Hub for the SMS wakeup response message. The limit on the size of the domain name is based on the maximum SMS size of 160 characters and the characters needed to transmit the comma delimitated control, TokenId, and request_time fields. PortNum is the HES port number to be used as the destination port in the IP transport layer of the SMS Response message. Used during development only.

Figure 4B:
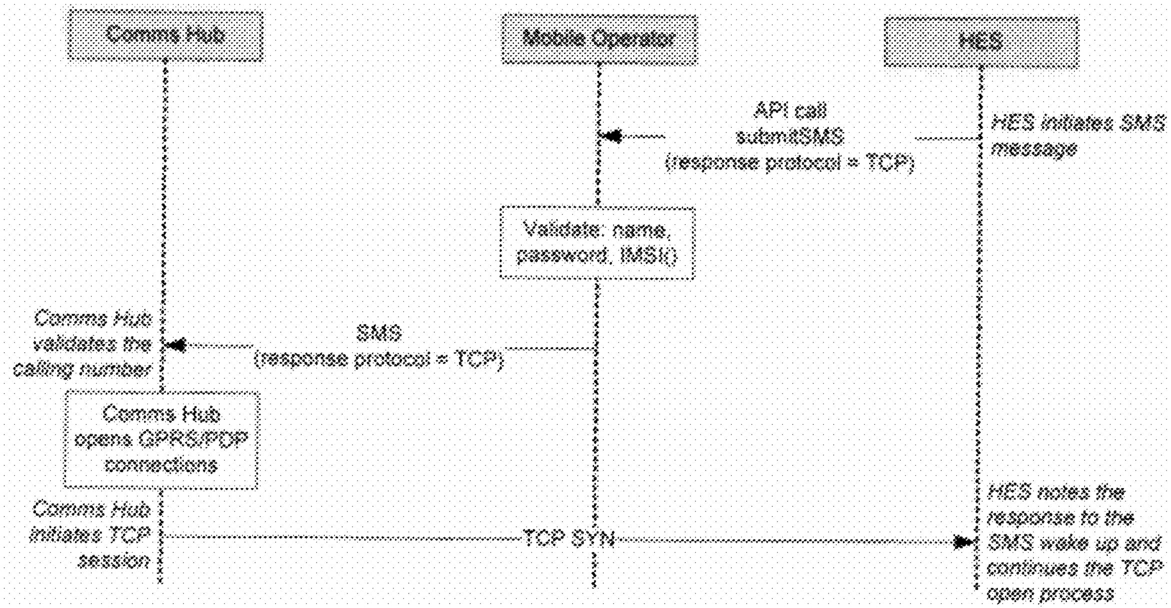
FIG. 4*b* is an exemplary SMS wake-up process diagram.

The message flow diagram for the SMS wakeup is shown in FIG. 4*b*. The Head End system sends the SMS wakeup API call using the Comms Hub's IMSI. This message sent by the mobile operator uses a trusted number as the source. The Comms Hub is configured to accept SMS messages from only trusted numbers which are configured by the Head End System and stored in non-volatile memory. The Head End System's wakeup message uses the mobile operator's API call submitSMS(payload). The payload includes, a control field that indicates what fields are present, the Head End System's IP address field, the Head End System's fully qualified domain name field and Head End System IP transport port field, the token ID field and the response protocol field. If the IP address or the domain name and port are not present, the Comms Hub uses the configured Head End System IP address and port. In the cases where the fully qualified domain name is used, the Comms Hub does a DNS lookup to get the HES IP address. The Token ID in the Comms Hub response links it to the SMS to the wakeup message that generated it.

The Comms Hub may not be able to always connect to the preferred mobile operator. When this happens the mobile operator sends the SMS message to the alternate mobile system the Comms Hub is registered on.

In accordance with a preferred process, SMS messages are minimized by programming the Comms Hubs to wake up at random times within a predetermined window of time to initiate data pushes to the HES. The Comms Hub messages are secured in advance of wake up and are pushed in bulk. More specifically, the messages can be secured by the CommsHub using Digital Envelopes (DE) before sending (discussed further below). DE uses RSA PKCS7 and IETF number as is known in the art. The securing step need not be performed on the fly, i.e., in real time. Accordingly, securitization at the Comms Hub does not contribute to the latency budget of the push process and utilizes the Comms Hub's limited processing power during an off-peak use time. After random, autonomous wake up during the predetermined window, the Comms Hub pushes multiple previously DE secured messages in bulk to the HES using UDP (User Datagram Protocol). UDP does not use handshakes or other negotiations like those of TCP and other IP protocols. Accordingly, the number of messages required to communicate between the HES and the Comms Hub is reduced. Further, UDP is a stateless protocol, treating each request independently, and not as a string, thus reducing latency, etc. that necessarily comes with allocating processing and memory capacity to tracking and completing related requests.

Figure 1B:
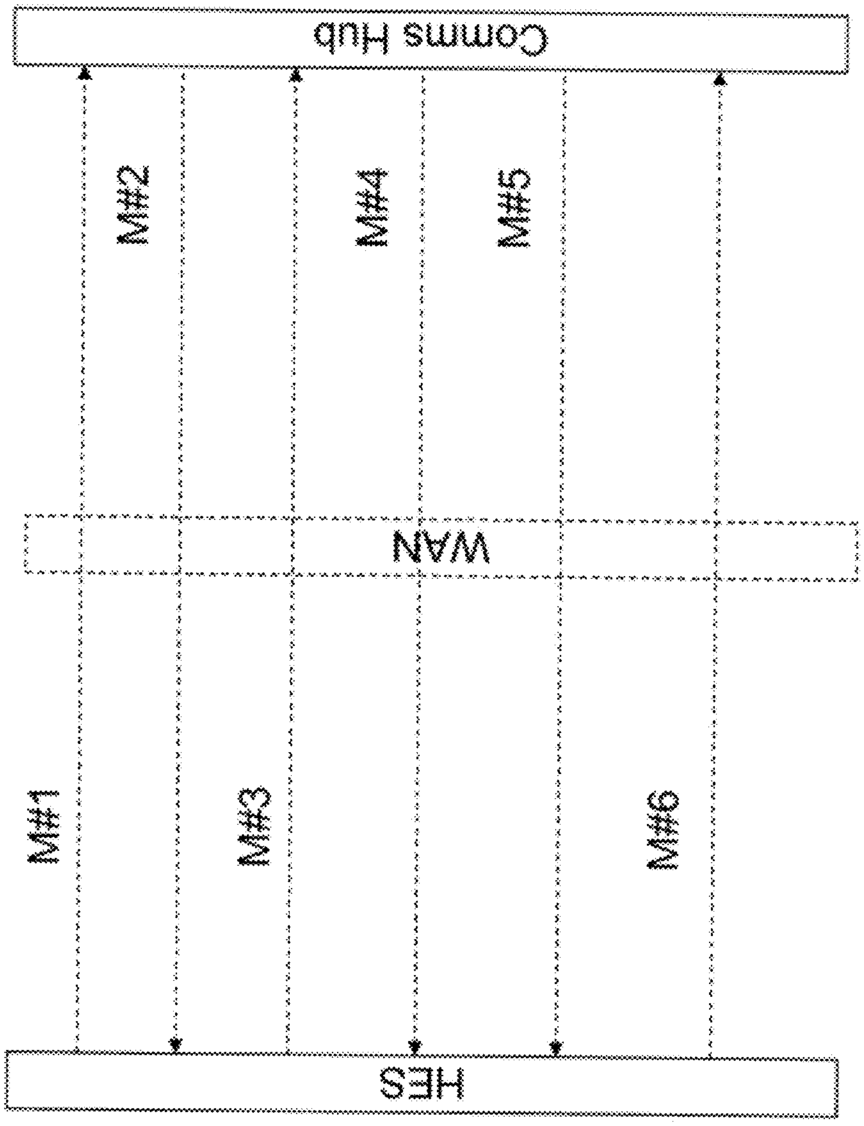
FIG. 1*b* is a prior art process for communication between components of FIG. 1*a;*
Figure 5:
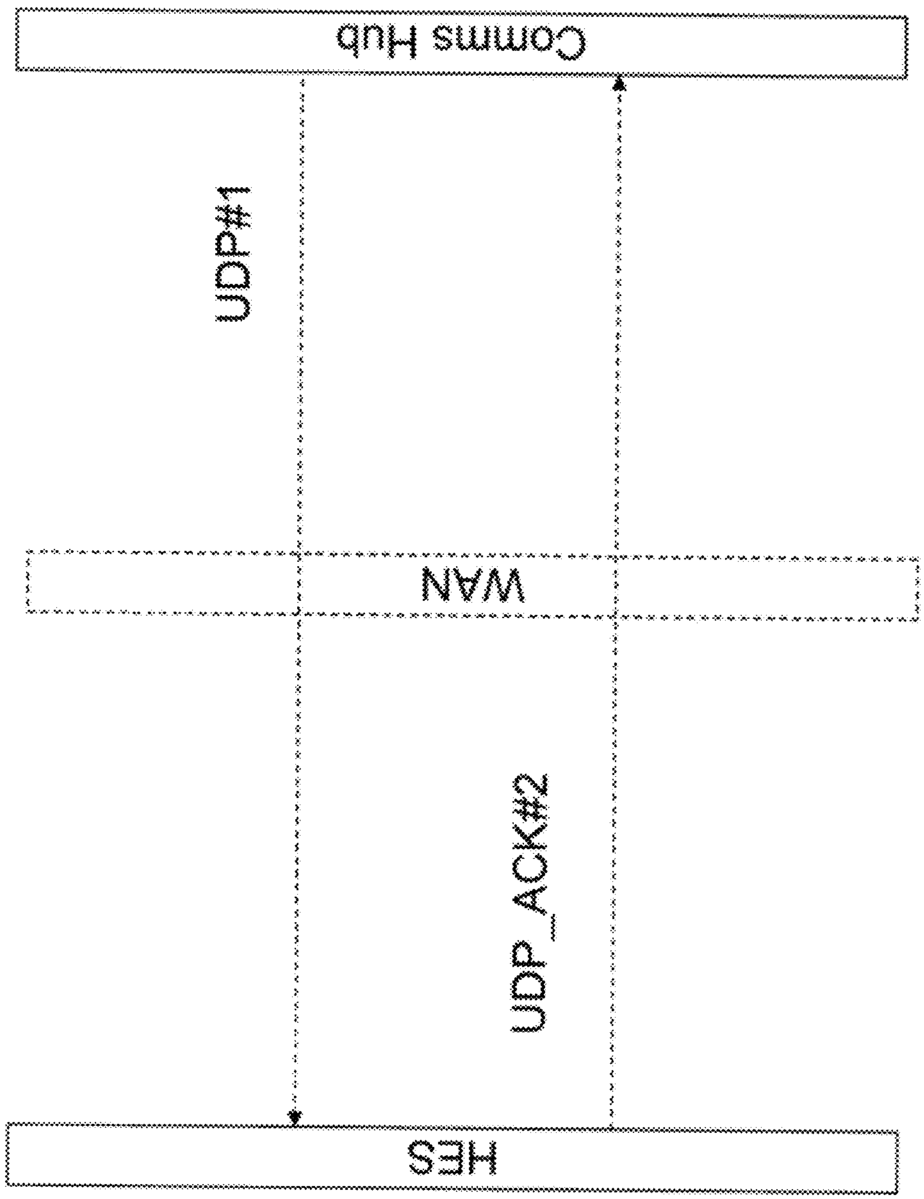
FIG. 5 is an exemplary Comms Hub to HES communication flow diagram.

Referring to FIG. 5, the initial message in the improved communication process is a UDP bulk message push from the Comms Hub to the HES UDP#1. Since we do want some acknowledgement of receipt of the push messages by the HES, the HES sends an acknowledgement message in the form of a UDP push UDP_ACK#2, wherein the HES's UDP push includes bulk acknowledgements corresponding to each of the individual messages in UDP#1. There are UDP#1 sequence numbers that are matched with UDPACK#2. Accordingly, comparing FIG. 1*b* and FIG. 5, the present embodiment reduces the number of messages to complete the reporting of data from the Comms Hub to the HES from 6 to 2 and eliminates the need for SMS messaging. Additional description of the two-message push embodiment is found with reference to FIG. 44.

The UDP messages include header information that optimizes the HES processing. During the time in which the HES is receiving an acknowledging the Comms Hub UDP#1 push messages, the HES is dedicating all processing resources to receipt, ACK and storage of the UDP#1 push messages. The processing of the UDP#1 push messages by the HES occurs later in most cases. Accordingly, in order to determine at the time of receipt what is in the UDP#1 push messages for storage and acknowledgement purposes, the UDP#1 headers include a reason code. In operation, after stripping of IP headers, the HES comes to a header section that allows the HES to determine where to store for future processing, e.g., this is an electric meter push, store in bucket A; this is a gas meter push, store in bucket B, this is an alarm, store in bucket C and add to UDP_ACK#2 instructions for Comms Hub to call the HES during next off-peak processing window of time. The DE security offers threes types of security encryption/privacy, authentication, is the sending device's identity confirmed, and integrity, has the message been changed. Accordingly using DE, different parts of the UDP can have various levels of security. For example, the reason code does not need (and likely would not want) privacy encryption, but integrity protection would likely be used. Whereas the primary message data would require privacy encryption and integrity protection.

Additionally, every UDP_ACK#2 sends current clock configuration of the HES which is synchronized with outside world. Accordingly, this facilitates Comms hub clock synchronization which in turn synchronizes Reporting Devices using other existing protocols.

The presently described embodiment still allows for the HES to use SMS wake up messages and TCP/TLS sessions for longer conversation between the HES and the Comms Hub, which is reserved for non-standard/single thread messages. This may be required when there is an issue and the HES needs to speak with Comms Hub. Additional description found herein with reference to FIG. 45. For all Comms Hub initiated pushes, the preferred embodiment described herein is utilized.

IPv4 is used as the network layer for the WAN. One skilled in the art recognizes that this does not preclude migrating to IPv6 or other related upgrades in the future. The Comms Hub receives a dynamic IPv4 address and DNS addresses when PDP context is activated. The Head End System uses TCP/TLS and UDP/DE protocols to communicate with the Comms Hub.

Similarly, communications with HAN devices follow recognized standards such as IEEE802.15.4 for the radio and MAC interface and ZigBee specifications, e.g., ZigBee Network, ZigBee APS and ZigBee application clusters, the current specifications of which are known to those skilled in the art and incorporated herein by reference. By way of example, HAN devices may use the Direct Sequence Spread Spectrum (DSSS) radio operating in the 2.4 GHz band. Additionally, the Comms Hub and the Hand Held Terminal (HHT) may form a temporary point-to-point connection for commissioning and service activities. See further description herein and U.S. patent application Ser. No. 13/296,552 filed on Nov. 15, 2011, entitled "METHOD FOR SECURELY COMMUNICATING ACROSS MULTIPLE NETWORKS USING A SINGLE RADIO," which is incorporated herein by reference in its entirety In a particular embodiment, in order to address individual devices on the HAN (including the Comms Hub), the devices must be identified. Accordingly, each HAN device has an identifier, e.g., EUI-64 identifier, assigned to it by the manufacturer. This identifier is used as the HAN long device address. ZigBee devices select a short, 16 bit HAN short device address.

The Comms Hub selects a random 16 bit PAN-ID. The PAN-ID differentiates one Comms Hub network from another Comms Hub network in the neighborhood. The PAN ID can be read by the HES.

Similarly, for WAN Addressing the Comms Hub has a 15 digit IMSI that contains the Mobile Country Code, the Mobile Network Code and the MSIN. The MSIN is the individual subscriber identifier of the Comms Hub. The IMSI is used to authenticate the Comms Hub to the mobile operator. The IMSI is used by the HES to address SMS messages to a Comms Hub. The Comms Hub has an IP address, e.g., IPv4 address, which is used by the IP Network layer of the WAN protocol stack to communicate with the HES. The HES has one or more IP addresses, e.g., IPv4 addresses, and one or more fully qualified domain names. The multiple addresses and the domain name are used to load balance the network traffic and to differentiate energy service providers. The Comms Hub can be configured with the fully qualified domain name. It uses the domain name to call the DNS to resolve it into an IP address. When the HES sends a SMS message to the mobile operator's API, the operator sends the message from a trusted number. The trusted number is used by the Comms Hub to identify that the SMS message is from a qualified source. The Comms Hub is configured with up to three trusted numbers.

Figure 6:
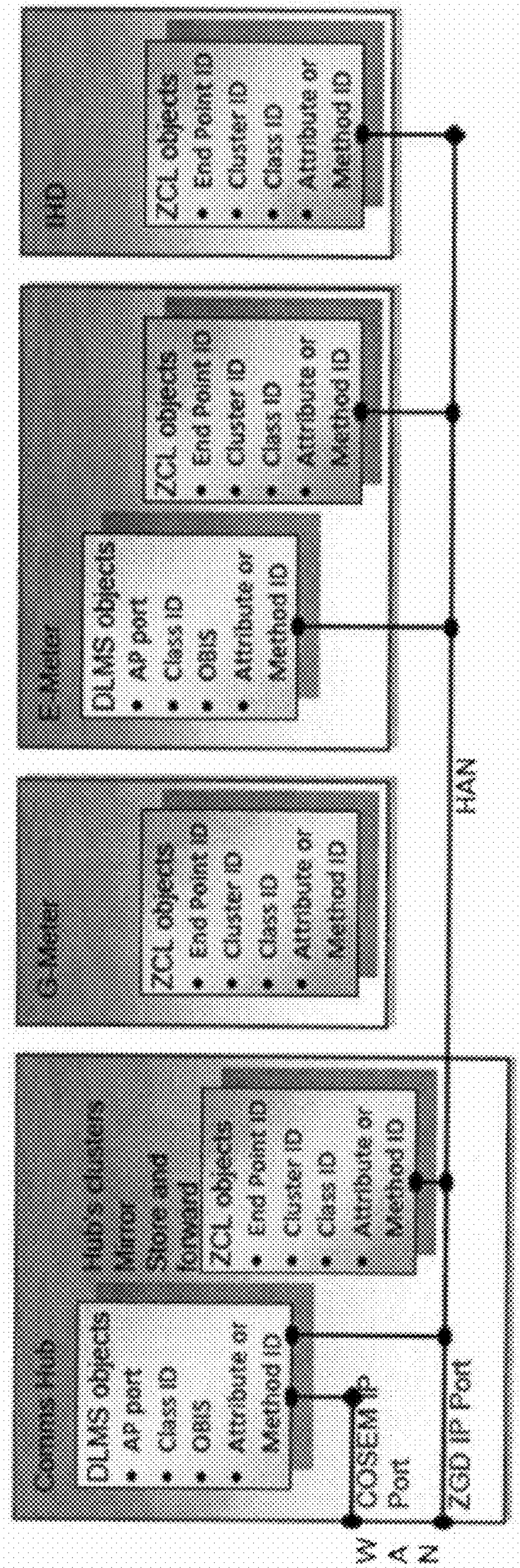
FIG. 6 is an exemplary HES to Comms Hub DLMS objects communication flow diagram.

Referring to FIG. 6 the HES may communicate with any Comms Hub DLMS objects through the COSEM IP port, 4059, or through ZigBee Gateway DLMS calls. The Comms Hub implements the gateway option. The HES uses a second port, the ZGD IP port 17756, to communicate with the Comms Hub ZigBee objects. The ZGD port is also used to communicate with the HAN devices. DLMS messages sent to the HAN devices use the ZigBee DLMS Tunnel cluster to transmit across the HAN. ZigBee ZCL devices used the native ZigBee protocol across the HAN.

The ZigBee Gateway specification used by the HES implements Gateway Remote Interface Protocol (GRIP) Remote Procedure Calls (RPC) and the ZCL function category. The ZigBee Gateway components implemented by the Comms Hub are the GRIP Remote Procedure Calls and the ZigBee Cluster Library (ZCL) functions. The ZCL interface of the ZigBee Gateway allows interaction with any: ZigBee device including the Comms Hub itself through the use of EUI-64; ZigBee End Point supported on each device through the use of the End Point ID; Clusters implemented on each End Point through the use of the Cluster ID. This includes the ZigBee DLMS tunneling cluster to access DLMS objects on a remote ZigBee device; Classes within these Clusters through the use of the Class ID; and Attributes or Methods within these Classes through the use of the Attribute or Method ID.

The Gateway Remote Interface Protocol (GRIP) is a lightweight Remote Procedure Call (RPC) protocol used for calling a remote function and retrieving the results between a Comms Hub and a Host Application. Each GRIP frame consists of the following components: a GRIP Header which comprises frame controls and RPC controls and a GRIP Payload which contains information specific to the frame type. The GRIP Frame Format is shown in Table 1.

TABLE 1

| Octet: 1 | 1 | 2 | 1 | 1 | 0/2 | 2 | 0/2 | Variable |
|---|---|---|---|---|---|---|---|---|
| Version | Frame control | Transaction identifier | Function domain | Function category | Manufacturer code | Function identifier | RPC status | RCP payload |
| General header | | | RPC function identification fields | | | | RPC function payload | |
| GRIP Header | | | | | | | GRIP Payload | |

The GRIP Header is sub-divided into a general header and a RPC function identification fields. The fields of the GRIP header appear in a fixed order as listed below: the Version field is 8-bits in length and specifies the version of the GRIP used by the sender of the frame (value of the version shall be set to 0x00); the Frame control field is 8-bits in length, set to 0x01 if the frame is a request to a GRIP entity, set to 0x02 if the frame is a response to a prior request; the Transaction identifier which is used to match a frame of type response with a frame of type request on the same communication channel between the same entities and is selected by the originator of the request and shall be unique for this request until the response is received or the transaction failed; the Function domain which specifies the scope of the API used to identify the function (field shall be set to 0x01); the Function category field is 8-bits in length and specifies the category of an RPC function (this field may have the values shown in Table 2); the Manufacturer code field is 16-bits in length and specifies the assigned manufacturer code for proprietary extensions to GRIP (field shall only be included in the frame if the function category field of the frame is set to 0x00); the Function identifier field is 16-bits in length and specifies a unique identifier for a function; the RPC status field specifies the status of the function which has been called in a prior request (The success value is unique and indicates that the prior request associated with this response was successfully received and well formatted, that the function in this request has been successfully performed and that the payload of the response contains the result of the function. It does not have any relation with the content of the function itself. This field is present only in frames of type response. The RPC status field may have the values shown in Table 3); and the payload field is of a variable number of octets in length and contains information specific to individual frame types.

TABLE 2

| Function category | Value | Description |
|---|---|---|
| Manufacturer | 0x00 | Manufacturer extensions |
| ZCL | 0x03 | Zigbee ZCL application layer |

TABLE 3

| RPC status | Value | Description |
|---|---|---|
| SUCCESS | 0x0000 | An RPC operation has been executed successfully |
| CONNECTION_CLOSED | 0x0100 | The connection with a remote entity has been closed during an RPC operation |
| RPC_TIMEOUT | 0x0101 | The maximum duration allowed for an RPC operation elapsed without returning the results of the function that was called |

TABLE 3-continued

| RPC status | Value | Description |
|---|---|---|
| TRANSACTION_ERROR | 0x0200 | A GRIP request is received with a "Transaction identifier" which already matches a function being performed by the Next Higher Layer Entity on this entity |
| FUNCTION_TIMEOUT | 0x0201 | The maximum duration allowed to wait for the execution of a function on the local entity where the function is performed elapsed |
| UNSUPPORTED_FUNCTION | 0x0300 | The RPC header of a GRIP request which has been received refers to a function that is not supported by this entity |

TABLE 3-continued

| RPC status | Value | Description |
|---|---|---|
| BAD_PARAM_FORMAT | 0x0301 | The parameters received to execute the function have a bad format |
| FUNCTION_ERROR | 0x0302 | Any error occurring in the Next Higher Layer Entity when attempting to perform the function and retrieve its results which differs from the UNSUPPORTED_FUNCTION and the BAD_PARAM_FORMAT error status. |

The SendDLMSCommand procedure is used to send and receive DLMS APDU in a generic manner. Table 4 shows the value assigned to the different fields of the GRIP protocol for the SendDLMSCommand request and response.

TABLE 4

| GRIP frame field | Request | Response |
|---|---|---|
| Version | 0x00 | 0x00 |
| Transaction identifier | Present | Present |
| Frame control | 0x01 | 0x02 |
| Function domain | 0x01 | 0x01 |
| Function category | 0x00 | 0x00 |
| Manufacturer code | 0x10C7 | 0x10C7 |
| Function identifier | 0x0000 | 0x0000 |
| RPC status | Not present | Present |
| RCP payload | DlmsCommandParams | DlmsCommandResults |

The SendDLMSCommand request and response is defined by the ASN.1 definitions as shown in FIG. 7. These structures are encoded using the Distinguished Encoding Rules (DER) as defined by the X.690 standard which is known to those skilled in the art.

The DlmsCommandParams ASN.1 definition describes the structure of the RCP payload of a SendDLMSCommand request. The different fields supported by this structure are listed in Table 5.

TABLE 5

| Name | Status | Type | Valid Range | Description |
|---|---|---|---|---|
| timeout | M | 32-bit unsigned integer | 0x00000000-0xffffffff | Maximum period, in milliseconds, this procedure will block before returning a response. Set to 0xffffffff to disable this timeout, to wait for an infinite amount of time. |
| address | M | 64-bit IEEE address | Any 64-bit, IEEE address | The extended address of the target device. |
| data | M | Octet String | DLMS APDU | This field contains the DLMS wrapper follow by the DLMS payload. |

The DlmsCommandResults ASN.1 definition describes the structure of the RCP payload of a SendDLMSCommand response. The different fields supported by this structure are in Table 6.

TABLE 6

| Name | Status | Type | Valid Range | Description | |
|---|---|---|---|---|---|
| status | M | 8-bit unsigned Integer | 0 to 255 | 0x00 | SUCCESS, Indicates that a function successfully completed. |
| | | | | 0x01 | TIMEOUT, Indicates that the amount of time to complete the processing task was longer than the amount of time limited by the timeout parameter |
| | | | | 0x02 | GENERAL ERROR, Indicates that a general error occurred and the function did not complete successfully. |
| | | | | 0x03 | PARAMETER_MISSING, Indicates that one or more required parameters were missing from the request. |
| | | | | 0x04 | PARAMETER_INVALID_VALUE, Indicates that one or more supplied parameters had an invalid value. |
| | | | | 0x05 | NETWORK_NOT_READY, Indicates that the ZigBee interface is not in a state to process the request. |
| | | | | 0x06 | EMPTY, Indicates that there are no results to be retrieved. |
| | | | | 0x07 | NOT_ALLOWED, Indicates that the action requested by the function is not allowed |
| | | | | 0x08 | MEMORY_ERROR, Indicates that the function has not been successfully completed due to a memory error |
| | | | | 0x09 | APS_FAILURE, Indicates a specific APS error |
| | | | | 0x0A | NETWORK_FAILURE, Indicates a network error. |

TABLE 6-continued

| Name | Status | Type | Valid Range | Description |
|---|---|---|---|---|
| data | M | Octet String | DLMS APDU | This field contains the DLMS wrapper follow by the DLMS payload. |

The SendZCLCommand procedure is invoked by a Host Application to send an arbitrary DLMS APDU to or through the Comms Hub. Upon invocation of the SendZCLCommand procedure, the Comms Hub shall ignore supplied parameters that are neither mandatory nor optional. Next the Comms Hub shall validate that all mandatory parameters are supplied. If one or more mandatory parameters are not supplied then it shall return a Status result of PARAMETER_MISSING. Next the Comms Hub shall validate that all supplied parameters have a valid value. If one or more parameters have an invalid value then it shall return a Status result of PARAMETER_INVALID_VALUE. The Comms Hub shall then assemble the DLMS request and forward it to the specified destination. On reception of the corresponding DLMS response, the Comms Hub assembles the SendZCLCommand response and forwards it to the Host Application. The Host Application operates in a synchronized mode. This means that the Host Application, after the transmission of it request, block until the reception of a response. A TIMEOUT status shall be returned by the Comms Hub if the total time of the processing task exceeds the timeout value specified in the SendZCLCommand request.

Figure 8A:
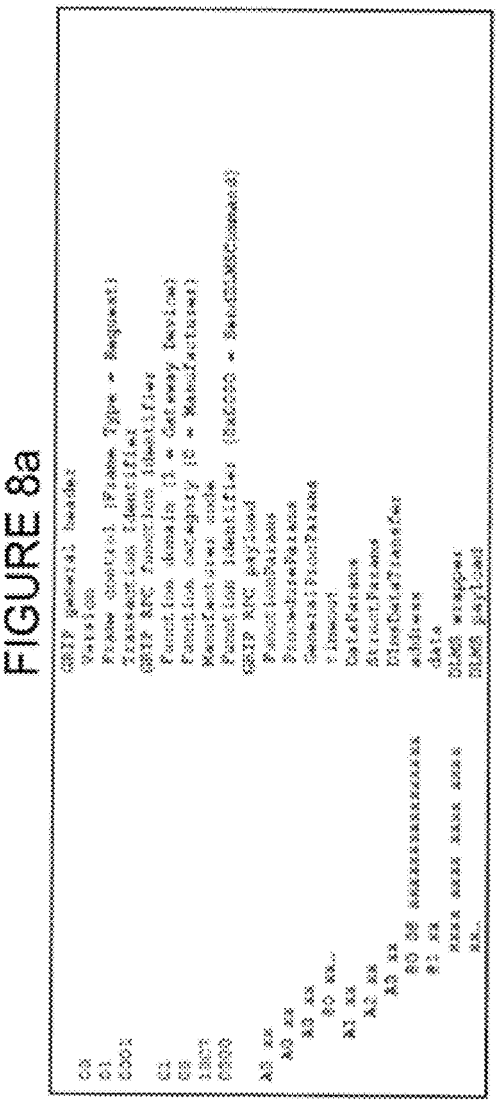
FIGS. 8*a*-8*b* are exemplary SendDLMSCommand requests/responses byte streams.
Figure 8B:
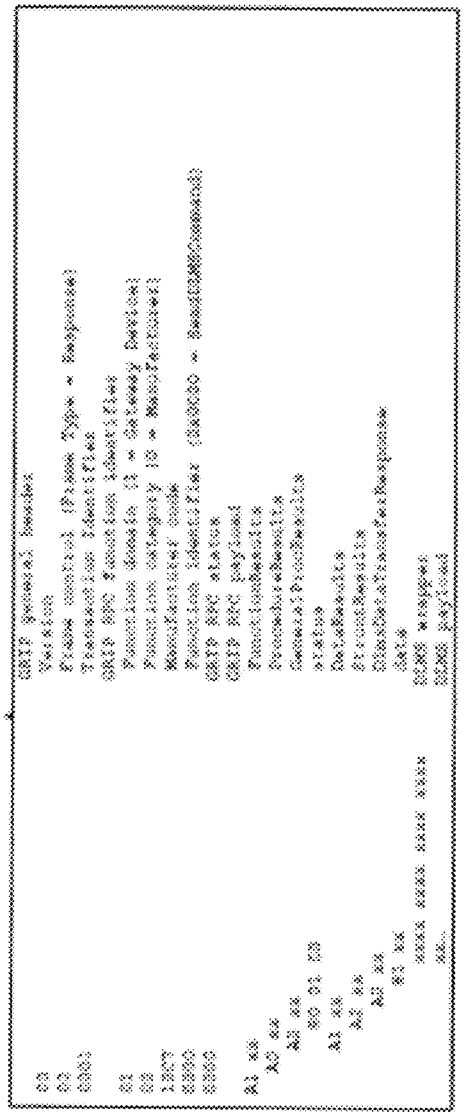

The byte streams set forth in FIGS. 8*a* (request) and 8*b* (response) show typical, but exemplary SendDLMSCommand requests/responses. Not all possible fields are shown and some optional fields might be removed. The byte stream is represented in the left column and the right column contains a short description. Value "xx" represents an octet and the value "xx . . . " represents an octet string. Fields defined in are encoded in DER as tag, length and value as defined by the X.690 standard.

The SendZCLCommand procedure is used to send and receive ZCL commands in a generic manner. Table 7 shows the value assigned to the different fields of the GRIP protocol for the SendZCLCommand request and response.

TABLE 7

| GRIP frame field | Request | Response |
|---|---|---|
| Version | 0x00 | 0x00 |
| Transaction identifier | Present | Present |
| Frame control | 0x01 | 0x02 |
| Function domain | 0x01 | 0x01 |
| Function category | 0x03 | 0x03 |
| Manufacturer code | Not present | Not present |
| Function identifier | 0x0300 | 0x0300 |
| RPC status | Not present | Present |
| RCP payload | ZCLCommandParams | ZCLCommandResults |

Figure 9:
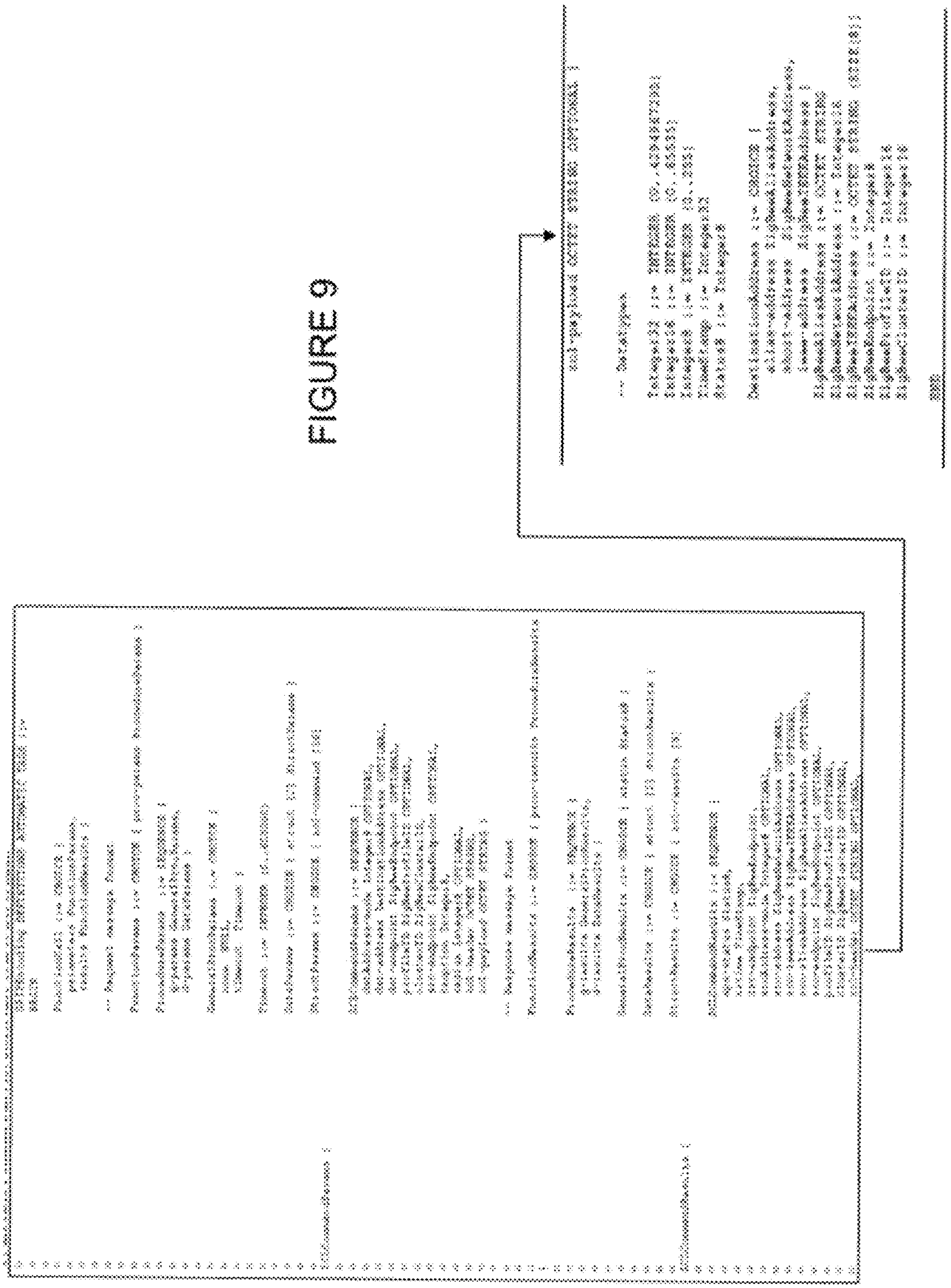
FIG. 9 is an exemplary SendZCLCommand procedure request and response format.

The SendZCLCommand procedure request and response is defined by the ASN.1 definitions shown in FIG. 9. These structures are encoded using the Distinguished Encoding Rules (DER) as defined by the X.690 standard ZCLCommandParams.

The ZCLCommandParams ASN.1 definition describes the structure of the RCP payload of a SendZCLCommand request. The different fields supported by this structure are in Table 8.

TABLE 8

| Name | Status | Type | Valid Range | Description |
|---|---|---|---|---|
| timeout | M | 32-bit unsigned integer | 0x00000000-0xffffffff | Maximum period, in milliseconds, this procedure will block before returning a response. Set to 0xffffffff to disable this timeout, to wait for an infinite amount of time. |
| dstAddress-mode | O | Integer | 0x00-0xff | The addressing mode used for the DestinationAddress parameter.<br>0x02 = 16-bit address<br>0x03 = 64-bit extended address<br>If this parameter is omitted then it is assumed that a binding table entry exists in the Comms Hub that determines the destination. |
| dst-address | O | Address | As specified by the DstAddrMode parameter | If this parameter is omitted then it is assumed that a binding table entry exists in the Comms Hub that determines the destination. |
| dst-endpoint | O | Endpoint ID | Any valid endpoint ID | The identifier for the endpoint on the destination device to which the ZCL command is directed. If this parameter is omitted then it is assumed that a binding table entry exists in the Comms Hub that determines the destination endpoint. |
| profileID | O | 16-bit Integer | Any valid profile ID | The ZigBee application profile under which the contents of this ZCL command are to be interpreted. |
| clusterID | M | 16-bit Integer | Any cluster ID | The cluster identifier associated to the ZCL command to send. |
| src-endpoint | O | Endpoint ID | Any valid endpoint ID | The source endpoint on the ZigBee Gateway for ZCL command. |
| txoption | M | Bitmap | 0000 xxxx (Where x can be 0 or 1) | The transmission options for the ASDU to be transferred. These are a bitwise OR of one or more of the following:<br>0x01 = Security enabled transmission<br>0x02 = Use NWK key<br>0x04 = Acknowledged transmission<br>0x08 = Fragmentation permitted |

TABLE 8-continued

| Name | Status | Type | Valid Range | Description |
|---|---|---|---|---|
| radius | O | Integer | Any number up to the maximum radius of the network. | The distance, in hops, that a transmitted frame will be allowed to travel through the network. |
| zcl-header | M | Octet String | ZCLHeader | General ZCL Frame Format as defined in Zigbee Cluster Library Specification incorporated herein by reference |

TABLE 8-continued

| Name | Status | Type | Valid Range | Description |
|---|---|---|---|---|
| zcl-payload | M | Octet string | Any valid ZCL command | Frame payload as defined in Zigbee Cluster Library Specification incorporated herein by reference |

The ZCLCommandResults ASN.1 definition describes the structure of the RCP payload of a SendZCLCommand response. The different fields supported are in Table 9.

TABLE 9

| Name | Status | Type | Valid Range | Description |
|---|---|---|---|---|
| status | M | 8-bit unsigned Integer | | 0x00 SUCCESS, Indicates that a function successfully completed.<br>0x01 TIMEOUT, Indicates that the amount of time to complete the processing task was longer than the amount of time limited by the Timeout parameter<br>0x02 GENERAL ERROR, Indicates that a general error occurred and the function did not complete successfully.<br>0x03 PARAMETER_MISSING, Indicates that one or more required parameters were missing from the request.<br>0x04 PARAMETER_INVALID_VALUE, Indicates that one or more supplied parameters had an invalid value.<br>0x05 NETWORK_NOT_READY , Indicates that the ZigBee interface is not in a state to process the request.<br>0x06 EMPTY, Indicates that there are no results to be retrieved.<br>0x07 NOT_ ALLOWED, Indicates that the action requested by the function is not allowed<br>0x08 MEMORY_ERROR, Indicates that the function has not been successfully completed due to a memory error<br>0x09 APS_FAILURE, Indicates a specific APS error<br>0x0A NETWORK_FAILURE , Indicates a network error |
| aps-status | M | Status Enumeration | Any valid status | The Status reported by APSDE-DATA.indication that delivered the ZCL command.<br>Note that if this parameter has any other value than SUCCESS then none of the optional parameters below are delivered. |
| rxtime | O | Integer | Implementation specific | A time indication for the received packet based on the local clock. |
| dst-endpoint | O | Endpoint ID | Any valid endpoint | The endpoint on the Comms Hub to which the ZCL command was directed. |
| srcAddress-mode | O | Integer | 0x00-0xff | The addressing mode for the source address used.<br>0x02 = 16-bit short address<br>0x03 = 64-bit extended address |
| src-address | O | Address | As specified by the Source-AddressMode | The ZCL response command frame was sent from this address. |

TABLE 9-continued

| Name | Status | Type | Valid Range | Description |
|---|---|---|---|---|
| src-ieeeAddress | O | 64-bit IEEE address | Any 64-bit, IEEE address | The extended address of the source device if it is known in the Comms Hub address manager tables. |
| src-aliasAddress | O | Octet String | | This field is not supported. |
| src-endpoint | O | Endpoint ID | Any valid endpoint ID | An identifier for the endpoint on the sending device that issued the command. |
| profileID | O | 16-bit Integer | Any valid ZigBee profile ID | An identifier for the profile under which this command is to be interpreted. |
| clusterID | O | 16-bit Integer | Any valid cluster ID. | An identifier for the cluster under which this command is to be interpreted. |
| zcl-header | O | Octet String | | General ZCL Frame Format as defined in Zigbee Cluster Library Specification, ZigBee Document 075123r03ZB section 2.3.1. |
| zcl-payload | O | Octet string | Any valid ZCL command | Frame payload as defined in Zigbee Cluster Library Specification, ZigBee Document 075123r03ZB section 2.3.1. |

The SendZCLCommand procedure is invoked by a host application to send an arbitrary ZCL frame to or through the Comms Hub. Upon invocation of the SendZCLCommand procedure, the Comms Hub shall ignore supplied parameters that are neither mandatory nor optional. Next the Comms Hub shall validate that all mandatory parameters are supplied. If one or more mandatory parameters are not supplied then it shall return a Status result of PARAMETER_MISSING. Next the Comms Hub shall validate that all supplied parameters have a valid value. If one or more parameters have an invalid value then it shall return a Status result of PARAMETER_INVALID_VALUE. The Comms Hub shall then assemble the ZCL request and forward it to the specified destination. On reception of the corresponding ZCL response, the Comms Hub assembles the ZCLCommandResults and forwards it to the Host Application. The Host Application operates in a synchronized mode. This means that the Host Application, after the transmission of it request block until the reception of a response. A TIMEOUT status shall be returned by the Comms Hub if the total time of the processing task exceeds the timeout value specified in the SendZCLCommand request.

Figure 10A:
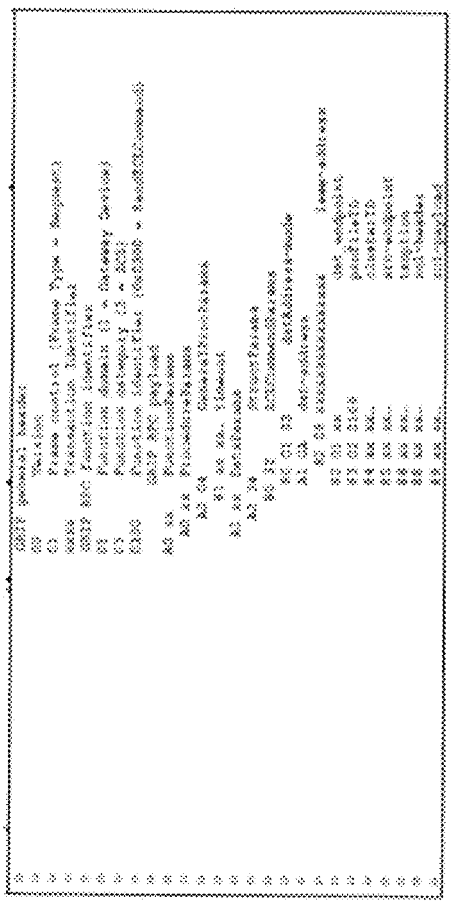
FIGS. 10*a*-10*b* are exemplary SendZCLCommand procedure requests/responses byte streams.
Figure 10B:
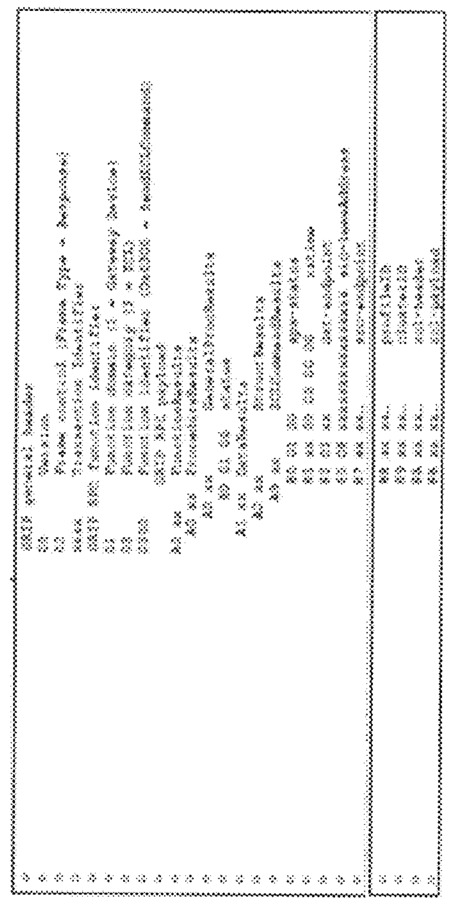

The byte streams set forth in FIGS. 10*a* (request) and 10*b* (response) show typical, but exemplary SendZCLCommand requests/responses. The byte streams shows in this section are just examples, not all possible fields are shown and some optional fields might be removed. The byte stream is represented in the left column and the right column contains a short description. Value "xx" represents an octet and the value "xx . . . " represents an octet string. Fields defined in ASN.1 are encoded in DER as tag, length and value as defined by the X.690 standard.

Figure 11:
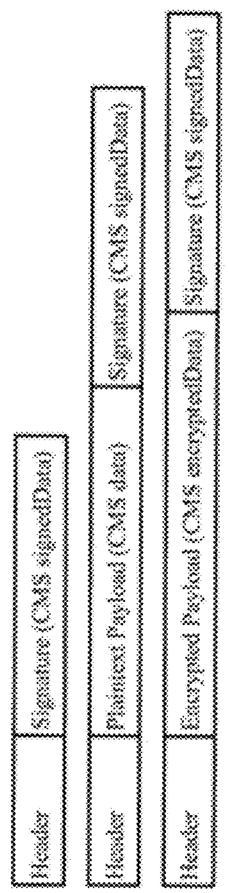
FIG. 11 is an exemplary digital envelope format.

Digital Envelopes are used to transfer information between the HES and the Comms Hub without establishing a TLS session. Digital Envelopes are transferred using UDP datagram. Each Digital Envelope consists of: A mandatory header as defined by the DigitalEnvelopHeader ASN.1 definition; An optional DigitalEnvelopPayload encoded as a CMS Data content type if not encrypted or as a CMS EnvelopedData content type if encrypted; and A mandatory signature encoded as a CMS SignedData. FIG. 11 is illustrative of these combinations.

The Digital Envelope Header is defined by this ASN.1 syntax shown in FIG. 12.

The Digital Envelop Header supports the following fields: Digital Envelope version number (0x01: Current version as defined in this section); reasonCode which identifies the purpose and type of message sent (see Table 10 below); commsHubMacAddress including MAC address of the sending Comms Hub; sequenceNumber including Unique number assigned to each Digital Envelope sent by the Comms Hub (For Acknowledgements Digital envelope sends by the Head End System, this field is set to the sequence number of the Digital Envelope acknowledged); deviceMacAddress including MAC address of the device that supplied the data included in the Digital Envelope (For example, a daily meter report by the Comms Hub uses the meter's MAC address in the deviceMacAddress field as does an alarm report associated with this meter. This field is not present for information directly reported by the Comms Hub); tokenId present in a "SMS wakeup response" or a "Callback response" Digital Envelope if a taken ID has been provided in the corresponding SMS wakeup or with a callback previously setup in an "Acknowledgment" Digital Envelope; pushCertificateSN including Serial number of the Push certificate currently available in the Comms Hub (This information is required by the HES to sign the acknowledgment with the appropriate key); currentTime including Current UTC time of the HES; timezoneID including Identifier of the timezone where this Comms Hub is installed (This information is required by the HES to return the appropriate DST information; field is available in the Digital Envelop only if previously configured); callbackTime which is an Optional field set if a callback to a service is required (This option is used by the Head End system to postpone the processing of a transaction with the Comms Hub outside to data acquisition period); callbackTokenId which is an Optional field used in conjunction with the callbackTime (When set, this identifier is included in the "Callback Response" Digital Envelop; field can be used by the service processing a callback to retrieve the initial reason of this scheduled call; callbackIpAddress which is an Optional field used in conjunction with the callbackTime (The requestor of a callback may use this field to specify the IP address of the service waiting for the callback or the requestor may set the domainName field or rely on the default address setting of the Comms Hub); callbackDomainName which is an Optional field used in conjunction with the callbackTime (The requestor of a callback may use this field to specify the fully qualified domain name of the service waiting for the callback or the requestor may set the IPAddress field or rely on the default address setting of the Comms Hub); callbackPortNum which is an Optional field used in conjunction with the callbackTime (The requestor of a callback may use this field to specify the IP port of the service waiting for the callback); dstStart including Start date and time of the current or next Daylight Saving Time period; and dstEnd including End date and time of the current or next Daylight Saving Time period (The dstStart and dstEnd are updated once a year prior to the Daylight Saving Time period).

TABLE 10

| | |
|---|---|
| 0x06: | SMS Wakeup Response |
| 0x07: | Switch GSM Network Test |
| 0x08: | Callback Response |
| 0x09: | Commission Request |
| 0x0A: | OTA Status Report |
| 0x0B: | OTA Image Request Alert |
| 0x0C: | Decommission Request |
| 0x11: | E-Meter Report |
| 0x12: | G-Meter Report |
| 0x13: | IHU Report |
| 0x14: | Comms Hub Report |
| 0x21: | E-Meter High Priority Report |
| 0x22: | G-Meter High Priority Report |
| 0x23: | IHU High Priority Report |
| 0x24: | Comms Hub High Priority Report |
| 0x31: | E-Meter Alarm |
| 0x32: | G-Meter Alarm |
| 0x33: | IHU Alarm |
| 0x34: | Comms Hub Alarm |
| 0xFF: | Acknowledgement |

The Digital Envelop Header is encoded using the Distinguished Encoding Rules (DER). An exemplary byte stream is shown in FIG. 13.

Digital Envelop Payload is defined by the ASN.1 syntax shown in FIG. 14. Each DigitalEnvelopePayload is composed of zero, one or more PayloadContent. Each PayloadContent transport has either DLMS or ZCL content.

The dlmsContent data structure is used to include in a Digital Envelop a list of DLMS attributes. Each dlmsContent contains: sourceAP which is Application Process at the origin of this information; destinationAP which is Application Process within the Head End System responsible of processing this information (This field is optional, when not included this information is processed by the default Head End System Application Process); dlmsAttributes which is Sequence of one or more DLMS attributes, each one encoded as shown in Table 11 below.

TABLE 11

| | |
|---|---|
| class-id: | DLMS Interface Class identifier |
| instance-id: | DLMS OBIS code |
| attribute-id: | DLMS attribute identifier |
| value: | DLMS attribute value encoded in A-XER |

The dlmsContent is encoded using the Distinguished Encoding Rules (DER) as shown in FIG. 15.

The zclContent data structure is used to send ZCL commands or ZCL attributes in a Digital Envelope. ZCL attributes are encoded using the standard ZCL "Report attributes" command, carrying one or multiple attributes. Attributes reported by the "Report attributes" command shall all originate from the same End Point, Cluster and all been either standard or manufacturer. When attributes from different End Points and/or Clusters need to be transferred, multiple ZclContent are included in the same Digital Envelope. Each zclContent contains: clusterIdentifier which is ZigBee Cluster ID at the origin of this information; sourceEndpoint which is Endpoint at the origin of this information; destinationEndpoint which is Endpoint within the Head End System responsible of processing this information (This field is optional, when not included this information is processed by the default process); zclCommands including one or more ZCL commands as defined in the ZigBee Cluster Library each ZCL command has the format as shown in Table 12.

TABLE 12

| | |
|---|---|
| frameControl: | ZigBee ZCL "Frame Control" field. |
| manufactureCode: | ZigBee "Manufacture Code" field, present only if the "Manufacturer Specific" flag within the "Frame Control" field is set. |
| transactionSeqNum: | ZigBee ZCL "Transaction Sequence Number" field. This field is not processed and can be set to any value. |
| commandId: | ZigBee ZCL Command ID. |
| commandContent: | ZCL command payload. |

Each zclContent is encoded using the Distinguished Encoding Rules (DER) as shown in FIG. 16.

The CMS Data content type is used to carry a DigitalEnvelopePayload when not encrypted. The structure of the CMS Data is defined in RFC 5652 using the ASN.1 syntax as shown in FIG. 17. The CMS Data content type is encoded using the Distinguished Encoding Rules (DER) as shown in FIG. 18.

The CMS EncryptedData content type is used to carry an encrypted DigitalEnvelopePayload. The structure of the CMS EncryptedData is defined in RFC 5652 and relies on data types and Object Identifiers (OID) defined in a variety of other standards. The equivalent ANS.1 definition describes EncryptedData content type options used and is shown in FIG. 19. The CMS EncryptedData content type is encoded using the DER encoding rules. The CMS EncryptedData content type produces the byte stream as shown in FIG. 20. This process uses the AES-128 CBC mode as described in RFC 3565.

Figure 21:
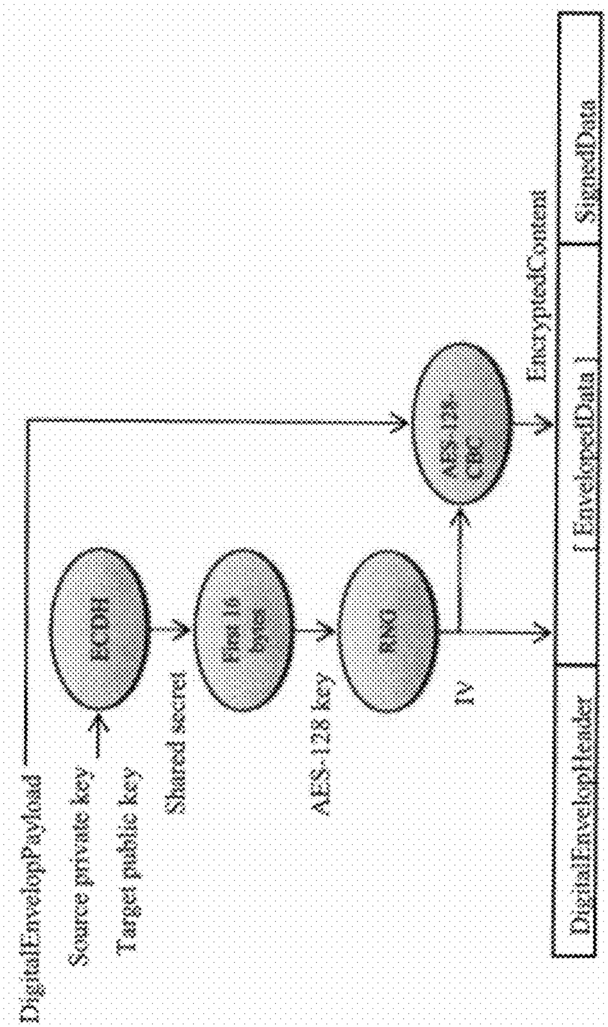
FIG. 21 is an exemplary EnvelopeData encryption structure.

The EnvelopeData encryption structure is shown in FIG. 21. The steps of the encryption process include 1. A ContentInfo structure containing an EncryptedData is constructed.
2. A shared secret is created using the ECDH key derivation function.
3. Shared secret←ECDH(Source private key, Target public key)
4. The EAS-128 key is created using the first 16 bytes of the shared secret.
5. A Random Number Generator is used to create a 16 bytes Initial Vector (IV)
6. The DigitalEnvelopePayload is encrypted using AES-128-CBC algorithm. EncryptedContent←AES-128-CBC(EAS-128 key, IV, DigitalEnvelopePayload)
7. The output of the AES-128-CBC algorithm in placed in the EncryptedContent field.

Figure 22:
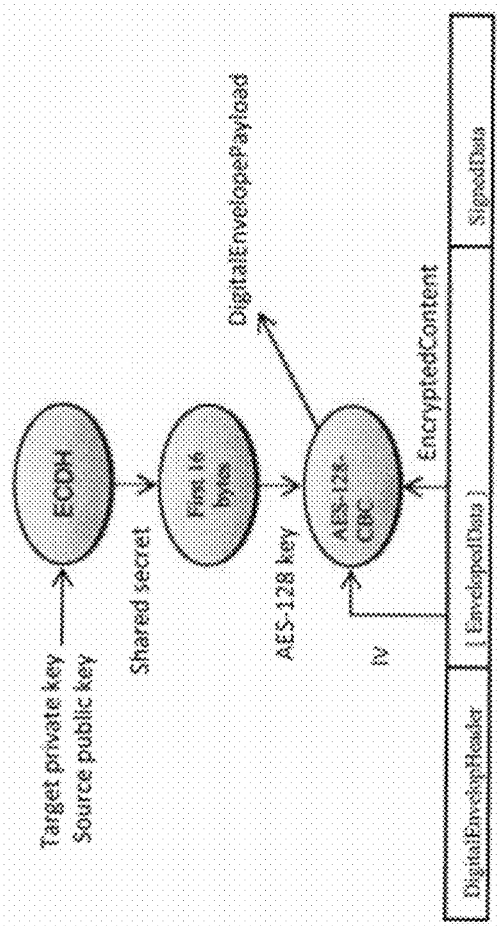
FIG. 22 is an exemplary process for decrypting the DigitalEnvelopePayload included in an EncryptedData content type.

The DigitalEnvelopePayload included in an EncryptedData content type is decrypted as shown in FIG. 22. The steps of the decryption process include:

1. A shared secret is created using the ECDH key derivation function.
2. Shared secret←ECDH(Target private key, Source public key)

3. The EAS-128 key is created using the first 16 bytes of the shared secret.
4. The IV field and the EncryptedContent are extracted from the EnvelopeData
5. The DigitalEnvelopePayload is decrypted using the AES-128-CBC function. DigitalEnvelopePayload←AES-128-CBC(EAS-128, IV, EncryptedContent)

Figure 23:
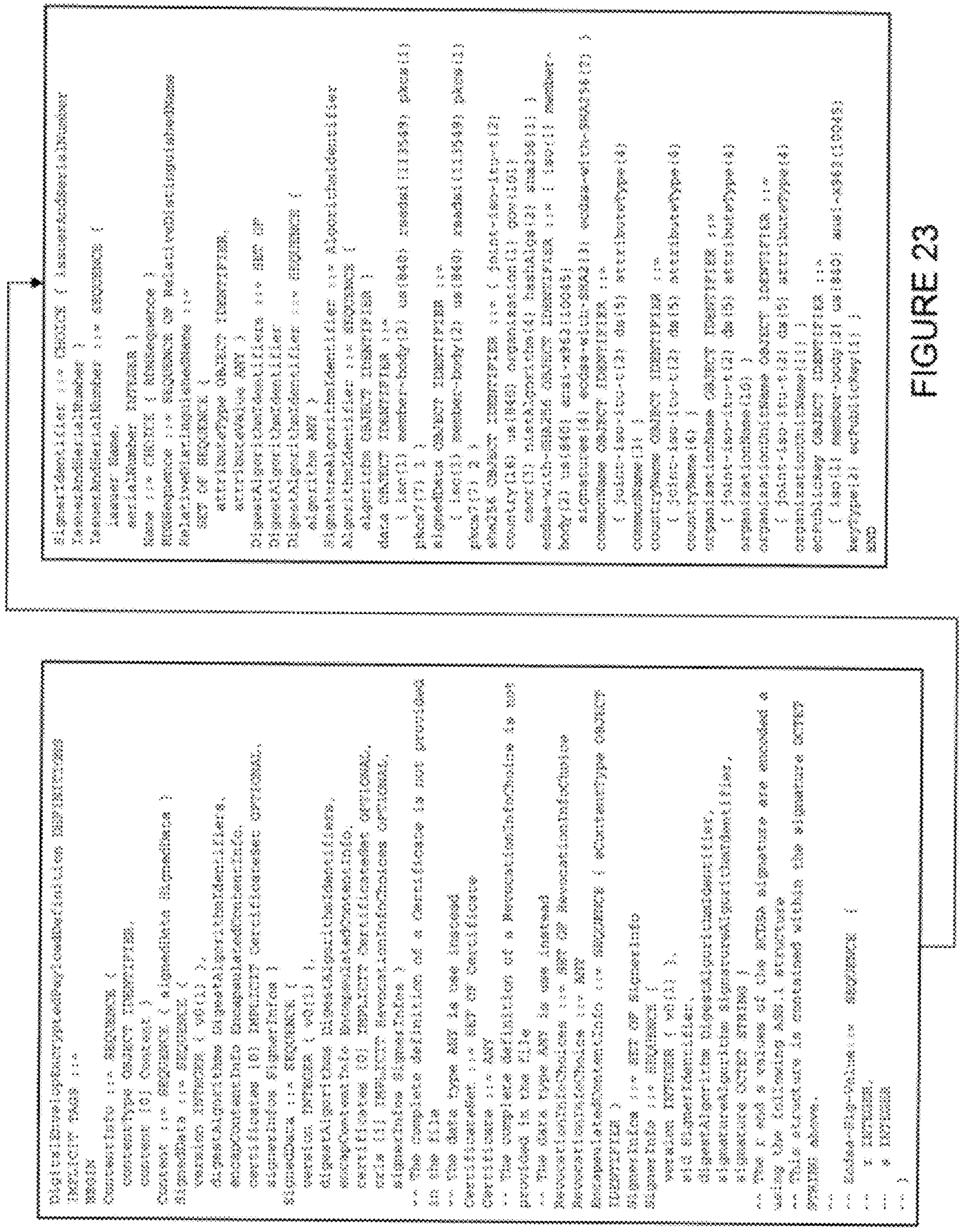
FIG. 23 is an exemplary SignedData content type definition.

The CMS SignedData content type is used to sign Digital Envelopes. This digital signature is used to verify the integrity of a Digital Envelope and authenticate the source of this information. The structure of the CMS SignedData is defined in RFC 5652 and relies on data types and Object Identifiers (OID) defined in a variety of other standards. The ASN.1 definition shown in FIG. 23 describes the SignedData content type used. CMS SignedData content type is encoded using the Distinguished Encoding Rule(DER). When used with the ECDSA signing algorithm, the Prime256v1 elliptic curve and the SHA256 message digest, the CMS SignedData content type produce the byte stream shown in FIG. 24.

Figure 25:
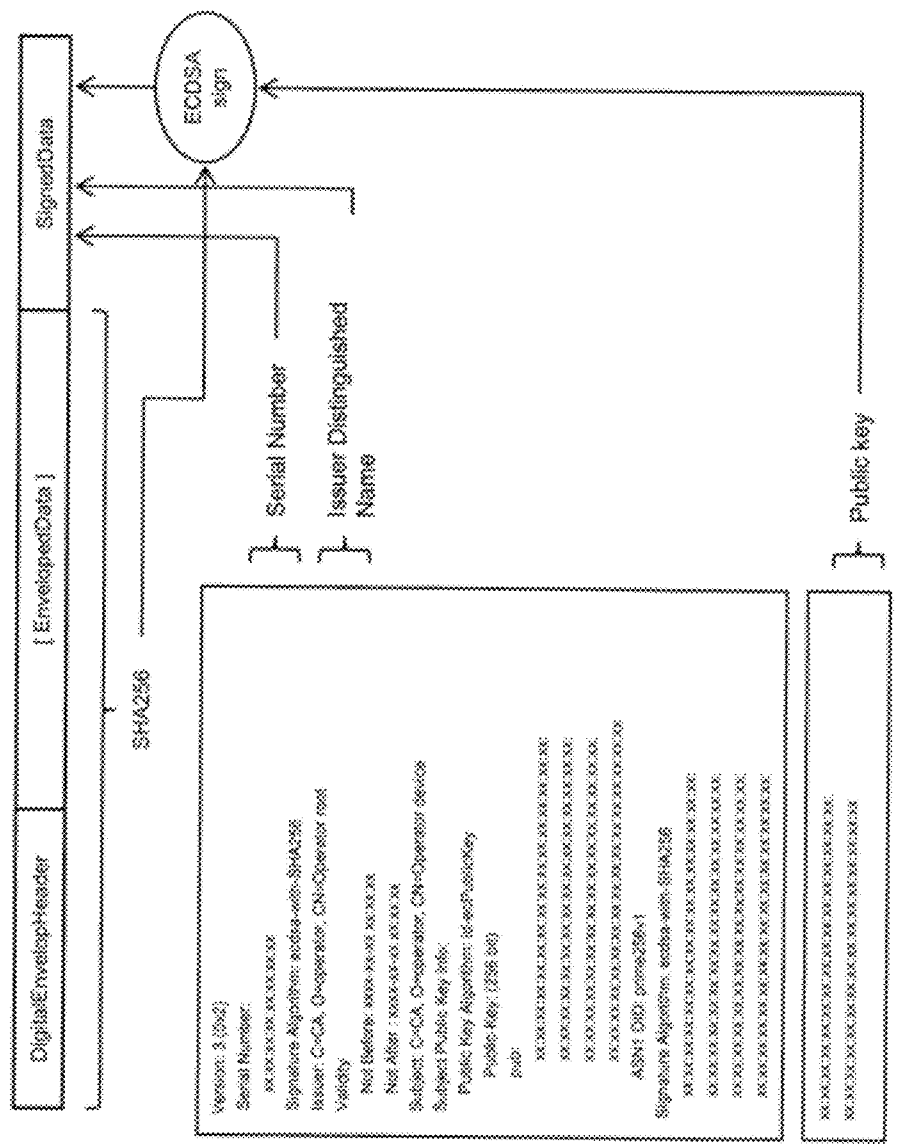
FIG. 25 is an exemplary process for constructing a SignedData structure.

The SignedData structure is constructed as follows and shown in FIG. 25:

1. The issuer field of the SignedData structure just created is set to the issuer distinguish name and serial number of the certificate associated to the private key used for signing.
2. A SHA256 message digest is computed on the DigitalEnvelopHeader and Data content type or EnvelopedData content type if present.
3. The ECDSA signature is computed using the private key corresponding to the issuer distinguish name and serial number used in step #2 and the result of the message digest computed in step #3.
4. The signature computed is set in the SignatureValue field of the signature data structure. ECSA signatures are composed of two fields (r, s), these values are encoded in BER accordingly to the “Ecdsa-Sig-Value” ASN.1 syntax.

Figure 26:
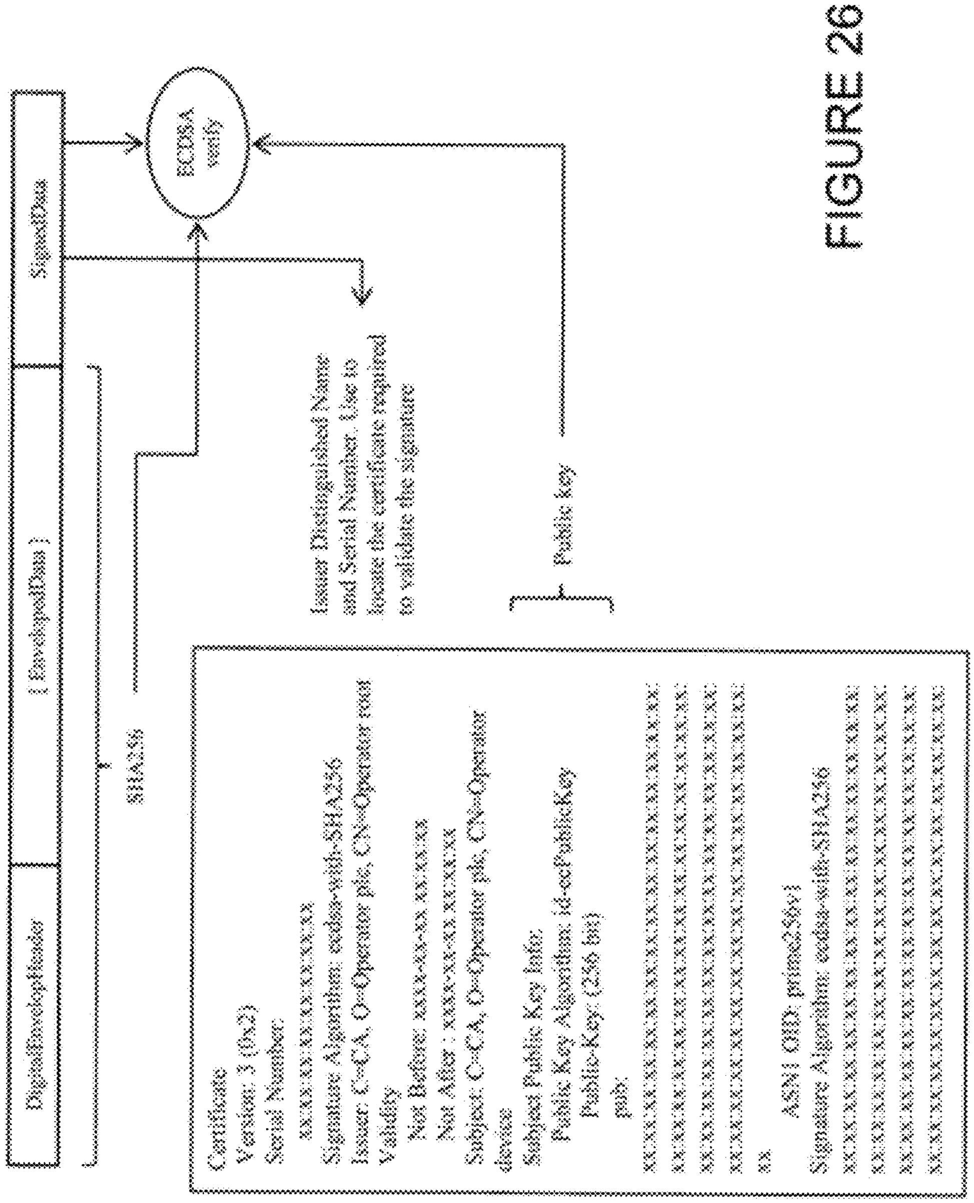
FIG. 26 is an exemplary process for verifying signature of received Digital Envelopes.

The signature of each Digital Envelope received is verified in accordance with the following process and shown in FIG. 26:

1. The Serial Number and Issuer distinguished name of the certificate are extracted from the SignedData structure received.
2. The certificate corresponding to the Serial Number and Issuer Distinguished Name just extracted is located.
3. A SHA256 message digest is computed on the DigitalEnvelopHeader and EnvelopedData received.
4. The ECDSA verification algorithm is invoked using the public key of the certificate located in step #2 and the message digest computed in step #3.
5. The certificate used to verify the signature of the Digital Envelope might need to be authenticated with certificate(s) higher in the chain of trust. This process is not described in this section.

Digital Envelopes are used to implement different interactions between the Comms Hub and the HES. The reasonCode field included in the header identifies both the purpose of the envelope and the type of information carried. The different reason codes supported are summarized in Table 13 below which identifies digital envelope types and contents (y=mandatory and o=conditional). For each type there is information for: The optional header fields included; The presence of a payload and its format (DLMS or ZCL); The presence of certificates and/or certificate revocation list (CRL) in the signedData element of the digital envelops; The public key used in conjunction with the Comms Hub private key to derive a share secret used for encrypting the payload. On reception, the HES use its corresponding private key and the Comms Hub public key to obtain the same share secret; and The Comms Hub private key used for key derivation and signing.

TABLE 13

| Description | DigitalEnvelopHeader. reasonCode | DigitalEnvelopHeader. sequenceNum | DigitalEnvelopHeader. deviceMacAd | DigitalEnvelopHeader. tokenId | DigitalEnvelopHeader. pushCertificat |
|---|---|---|---|---|---|
| SMS Wakeup Response | 0x06 | y | | | y |
| Switch GSM Network Test | 0x07 | y | | | y |
| Call-back Response | 0x08 | y | | | y |
| Commission Request | 0x09 | y | o | | |
| OTA Status Report | 0x0A | y | | | y |
| OTA Image Request Alert | 0x0B | y | | | y |
| Decommission Request | 0x0C | y | | | y |
| E-Meter Report | 0x11 | y | y | | y |
| G-Meter Report | 0x12 | y | y | | y |
| IHU Report | 0x13 | y | y | | y |
| Comms Hub Report | 0x14 | y | | | y |
| E-Meter High Priority Report | 0x21 | y | y | | y |
| G-Meter High Priority Report | 0x22 | y | y | | y |
| IHU High Priority Report | 0x23 | y | y | | y |
| Comms Hub High Priority Report | 0x24 | y | | | y |
| E-Meter Alarm | 0x31 | y | y | | y |
| G-Meter Alarm | 0x32 | y | y | | y |
| IHU Alarm | 0x33 | y | y | | y |
| Comms Hub | 0x34 | y | | | y |

TABLE 13-continued

| | | |
|---|---|---|
| Alarm | | |
| Acknowledgement (Commission request) | 0xFF | y |
| Acknowledgement | 0xFF | y |

| Description | DigitalEnvelopHeader. timezoneID | DigitalEnvelopHeader. currentTime | DigitalEnvelopHeader. callback . . . | DigitalEnvelopPayload. dlmsContent( | DigitalEnvelopPayload. zclContent (s) |
|---|---|---|---|---|---|
| SMS Wakeup Response | y | | | | |
| Switch GSM Network Test | y | | | | y |
| Call-back Response | y | | | | |
| Commission Request | | | | o | o |
| OTA Status Report | y | | | | y |
| OTA Image Request Alert | y | | | | y |
| Decommission Request | y | | | | |
| E-Meter Report | y | | | y | o |
| G-Meter Report | y | | | | y |
| IHU Report | y | | | | y |
| Comms Hub Report | y | | | | y |
| E-Meter High Priority Report | y | | | y | o |
| G-Meter High Priority Report | y | | | | y |
| IHU High Priority Report | y | | | | y |
| Comms Hub High Priority Report | y | | | | y |
| E-Meter Alarm | y | | | y | o |
| G-Meter Alarm | y | | | | y |
| IHU Alarm | y | | | | y |
| Comms Hub Alarm | y | | | | y |
| Acknowledgement (Commission request) | | y | | | |
| Acknowledgement | | y | o | | |

| Description | SignedData. certificates | SignedData. crls | EncryptedData content type | Payload | Public key use for key derivation | Private key use for key derivation and signing |
|---|---|---|---|---|---|---|
| SMS Wakeup Response | | | | | | Operator Device |
| Switch GSM Network Test | | | y | y | Push | Operator Device |
| Call-back Response | | | | | | Operator Device |
| Commission Request | y | | | | | Manufacturer Device |
| OTA Status Report | | | | | | Operator Device |
| OTA Image Request Alert | | | | | | Operator Device |
| Decommission Request | y | | | | | Operator Device |
| E-Meter Report | | | y | y | Push | Operator Device |
| G-Meter Report | | | y | y | Push | Operator Device |
| IHU Report | | | y | y | Push | Operator Device |
| Comms Hub Report | | | y | y | Push | Operator Device |
| E-Meter High Priority Report | | | Y | y | Push | Operator Device |

TABLE 13-continued

| | | | | | | |
|---|---|---|---|---|---|---|
| G-Meter High Priority Report | | | Y | y | Push | Operator Device |
| IHU High Priority Report | | | Y | y | Push | Operator Device |
| Comms Hub High Priority Report | | | y | y | Push | Operator Device |
| E-Meter Alarm | | | y | y | Push | Operator Device |
| G-Meter Alarm | | | y | y | Push | Operator Device |
| IHU Alarm | | | y | y | Push | Operator Device |
| Comms Hub Alarm | | | y | y | Push | Operator Device |
| Ac-knowledgement (Commission request) | y | o | | | | Commissioning |
| Ac-knowledgement | | o | | | | Push |

The "SMS Wakeup Response" Digital Envelope is sent by the Comms Hub each time a SMS Wakeup Message is received. This envelope is sent just after the successful establishment of a GPRS connection to advertise the availability of the Comms Hub on the IP network to the HES. The byte stream of the "SMS Wakeup Response" Digital Envelope is represented in FIG. 27.

The "Switch GSM Network Test" Digital Envelope is sent by the Comms Hub in response to a successful SelectGsmNework command. The payload of this Digital Envelope contains a SwitchGsmNetworkTest command. The byte stream of the "Switch GSM Network Test" Digital Envelope is represented in FIG. 28.

The HES has the option to include in any of its Digital Envelope Acknowledgment a callback time. At this configured time, the Comms Hub establishment of a GPRS connection and sends a "Call-back Response" Digital Envelope to advertise the availability of the Comms Hub on the IP network. The byte stream of the "Call-back response" Digital Envelope is represented in FIG. 29.

The "Commission Request" Digital Envelope is sent by the Comms Hub to initiate its commissioning or the commissioning of a ZigBee Device. The payload of this Digital Envelope contains a "CommissionRequest" command. The byte stream of the "CommissionRequest" Digital Envelope is represented in FIG. 30.

The "OTA Status Report" Digital Envelope is sent by the Comms Hub each time the status of the OTA process of one of its associated ZigBee Device change. The payload of this Digital Envelope contains an "OTAStatusReport" command. The byte stream of the "OTA Status Report" Digital Envelope is represented in FIG. 31.

The "OTA Image Request Alert" Digital Envelope is sent by the Comms Hub to alter the Head End System when there is either a new image transfer required or all the image transfers are complete. The Head End System initiates a TCP/TLS session in response to this alert. The byte stream of the "OTA Image Request Alert" Digital Envelope is represented in FIG. 32.

The "Decommission Request" Digital Envelope is sent by the Comms Hub to initiate its decommissioning or the decommissioning of an associated Zigbee Device. The payload of this Digital Envelope contains a "DecommissionRequest" command. The byte stream of the "Decommission Request" Digital Envelope is represented in FIG. 33.

Daily reports and real time alarms are transferred using a Digital Envelope with a reason code in the 0x10 to 0x3F range. The payload of these Digital Envelopes is specific to the type of device, the configuration of this device and the type of alarm reported. The octet stream of a report or alarm Digital Envelope is represented in FIG. 34.

The "Acknowledgment" Digital Envelope is sent by the Head End System each time it receives a Digital Envelope form the Comms Hub. The byte stream of the "Acknowledgment" Digital Envelope is represented in FIG. 35. The value sequenceNumber field within the "Acknowledgment" Digital Envelope mirrors the sequenceNumber of the Digital Envelope acknowledged. The absence of the currentTime field shall not be processed as an error by the Comms Hub. The callback fields are present in the Digital Envelope only if the HES needs to communicate with the Comms Hub later during that day. The dstStart and dstEnd are provided by the HES to keep these attributes up to date. These values are changed once a year. The "Acknowlegment" Digital Envelope of a "Commissioning Request" Digital Envelope contains the Commissioning and Manufacturer certificates. These certificates are included in the CMS SignedData certificate field. When the Head End System need to update Comms Hubs CRL, the new CRL is included in the CMS signedData crls field.

Figure 36:
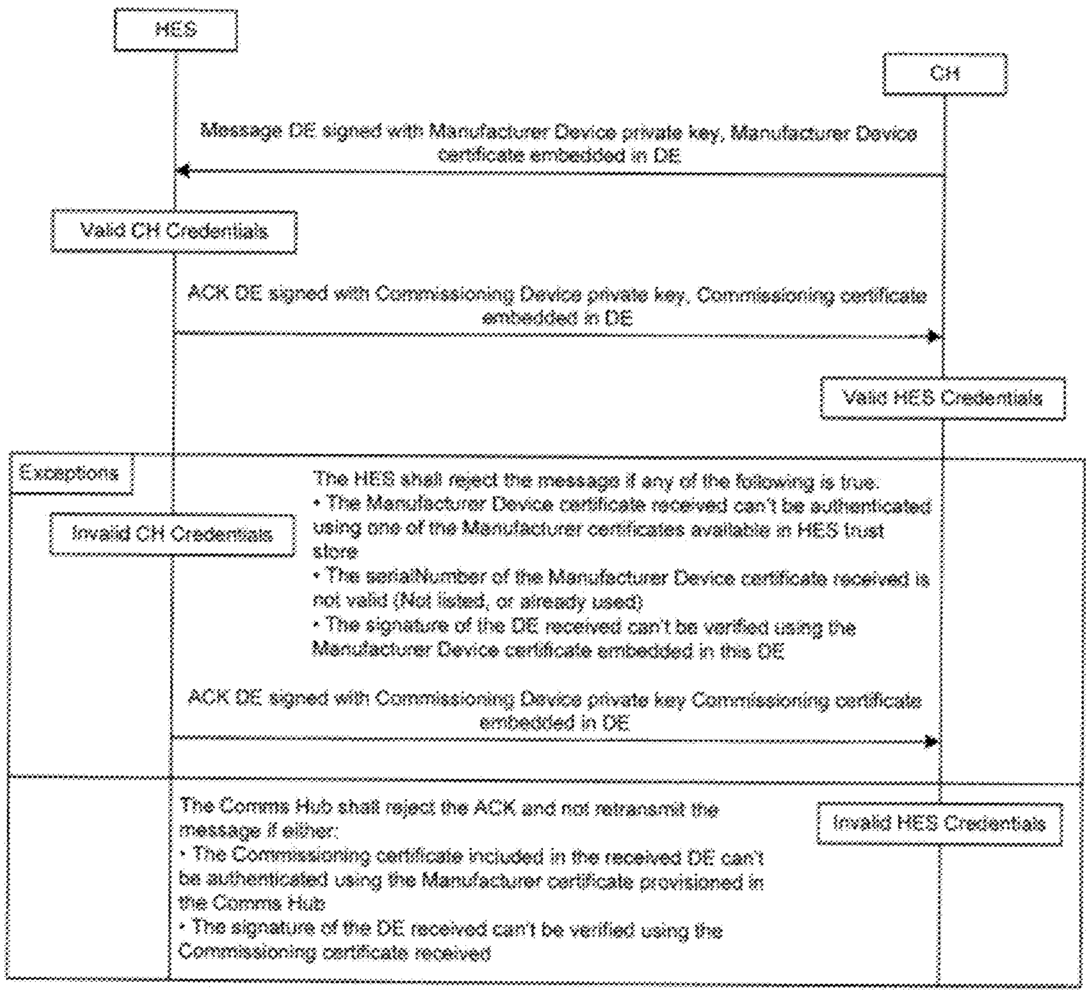
FIG. 36 is an exemplary Digital Envelope handshake during Comms Hub commissioning.

The Digital Envelope (DE) handshake in FIG. 36 corresponds to the exchange of Digital Envelopes during the commissioning of the Comms Hub, when the ReasonCode is set to "Commission request" and the deviceMacAddress is absent or equal to the MAC address of the Comms Hub. The HES dynamically selects the correct Commissioning certificate based on the Manufacturer Device certificate received. The Commissioning certificate use by the HES is issued from the Manufacturer Root certificate configured in the Comms Hub during its manufacturing.

Figure 37:
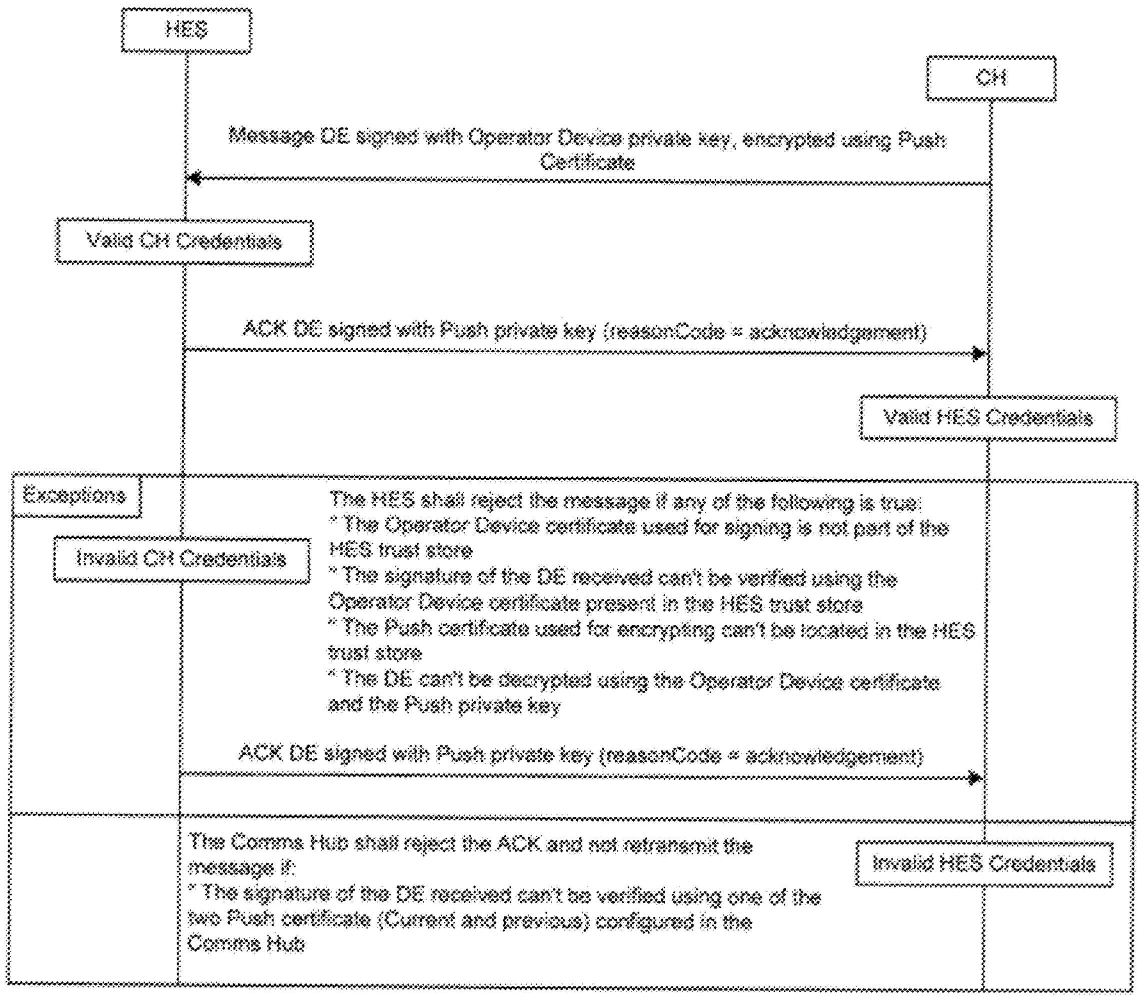
FIG. 37 is an exemplary Digital Envelope transmission with reason code.

The handshake in FIG. 37 corresponds to the transmission of a DE with a Reason Code between 0x10 and 0x3F including: E-meter report, G-meter report, IHU report, Comms Hub report, E-meter high priority report, G-meter high priority report, IHU high priority report, Comms Hub high priority report, E-meter alarm, G-meter alarm, IHU alarm, and Comms Hub alarm. As well as transmission of a DE for Switch GSM Network Test, OTA Status Report, OTA Image Request Alert, Commission request of ZigBee devices, and Decommission request. These are payload DE message flows.

Figure 38:
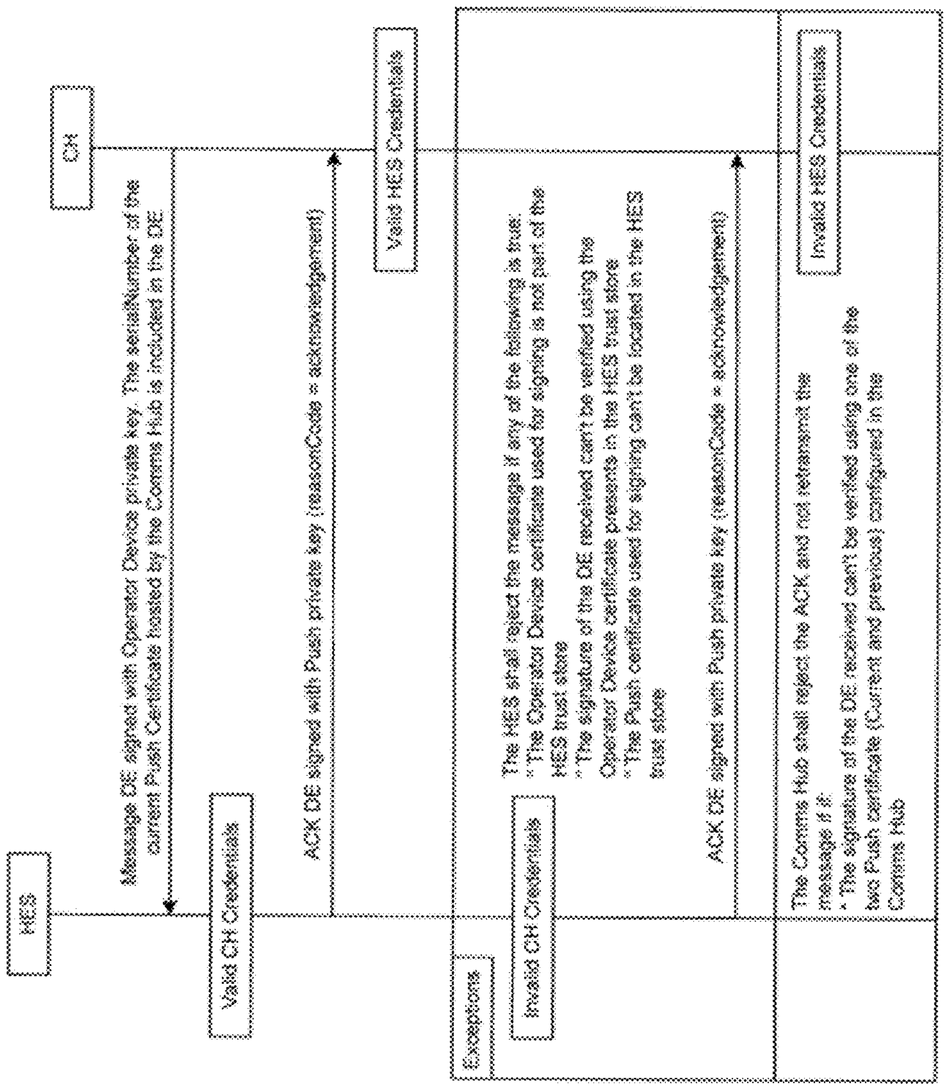
FIG. 38 is an exemplary Digital Envelope transmission with no payload.

The sequence in FIG. 38 is used to transmit a Digital Envelop message that has no payload. These messages have a Reason Code set to: SMS wakeup response or Callback response.

The certificate management security infrastructure of the dual protocol WAN specification is based on two PKIs, the Manufacturing PKI and the Operational PKI.

A Manufacturer PKI is created by each Comms Hub manufacturer and used to implement the following security services: Authentication of Comms Hubs during their initial deployment or redeployment and Authentication of the HES during the commissioning process.

During the deployment process, the Head End System takes ownership of the Comms Hubs by configuring in them operator certificates. The Operational PKI is managed by the operator of the Comms Hubs and is used to implement the following security services: Mutual authentication of Comms Hubs and the HES during a TLS handshake, Authentication of Digital Envelops sent by the Comms Hubs or the HES and Granting access rights.

Figure 39A:
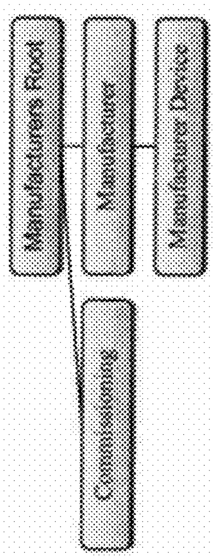
FIG. 39*a* is an exemplary Manufacturing PKI certificate listing.

The Manufacturing PKI consists of four certificates as shown in FIG. 39*a*. These certificates are used as follows: The Manufacturer Root and Manufacturer are used to issue certificates and the Commissioning and Manufacturer Device are used for authentication during TLS handshakes and for Digital Envelops authentication.

Manufacturing certificates are unmanaged, their lifetimes are indefinite and they never get replaced. However, the uses of these certificates are strictly controlled by the system responsible for the Comms Hubs commissioning. This system maintains a list of the serial numbers of the Comms Hub expected to be installed and shall reject any Comms Hub with a certificate serial number not on this list or a serial number already used.

The Manufacturer Root certificate is the root of trust for the manufacturing PKI. It is used to issue Manufacturer and Commissioning certificates. The Manufacturer Root certificate has an indefinite lifetime; nevertheless this certificate may be replaced periodically. The replacement of the Manufacturer Root certificate has no impact on already issued Manufacturer Device certificates. When replaced, new Manufacturer certificates and the associated Commissioning certificate need to be reissued. The Manufacturer Root certificate is stored in the following locations: Manufacturer's Commercial CA (private Key); Manufacturing system (public key); HES (public key) and Comms Hub (public key). The Manufacturer Root certificate is a self-signed X.509 certificate with the following content. The subject field is composed of: The commonName field set to "Manufacturers Root"; The organizationName field set to the commercial name of the manufacturer; and The countryName field set to the country code where this manufacturer is located. The issuer field set to the same values as the subject field. The validity field is composed of: the notBefore field set to the issuing date of this certificate and the notAfter field set to notBefore plus 99 years. The basicConstraints extension {2 5 29 19}, with the cA field set to TRUE. The keyUsage extension {2 5 29 15}, with the keyCertSign and cRLSign fields set to TRUE.

The Manufacturer certificate is issued by the Manufacturer Root for each manufacturing site. This certificate is used to issue a Manufacturer Device certificate for each Comms Hub manufactured at this site. The Manufacturer certificate has an indefinite lifetime; nevertheless this certificate may be replaced periodically. The replacement of the Manufacturer certificate has no impact on already issued Manufacturer Device certificates. When replaced, the associated private key may be deleted to reduce the risk of compromise. The Manufacturer certificate is stored in the following locations: Manufacturing system (private key); HES (public key) and Comms Hub (public key). The Manufacturer Root certificate is a X.509 certificate with the following content. The subject field composed of: The commonName field set to a unique name assigned to this manufacturing site; The organizationUnitName field set to "Manufacturer"; The organizationName field set to the commercial name of the manufacturer; and The countryName field set to the country code where this manufacturer is located. The issuer field is set to the subject field of the Manufacturers Root certificate. The validity field is composed of: the notBefore field set to the issuing date of this certificate and the notAfter field set to notBefore plus 99 years. The basicConstraints extension {2 5 29 19}, with the cA field set to TRUE. The keyUsage extension {2 5 29 15}, with the keyCertSign field set to TRUE.

The Manufacturer Device certificate is issued by the Manufacturer located on each site of manufacturing. This certificate is used to authenticate the Comms Hub during TLS handshakes and any Digital Envelop transmitted by the Comms Hub prior to its commissioning. The Manufacturer Device certificate has an indefinite lifetime and is not expected to be replaced during the lifetime of a Comms Hub. The Manufacturer Device certificate is stored in the following locations: Comms Hub (private Key); Manufacturing system (public key); and HES (public key). The Manufacturer Device certificate is a X.509 certificate with the following content. The subject field composed of: The commonName field set to serial number assigned to this Comms Hub; The organizationUnitName field set "Manufacturer Device"; The organizationName field set to the commercial name of the manufacturer; and The countryName field set to the country code where this manufacturer is located. The issuer field is set to the subject field of the Manufacturer certificate. The validity field composed of: the notBefore field set to the issuing date of this certificate and the notAfter field set to notBefore plus 99 years. The keyUsage extension {2 5 29 15}, with the digitalSignature and the keyAgreement fields set to TRUE.

The Commissioning certificate is issued by the Manufacturer Root to the operator. The manufacturer is also responsible for providing the list of the serial numbers of the Comms Hubs manufactured for this operator. This list should be used by the operator to limit which Comms Hubs is accepted in its system. The Commissioning certificate may have a limited or unlimited lifetime. If the lifetime is limited, the manufacturer should support issuing of new Commissioning certificates for each Manufacturer Root created for the Comms Hubs lifetime to allow their re-deployment. The Commissioning certificate is stored in the HES (private Key). The Commissioning certificate is a X.509 certificate with the following content. The subject field composed of: The commonName field set to name of this operator; The organizationUnitName field set to "Commissioning"; The organizationName field set to the commercial name of the manufacturer; The countryName field set to the country code where this manufacturer is located. The issuer field is set to the subject field of the Manufacturer Root certificate. The validity field composed of: the notBefore field set to the issuing date of this certificate and the notAfter field set to notBefore plus 99 years. The keyUsage extension {2 5 29 15}, with the digitalSignature and the keyAgreement fields set to TRUE.

Figure 39B:
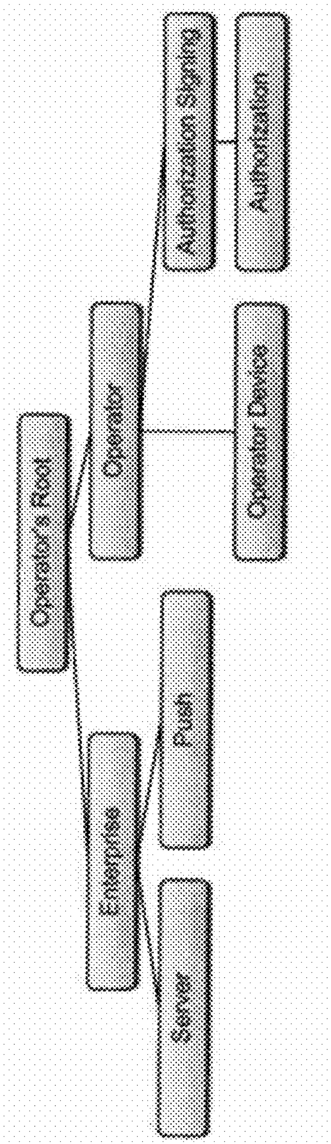
FIG. 39*b* is an exemplary Operational PKI certificate listing.

The Operational PKI consists of the eight certificates as shown in FIG. 39*b*. These certificates are used as follows: The Operator's Root, Enterprise and Operator certificates are used to issue certificates; The Server and Operator Device certificates are used for authentication during TLS handshakes following commissioning; The Push and Operator Device certificates are used for Digital Envelops authentication; and The Authorization Signing certificate is used to sign command(s) or to grant privileges during TLS session. Privileges are granted by signing an Authorization certificate for a specific validity period and a set of privileges.

Operational certificates are managed because they are intended to be used continuously over a potentially long period of time, during which there is a need to renew their security.

The Operator's Root certificate is the root of trust for the operational PKI. It is used to issue Enterprise and Operator certificates. The lifetime of the Operator's Root certificate might be, e.g., 10 years. When the Operator's Root certificate is updated, all the Comms Hubs need to be configured with a new chain of certificates issued for that new Operator Root. During the update process, the Head End System shall be able to establish a TLS session with either set of certificates. The set of certificates used by the Head End System depends of the certificates returned by the Comms Hub during the TLS handshake. The Operator's Root certificate is stored in the following locations: Operator's Commercial CA (private Key); HES (public key); Comms Hub (public key). The Operator's Root certificate is a self-signed X.509 certificate with the following content. The subject field composed of: The commonName field set to "Operator's Root"; The organizationName field set to the operator name and The countryName field set to the country code where this operator is located. The issuer field set to the same values as the subject field. The validity field is composed of: the notBefore field set to the issuing date of this certificate and the notAfter field set to notBefore plus the Operator's Root certificate lifetime. The basicConstraints extension {2 5 29 19}, with the cA field set to TRUE. The keyUsage extension {2 5 29 15}, with the keyCertSign and cRLSign fields set to TRUE.

The Operator certificate is issued by the Operator's Root. This certificate is used to issue an Operator Device certificate for each Comms Hub and the Authorization Signing certificate. The lifetime of the Operator's certificate might be, e.g., five years. When the Operator certificate is updated, all the Comms Hubs need to be configured with a new Operator certificate and an Operator Device certificate issued from it. The Operator certificate is stored in the following locations: Operator's Commercial CA (private Key); Head End System (public key); and Comms Hub (public key). The Operator certificate is a X.509 certificate with the following content. The subject field composed of: The commonName field set to "Operator"; The organizationName field set to the operator name; and The countryName field set to the country code where this operator is located. The issuer field is set to the subject field of the Operator's Root certificate. The validity field composed of: The notBefore field set to the issuing date of this certificate and The notAfter field set to notBefore plus the Operator certificate lifetime. The basicConstraints extension {2 5 29 19}, with the cA field set to TRUE. The keyUsage extension {2 5 29 15}, with the keyCertSign field set to TRUE.

The Operator Device certificate is issued for each Comms Hub by the Operator. This certificate is used to authenticate the Comms Hub during the TLS handshake and to sign Digital Envelopes sent by the Comms Hub. The lifetime of the Operator Device certificate might be, e.g., 2 years. The update of the Operator Root, Operator and Operator Device certificate should be coordinated to avoid a discrepancy in there expiration dates. To avoid a higher layer certificate with an expiration prior to a lower layer certificate, the Operator certificate should be updated 2 years prior of its expiration and the Operator Root should be updated 5 years prior of its expiration. The Operator certificate is stored in the following locations: Comms Hub (private key); Operator's Commercial CA (public Key); and Head End System (public key). The Operator Device certificate is a X.509 certificate with the following content. The subject field composed of: The commonName field set to the serial number assigned to this Comms Hub; The organizationUnitName field set to "Operator Device"; The organizationName field set to the operator name; and The countryName field set to the country code where this operator is located. The issuer field is set to the subject field of the Operator's certificate. The validity field composed of: The notBefore field set to the issuing date of this certificate and The notAfter field set to notBefore plus the Operator Device certificate lifetime. The basicConstraints extension {2 5 29 19}, with the cA field set to FALSE. The keyUsage extension {2 5 29 15}, with the digitalSignature and keyAgreement fields set to TRUE. The extKeyUsage extension {2 5 29 37}, with the KeyPurposeId field set to serverAuth {1 3 6 1 5 5 7 3 1}.

An Enterprise certificate is issued by the Operator's Root. This certificate is used to issue a Server certificate used during the TLS handshake with the Head End System and the Push certificate used to encrypt Digital Envelops and sign Digital Envelop acknowledgments. The lifetime of the Enterprise certificate might be 5 years. When the Enterprise certificate is updated, new Server and the Push certificates need to be issued for the Head End System. The new Push certificate also needs to be distributed to all the Comms Hubs. During the distribution process, the Head End System should continue using the old Push certificate for Comms Hub not yet updated. The Enterprise certificate is stored in the following locations: Operator's Commercial CA (private Key); Head End System (public key); and Comms Hub (public key). The Enterprise certificate is a X.509 certificate with the following content. The subject field composed of: The commonName field set to "Enterprise"; The organizationName field set to the operator name; and The countryName field set to the country code where this operator is located. The issuer field is set to the subject field of the Operator's Root certificate. The validity field is composed of: The notBefore field set to the issuing date of this certificate and The notAfter field set to notBefore plus the Enterprise certificate lifetime. The basicConstraints extension {2 5 29 19}, with the cA field set to TRUE. The keyUsage extension {2 5 29 15}, with the keyCertSign field set to TRUE.

The Server certificate is issued by the Operator. This certificate is used to authenticate the Head End System during TLS handshakes. The lifetime of the Server certificate might be 5 years. The update of the Server certificate should be coordinated with the Enterprise and Operator Root certificates to avoid a certificate higher in the PKI hierarchy with an expiration date prior to a certificate lower in this hierarchy. The update of the Server certificate has no impact on the configuration of the Comms Hub since the trust anchor uses during the TLS handshake is the Operator Root. The Server certificate is stored in the following locations: Head End System (Private key) and Operator's Commercial CA (public Key). The Server certificate is a X.509 certificate with the following content. The subject field composed of: The commonName field set to the name assigned to the HES; The organizationUnitName field set to "Server"; The organizationName field set to the operator name; and The countryName field set to the country code where this operator is located. The issuer field is set to the subject field of the Enterprise certificate. The validity field composed of: The notBefore field set to the issuing date of this certificate and The notAfter field set to notBefore plus the Server certificate lifetime. The basicConstraints extension {2 5 29 19}, with the cA field set to FALSE. The keyUsage extension {2 5 29 15}, with the keyAgreement field set to TRUE. The extKeyUsage extension {2 5 29 37}, with the KeyPurposeId field set to clientAuth {1 3 6 1 5 5 7 3 2}.

The Push certificate is issued by the Operator. This certificate is used to sign digital Envelops sent by the Head End System and for key derivation (ECDH) during the encryption and decryption process. The lifetime of the Push certificate might be 5 years. The update of the Push certificate should be coordinated with the Enterprise and Operator Root certificates to avoid a certificate higher in the PKI hierarchy with an expiration date prior to a certificate lower in this hierarchy. When updated, the Push certificate needs to be distributed to all the Comms Hubs to enable the encryption of Digital Envelops using this new public key. During the upgrade process, the Head End System shall be able to transfer Digital Envelops with Comms Hubs still using the old Push certificate and Comms Hubs configured with the new Push certificate. The Push certificate is stored in the following locations: Head End System (Private key); Operator's Commercial CA (public Key) and the Comms Hub (public key). The Server certificate is a X.509 certificate with the following content. The subject field composed of: The commonName field set to the name assigned to the HES; The organizationUnitName field set to "Push"; The organizationName field set to the operator name; and The countryName field set to the country code where this operator is located. The issuer field is set to the subject field of the Enterprise certificate. The validity field is composed of: The notBefore field set to the issuing date of this certificate and The notAfter field set to notBefore plus the Push certificate lifetime. The basicConstraints extension {2 5 29 19}, with the cA field set to FALSE. The keyUsage extension {2 5 29 15}, with the digitalSignature and keyAgreement fields set to TRUE.

An Authorization Signing certificate is issued by the Operator. This certificate is used to either sign commands or to sign the Authorization certificate. Authorization certificates are transferred during an already establish TLS session to acquired access rights. The lifetime of the Authorization Signing certificate might be 5 years. When updated, the Authorization Signing certificate needs to be distributed to all the Comms Hubs to enable the authentication of commands or Authorization certificates. Comms Hubs shall store and use at least two Authorization certificates. This allows the distribution of a new Authorization certificate while still using the old one on all the Comms hubs. The Authorization Signing certificate is stored in the following locations: Head End System (Private key) and Operator's Commercial CA (public Key). The Authorization Signing certificate is a X.509 certificate with the following content. The subject field composed of: The commonName field set to the name assigned to the HES; The organizationUnitName field set to "Authorization Signing"; The organizationName field set to the operator name; and The countryName field set to the country code where this operator is located. The issuer field is set to the subject field of the Operator certificate. The validity field is composed of: The notBefore field set to the issuing date of this certificate and The notAfter field set to notBefore plus the Authorization Signing certificate lifetime. The basicConstraints extension {2 5 29 19}, with the cA field set to FALSE. The keyUsage extension {2 5 29 15}, with the keyCertSign field set to TRUE.

The Authorization certificate is issued by the Operator. This certificate is used to grant privileges on an already establish TLS session. It is recommended that lifetime of the Authorization certificate is very limited, a day or a week. It is also recommended that it target a specific device or group of devices. The Authorization certificate is a X.509 Attribute Certificate as defined by RFC5755. The exact content of this certificate needs to be defined to align with the DLMS authorization levels.

Figure 41A:
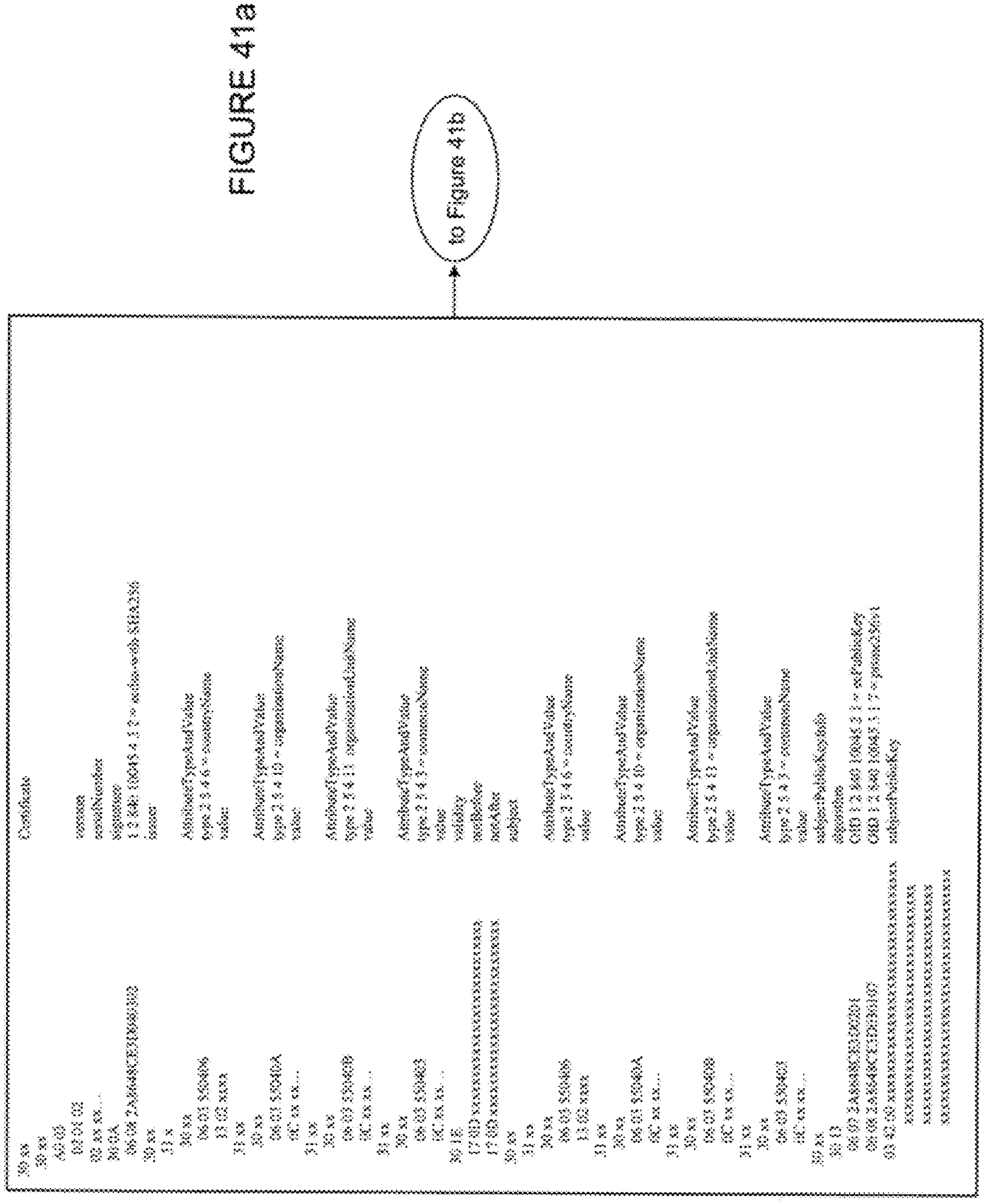
FIGS. 41*a*-41*b* show an exemplary encoded certificate byte stream.
Figure 41B:
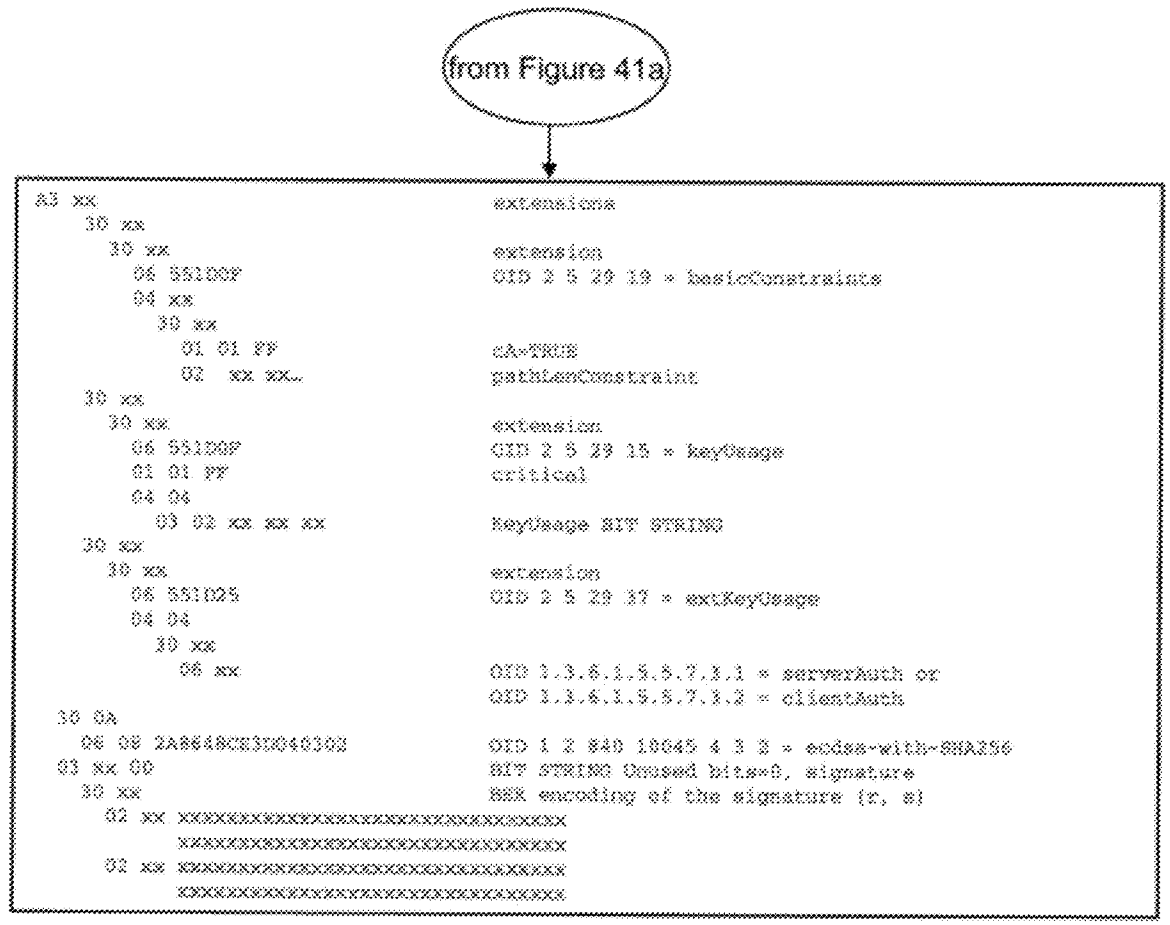

All certificates used by the Dual Protocol WAN specification comply with the X.509 standard. The X.509 standard supports multiple options and extensions and FIG. 40 describes the equivalent ANS.1 definition for the general structure of a certificate and the specific options and extensions used. When encoded using the Distinguished Encoding Rules (DER), certificates produce the byte stream shown in FIGS. 41*a* to 41*b*. This byte stream is just an example; more extensions can be added and some optional fields might be removed. The mandatory content of each certificate is defined in the "Format" paragraph of each certificate. The byte stream is represented in the left column; the right column contains a short description. Value "xx" represents an octet and the value "xx . . . " represents an octet string.

The IETF Transport Layer Security (TLS) protocol is used to secure TCP sessions. The TLS protocol supports a number of cipher suite. The Comms Hub, as a minimum, shall support the cipher suite TLS_ECDHE_ECDSA_WITH_AES_128_GCM_SHA256. The different components of this cipher suite are listed in Table 14.

TABLE 14

| | |
|---|---|
| Asymmetric key generation | ECC curve secp256r1 |
| Symmetric key agreement | ECDHE |
| Symmetric cipher | AES-128 |
| Symmetric cipher mode | GCM |
| Hash function | SHA-256 |
| Signature | ECDSA/SHA-256 |

Each TLS session start by a handshake during which authentication and share symmetrical key derivation are performed. The logic implemented during this handshake depends of the value of the ChCommissioningState attribute of the Comms Hub Control cluster.

Figure 42:
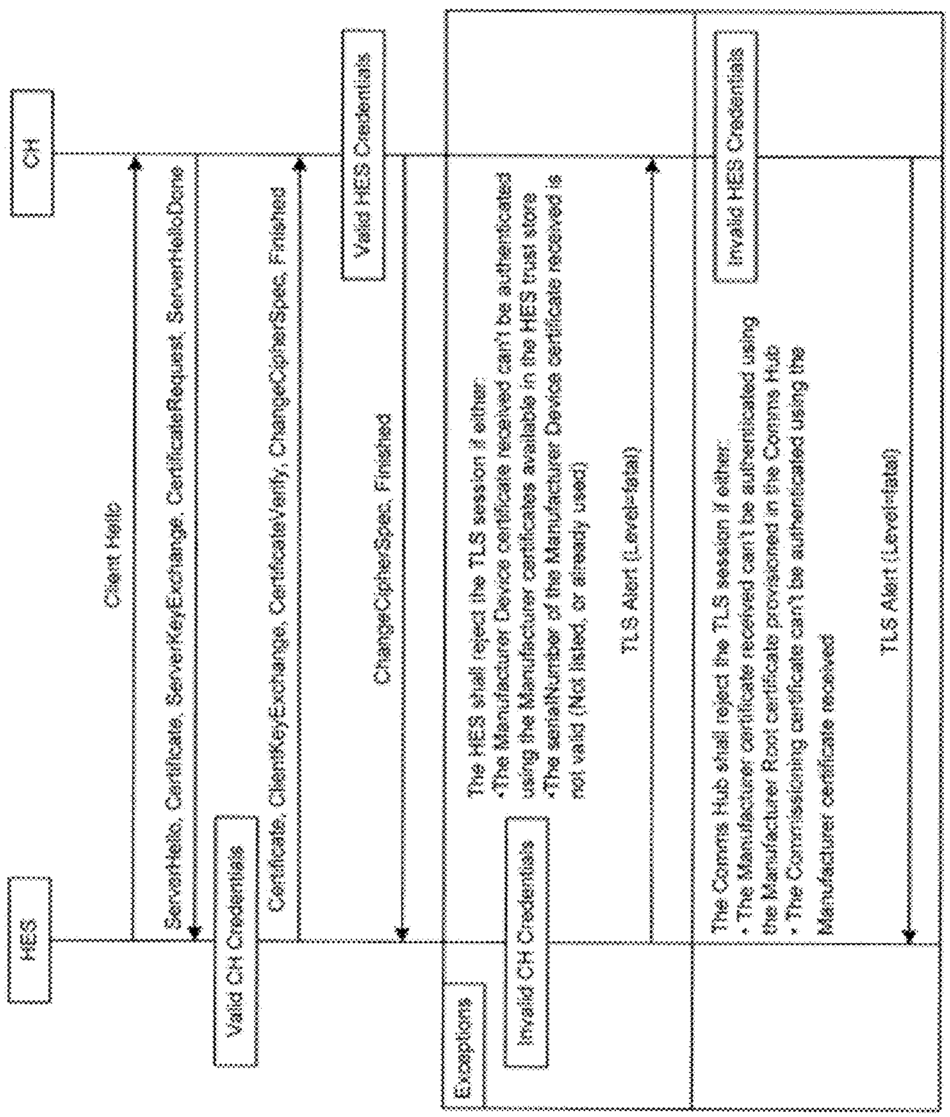
FIG. 42 is an exemplary Comms Hub TLS handshake when a ChCommissioningState attribute is set to NOT_COMMISSIONED or DECOMMISSIONED.

When the ChCommissioningState attribute is set to NOT_COMMISSIONED or DECOMMISSIONED, the Comms Hub shall perform the TLS handshake shown in FIG. 42. Invalid TLS credentials from either the Head End System or the Comms Hub result in the abortion of the TLS session establishment.

Figure 43:
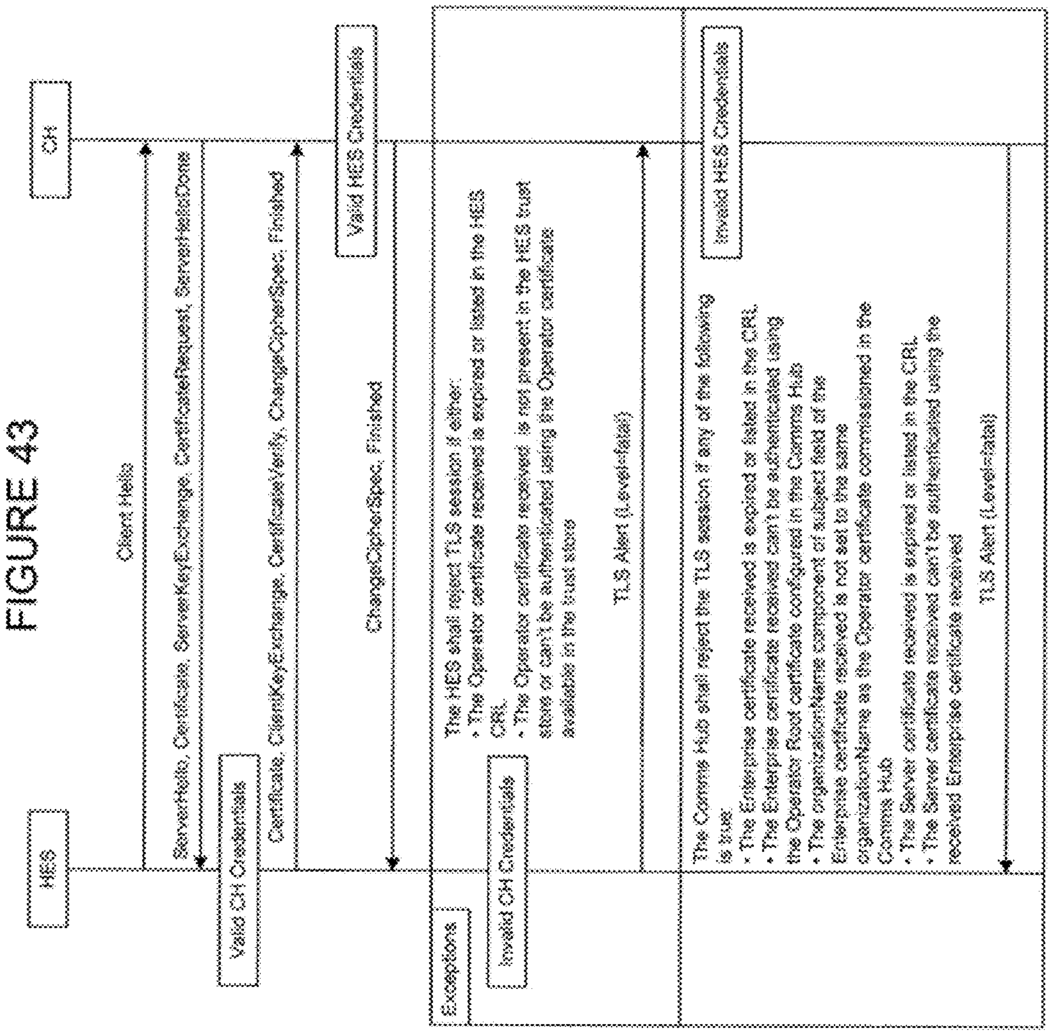
FIG. 43 is an exemplary Comms Hub TLS handshake when a ChCommissioningState attribute is set to COMMISSIONED.

When the ChCommissioningState attribute is set to COMMISSIONED, the Comms Hub shall perform the Normal TLS handshake shown in FIG. 43. Invalid TLS credentials from either the Head End System or the Comms Hub result in the abortion of the TLS session establishment.

The Comms Hub initiates communications to the Head End System when it has a scheduled message to send or when there is an event to report in real-time. The first step in initiating any communication to the Head End System is to connect to the WAN. The actual implementation of the flows is specific to the interfaces provided by the GSM modem vendor and is a design issue. Some aspects of the interaction with the mobile operator may also be specific to that operator.

The Comms Hub initiates communications with the Head End System when it has information to send. A Comms Hub initiated communication is called a Push. A Push can be triggered by a scheduled operation such as a meter usage report or by an alarm/event that has to be reported in real-time. Reported events include the installation of firmware upgrades. A push schedule can be either one-time or reoccurring. Schedules are either set by the Comms Hub or by ZigBee commands and attributes or by COSEM scheduling ICs from the Head End System. Daily meter usage reports shall be scheduled by the Comms Hub to occur at a random time in a transmission window. The push operation uses the UDP/DE protocols in the WAN stack.

Figure 44:
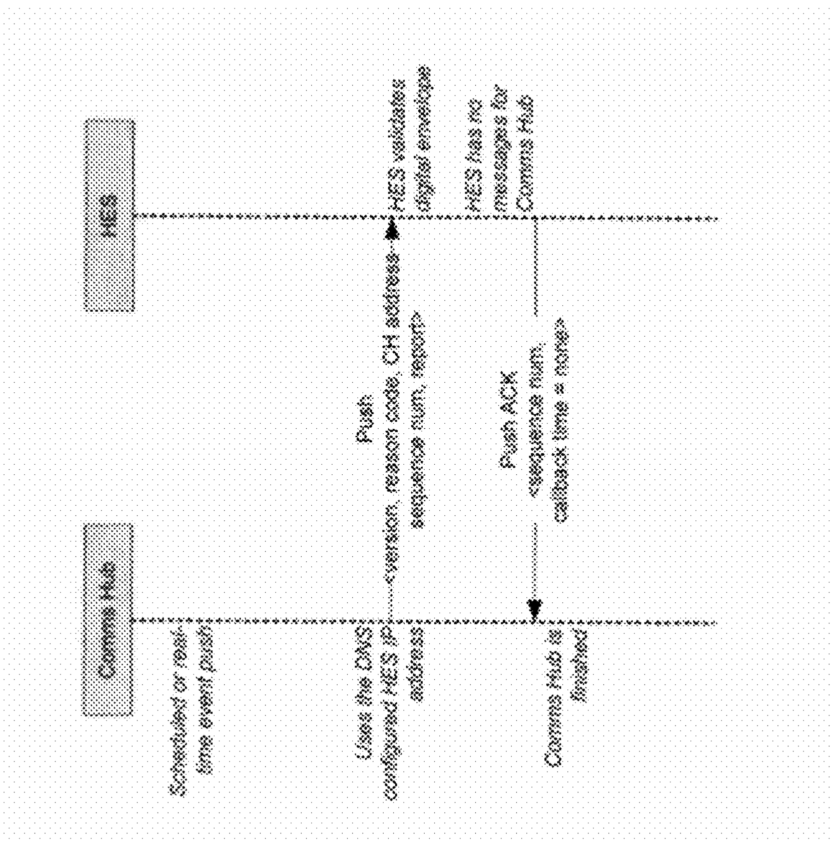
FIG. 44 is an exemplary UDP/DE push message flow.

A simple UDP/DE push message flow example is shown in FIG. 44. At the start of the process Comms Hub has a scheduled or real-time report to transmit to the Head End System. In a cellular WAN it starts off by opening a GPRS and PDP connection with the mobile operator's system which is not shown here. If needed the Comms Hub does a DNS look up to resolve the Head End System's fully qualified domain name into an IP address using DNS. When that is done, the Comms Hub sends a Push message that contains the message to the Head End System's IP address. This message is secured by a digital envelope described above. In this example, the Head End System has no messages for the Comms Hub so it sends a simple Push ACK message to the Comms Hub with no callback time. If there is a call back time the Comms Hub uses that information to either keep the data connection up or schedule a latter connection. For a cellular WAN system; If the Comms Hub is also finished communicating, it terminates the PDP and GPRS WAN connections as described below.

There are cases where the Head End System receives a Push message and wants to continue communicating to the Comms Hub. This may occur when the Push message is an alarm, and the Head End System needs to react to it by getting or setting parameters. This case may also occur when the Head End System has information to send like a firmware image. In these cases, the Head End System either wants the Comms Hub to keep the data connection up, or it wants the Comms Hub to callback at a scheduled time. The Head End System communicates what it wants in the Push ACK message. This acknowledgement message's callback time field can have a time value or the stay-awake value, "now".

Figure 45:
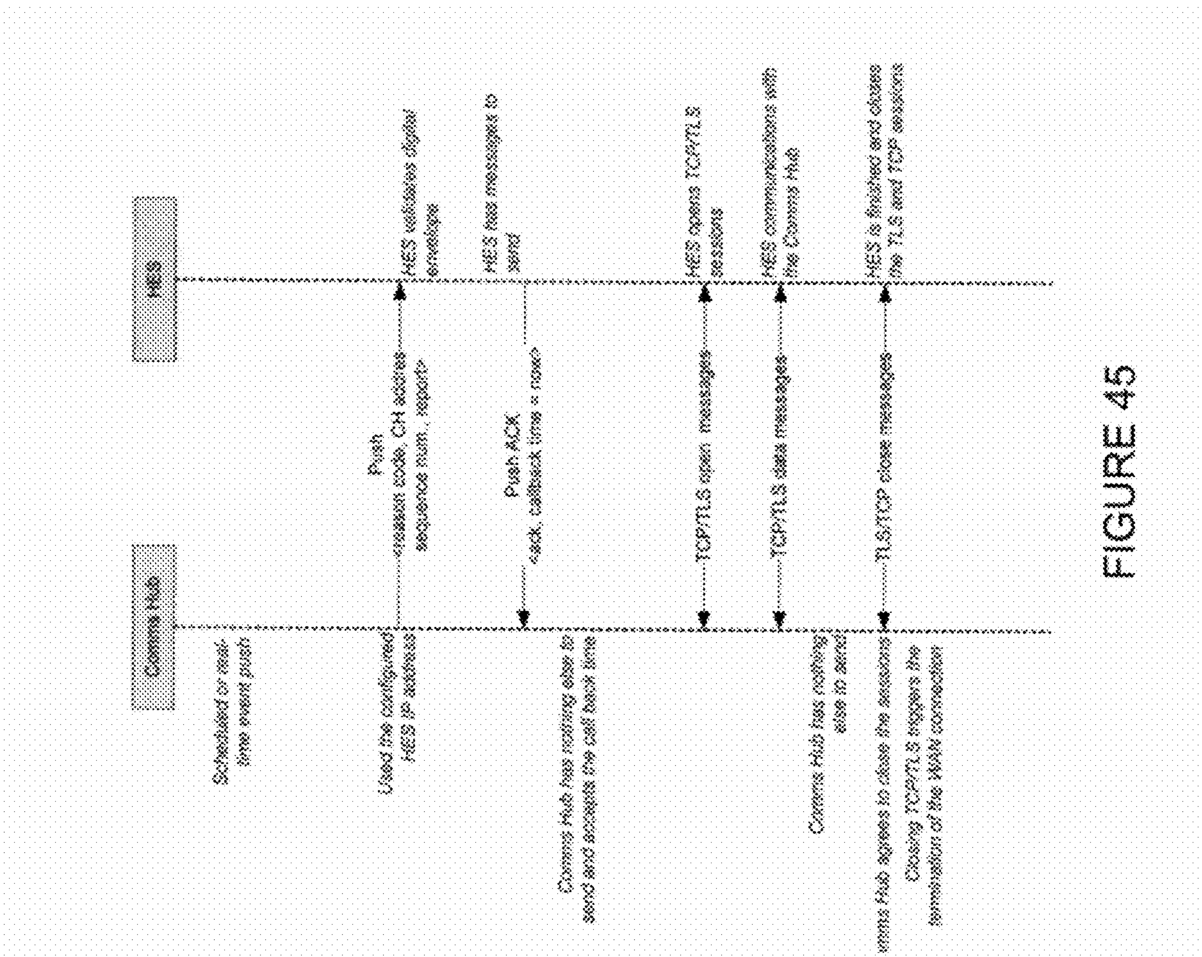
FIG. 45 is an exemplary UDP/DE push message flow with request from HES.

The example shown in FIG. 45 shows a case where the Head End System asks the Comms Hub to stay awake. The push operation is the same as that in FIG. 44. However, when the Head End System sends its Push ACK message, it asks the Comms Hub not to close the WAN connection by setting the callback time to "now". The Head End System then initiates a TCP connection and sets up a TLS session to continue to communicate with the Comms Hub. Data connection stays open until the TLS and TCP sessions are closed. After this, the Comms Hub terminates the PDP and GPRS WAN connections if it is using a cellular WAN.

The Comms Hub's Push messages and the Head End System's Push ACK messages use the Digital Envelope header formats described above. The Push messages contain all the protocol specific parameters necessary to identify the sender and the destination application processes. The Push payload is used to send the value(s) of attribute(s) that make up the upstream report. The Push ACK has no payload.

The Comms Hub keeps the GPRS connection closed for most of the time. The Comms Hub only opens it for short periods when data is pushed upstream. Therefore, when the Head End System needs to initiate communications with the Comms Hub, it has to send a message using SMS to tell the Comms Hub to establish a GPRS connection. This is the SMS wakeup message. The SMS wakeup message is a short message that tells the Comms Hub to wake up. It is a Class 0 message with no storage in the SIM. No information or acknowledgement is sent back to the Head System by the Comms Hub using SMS.

The Head End System propagates its clock to the entire smart meter network. The Head End System periodically distributes clock information to each Comms Hub using one of the DLMS Clock setting methods such as preset_adjustment_time. The Head End System also keeps the Comms Hub daylight savings configuration current with the local time by setting the enable, disable, start, end, and deviation parameters using the DLMS Clock setting methods. The clock synchronization can be incorporated as needed in the scheduled push operation in either the TCP message exchange or the UDP/DE acknowledgement message.

Figure 46:
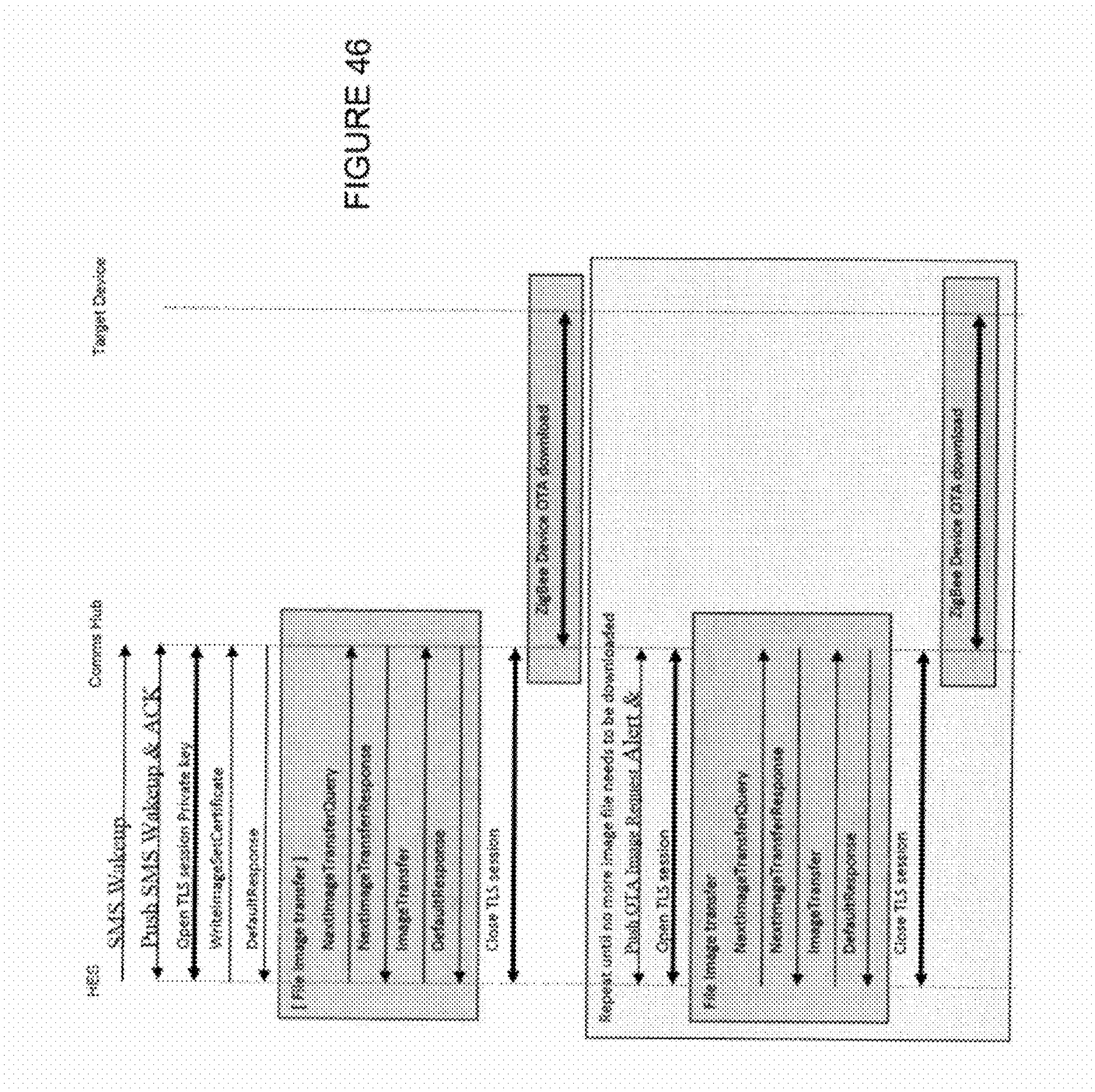
FIG. 46 is an exemplary OTA image download process flow.

The Comms Hub and HAN devices receive firmware image upgrades from the Head End System. For the HAN devices the image is transferred via the Comms Hub. The Head End System downloads firmware via the WAN to all the HAN devices. The firmware image is first transferred to the Comms Hub and from there the image is transferred to the targeted devices. The WAN transfer to the Comms Hub uses the OTA image transfer process flow in FIGS. 46 and 47. The HAN transfer from the Comms Hub to the HAN devices uses the ZigBee OTA Upgrade cluster and its methods. The Comms Hub may store each firmware image in non-volatile memory until all the devices needing it have successfully downloaded it and verified its integrity.

The firmware activation time can be controlled by the Comms Hub using the ZigBee OTA Upgrade cluster's Upgrade End Response message. The activation time sent by this message can immediately activate the firmware or set a time for its activation. The Comms Hub maintains a log of the progress of each firmware image upgrade that can be read by the Head End System. The security of the firmware updates is protected by digital certificates signed by the manufacturer.

The OTA process is divided in two parts to simplify its description, the OTA image transfer is described in this section and the OTA activation is described below. The first part of the OTA Upgrade process consists of the downloading images from the Head End System and distributing them to each ZigBee device. This process consists of the following steps per FIG. 46. The OTA download process is triggered by the Head End System with the transmission of a new Image Set to the OTA Upgrade server in the Comms Hub. The Head End System requests a data connection using the SMS Wakeup message. The Comms Hub establishments a data connection and sends a Push message after which the Head End System sets up a TCP session and the Comms Hub a TLS connection. The transmission by the Head End System of an Image Set, the transfer is performed using the WriteImageSet command. On reception of the WriteImageSet command, the OTA Upgrade server selects a first image file to be downloaded and update its Image Transfer Status. The Comms Hub compares the Image Set information just received against the version of each Image Type registered on its network. It then starts downloading each image file from the Head End System. The download from the Head End System to the OTA Upgrade server is done using the OTA Upgrade server's "NextImageTransferResponse" command. The download of image files stops when no more space is available in the Comms Hub to receive more data. The Comms Hub then frees up space by transferring the image to each target device that requests it. When the Comms Hub is part of the upgrade, its Image file is always transferred first and is not erased for each subsequent downloads. Images files downloaded from the Head End System are transferred to ZigBee target devices using the standard OTA commands and processes as summarized herein.

When the distribution of the Image files to the target devices is completed the OTA Upgrade sever downloads a second batch of Image files from the Head End System. This Comms Hub initiated service consist of: The transmission of the push "OTAStatusReport" message; The establishment of a TLS session by the Head End System and the transmission of an "NextImageTransferResponse" command by the OTA Upgrade server; and On reception of the "NextImageTransferResponse" command, the Head End System's OTA Upgrade client downloads the requested image file.

The transmission by the Head End System of an Image Set using the WriteImageSet command and the OTA Upgrade server selection and update to its Image Transfer Status are repeated until all the image files are downloaded or the Set ID is aborted by the Head End System.

Figure 47:
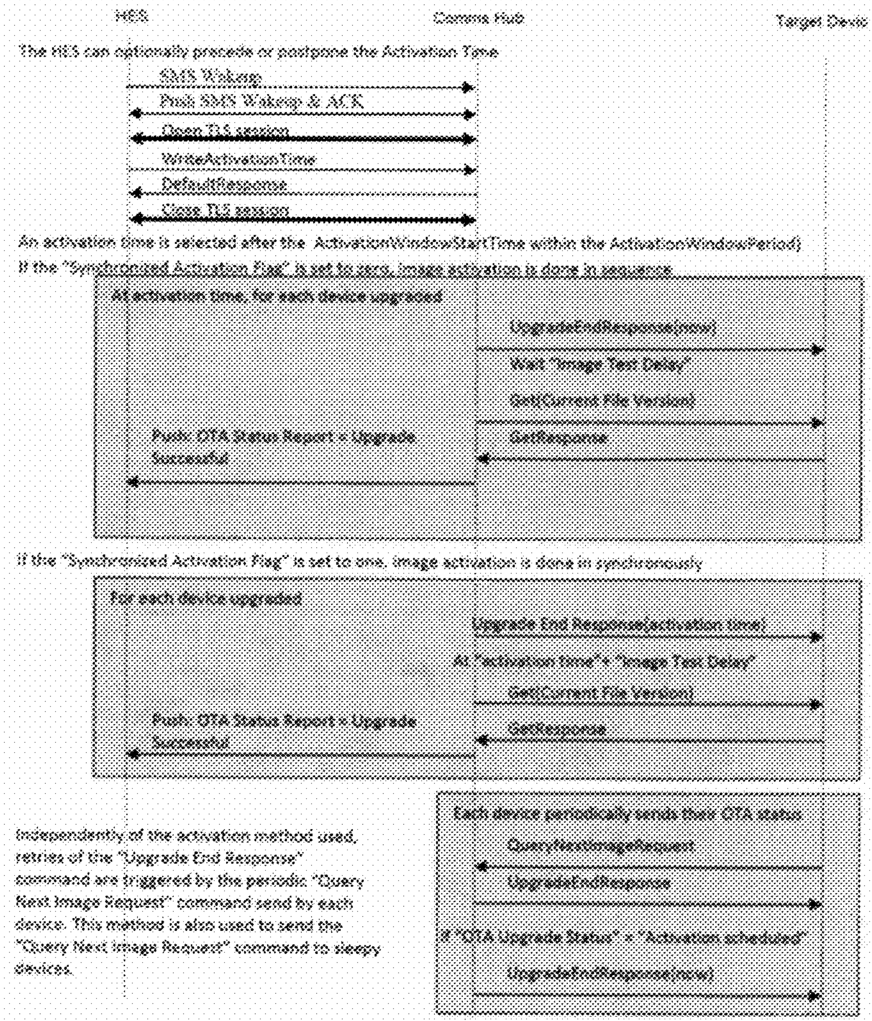
FIG. 47 is an exemplary OTA activation process flow.

The OTA activation represents the second and final part of the OTA upgrade process and is shown in FIG. 47. The second part of the OTA Upgrade process consists of the activation of the image files already distributed to the different ZigBee devices. This process consists of the following steps:

1. The Head End System can optionally re-schedule the activation time. This operation is performed using the WriteActivationTime command. This command can be sent to the OTA Upgrade server through a TLS session.
2. If the activation is sequenced, the "Synchronized Activation Flag" is set to zero in the Activation Set.
   a. The server selects a random activation time based on the current activation window received and waits until that moment.
   b. At activation time, the server selects the Image with the lowest associated "Activation Sequence Number" field and sends an "Upgrade End Response" with the "Upgrade time" field set to now (0x00000000).
   c. The OTS Upgrade server waits for the delay specified by the "Image Test Delay" attribute and issues a "Get" of the "Current File Version" attribute to verify the activation and adjust the OTAStatus information.
   d. If the Get returns the New File Version, the upgrade is successful and an OTAStatusReport is sent with the status=SUCCESS.
   e. If the Force Activation bit is set. The OTA Upgrade server repeats this operation on the following Image ordered base on the value of the "Activation Sequence Number" field independent of the success of the previous activation.
3. If the activation is synchronized, the "Synchronized Activation Flag" is set to one in the Activation Set.
   a. The server selects a random activation time based on the current activation window settings.
   b. For each device to be scheduled, the server sends an "Upgrade End Response" with the "Upgrade time" field set to the activation time. If one or more of these transmissions fail, a retry is done at each "ActivationRetryPeriod" until a successful transmission or until the activation time is exceeded.
   c. At activation time plus the value of the "Image Test Delay" attribute, the server sends a "Get" of the "Current File Version" attribute to verify the activation and adjust the OTAStatus information.
4. Independent of whether the activation is sequenced or synchronized, if one of the Images fail to activate, the server attempts to send a "Upgrade End Response" with the "Upgrade time" field set to now (0x00000000) at each reception of a "Query Next Image Request". These retries continue until the activation is successful, an AbortOtaProcess command is received of a new image file is downloaded for this Image.

Figure 48:
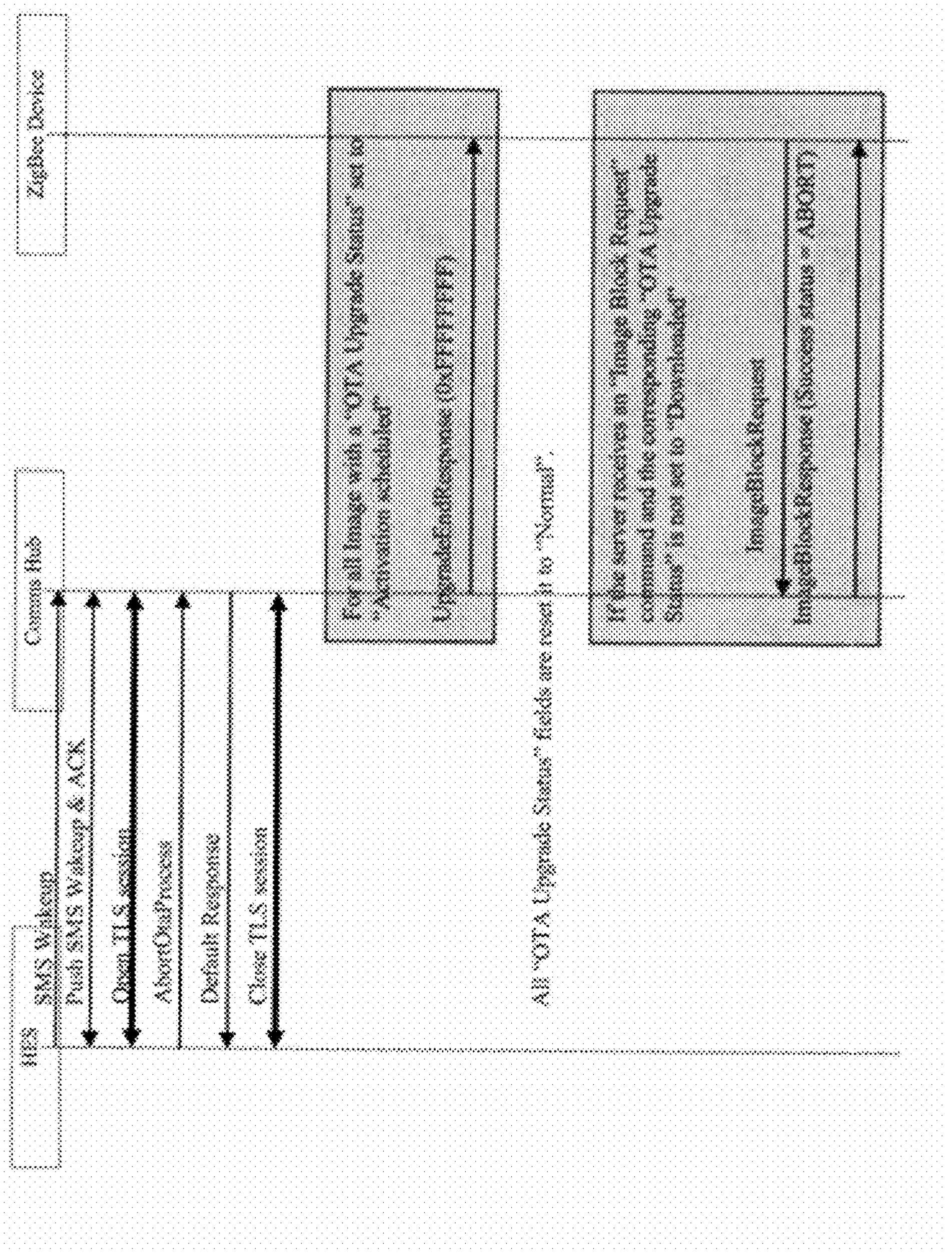
FIG. 48 is an exemplary OTA abort process flow.

The OTA Abort Process flow is shown in FIG. 48. The AbortOtaProcess starts by the reception of an AbortOtaProcess command imitated by the Head End System to the OTA Upgrade server.

1. On reception of the AbortOtaProcess command, the server sends an "Upgrade End Response" command with an "Upgrade time" set to Infinity (0xFFFFFFFF) to all clients with an OTAStatus set to ACTIVATION_SCHEDULED.
2. The server then updates all OTAStatus records to NORMAL.
3. Subsequently, if the server receives an "Image Block Request" for an Image with the status not set to "Downloaded", it returns an "Image Block Response" command with a "Status" field set to ABORT.
4. Also, if the server receives an "Upgrade End Request" for an Image with the status not set to "ACTIVATION_SCHEDULED", it returns a "Default Response" command with a "Status code" field set to ABORT.

Figure 49:
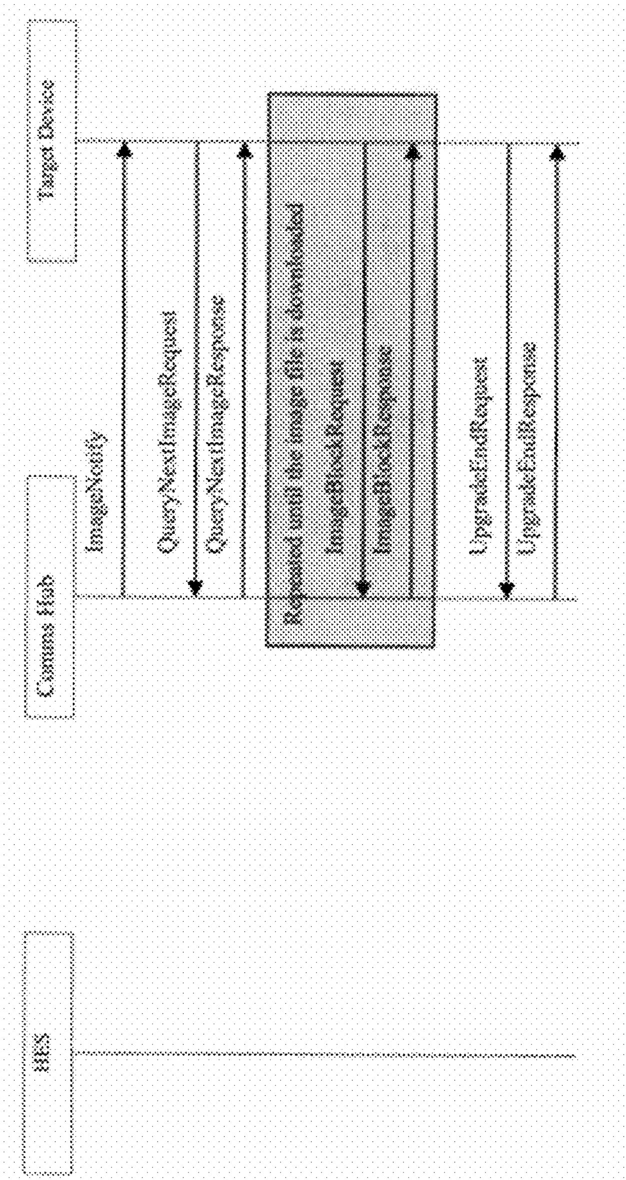
FIG. 49 is an exemplary "ZigBee Device OTA download" process flow.

The "ZigBee Device OTA download" process shown in FIG. 49 is implemented using the standard ZigBee OTA Upgrade cluster. Steps are as follows:

1. The Comms Hub transmits an ImageNotify message to the devices bound to the OTA Upgrade cluster.
2. Each target device that can match the information in the notification sends a QueryNextImage Request.
3. The Comms Hub Responds with a QueryNextImageResponse.
4. The target device then requests a block of the image file.
5. The Comms Hub responds with the first block.
6. Steps 4 and 5 are repeated until the entire image file is transferred to the target device.
7. When the target device has received the whole image file and verified the integrity of the data, it sends an UpgradeEndRequest.
8. The Comms Hub sends it UpgradeEndResponse with an activation time.
9. Steps 7 and 8 are repeated if the activation time is far enough in the future for the target device to timeout and resend the UpgradeEndRequest.

Commissioning is the process by which a HAN device registers with the Comms Hub and Head End System and the Comms Hub and device are configured. At the end of the commissioning process the device has joined the network, gotten its operational parameters and commenced operating. The commission process does not specify how the installer starts the commissioning and talks to the Comms Hub.

Figure 50A:
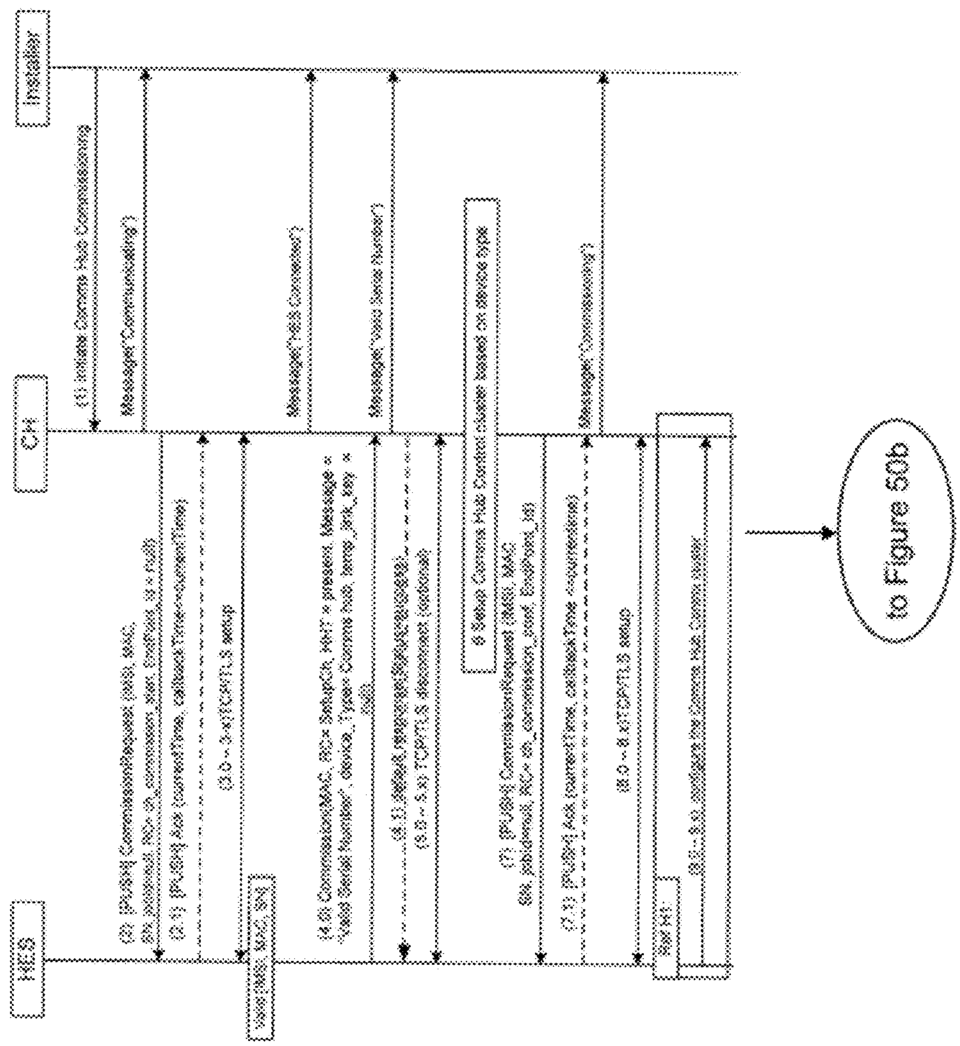
FIGS. 50a-50b show an exemplary commissioning message flow between the Comms Hub and the HES.
Figure 50B:
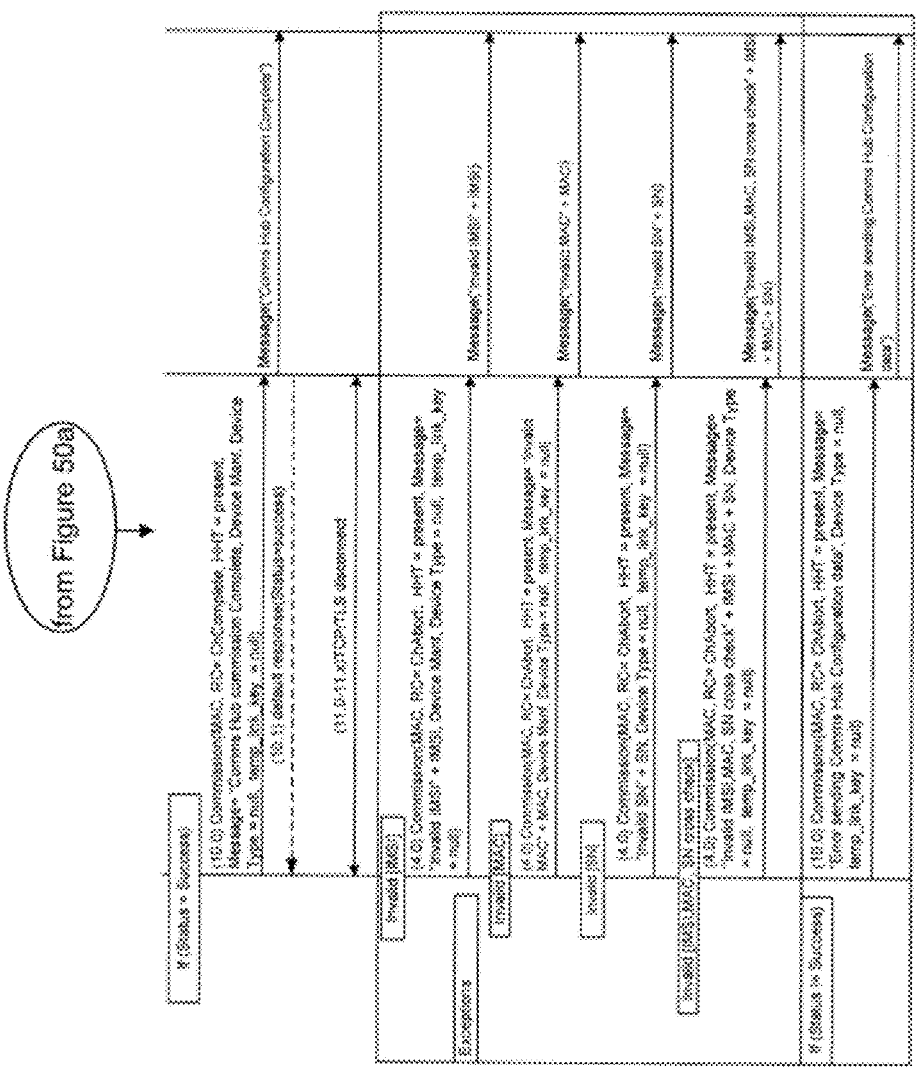

The commissioning message flow between the Comms Hub and the Head End System is shown in FIGS. 50*a* and 50*b*. The process starts with an external stimulus to the Comms Hub that may be a button push or a command on an external interface. The commissioning process in steps that are illustrative of the behavior of the Head End System but not required. These behaviors include the tearing down of the TCP/TLS sessions between stages of the process and the generation of text messages to the installer. The Head End System may manage the TCP/TLS sessions to minimize the number open processes it has during periods where it is waiting for an action from the Comms Hub. The commission protocol supports this but does not require it. The Head End System's communication of the status of the commissioning process to the installer is also optional. The content of the messages and when they are sent is exemplified, but not limited to the following:

1. The commission process is initiated by some out-of-scope stimulus that could a key pad entry or a message over the wireless network or an optical port. The information communicated to the Comms Hub is the optional jobID of the commissioning task the installer has.
2. The Comms Hub then generates a Push message, CommissionRequest, which tells the Head End System that the Comms Hub is ready to be commissioned. This message contains the IMSI and MAC Address that identifies the Comms Hub. The ZigBee Comms Hub Control cluster has not been setup yet so the EndPoint ID is not assigned yet.

2.1. The Head End System acknowledges the CommissionRequest message and tells the Comms Hub to stay connected for more messages.

3. to 3.x The TCP and TLS sessions are setup by the Head End System as described herein.

4. After the Head End System validates the Comms Hub IMSI, serial number and MAC address it sends a Commission command that tells the Comms Hub to setup the Comms Hub Control cluster.

4.1. The Comms Hub sends a ZCL default response acknowledging receipt.

5. to 5.x The Head End System optionally ends the TCP IP session while it waits for the Comms Bob to setup the control cluster.

6. The Comms Hub sets up the Comms Hub Control cluster.

7. The Comms Hub sends a Push CommissionRequest message confirming the establishment of the cluster and assigning an EndPoint ID to the cluster.

7.1. The Head End System acknowledges the CommissionRequest message and tells the Comms Hub to stay connected for more messages.

8. to 8.x The Head End establishes the TCP/TLS session if it was torn down in step 5.

9. to 9.x The Head End System sends a series of configuration write operations to the Comms Hub attributes that have to be configured. These are typically attributes for which the default values do not exist or have to be changed. The configuration commands could include: ZCL Write attribute command(s); SetPrimaryOperator and SetRoamingOperator; SetFilter; ResetLog; SetTime; SetCertificates and SetCrl.

10. The Head Ends System sends a Commission message with the ReasonCode set to ChCommplete when the commission process has completed successfully.

10.1. The Comms Hub responds with the default ZCL response indicating that the configuration is successful.

11. to 11.x The Head End System ends the TCP session.

The exception processing for invalid IMSI, MAC address, Serial Number all cause the Head End System to send a Commission message that aborts the commission processes in the Comms Hub. The commissioning process is also aborted if the Comms Hub report it is not successful in steps 4.1 or 10.1 above.

Figure 51A:
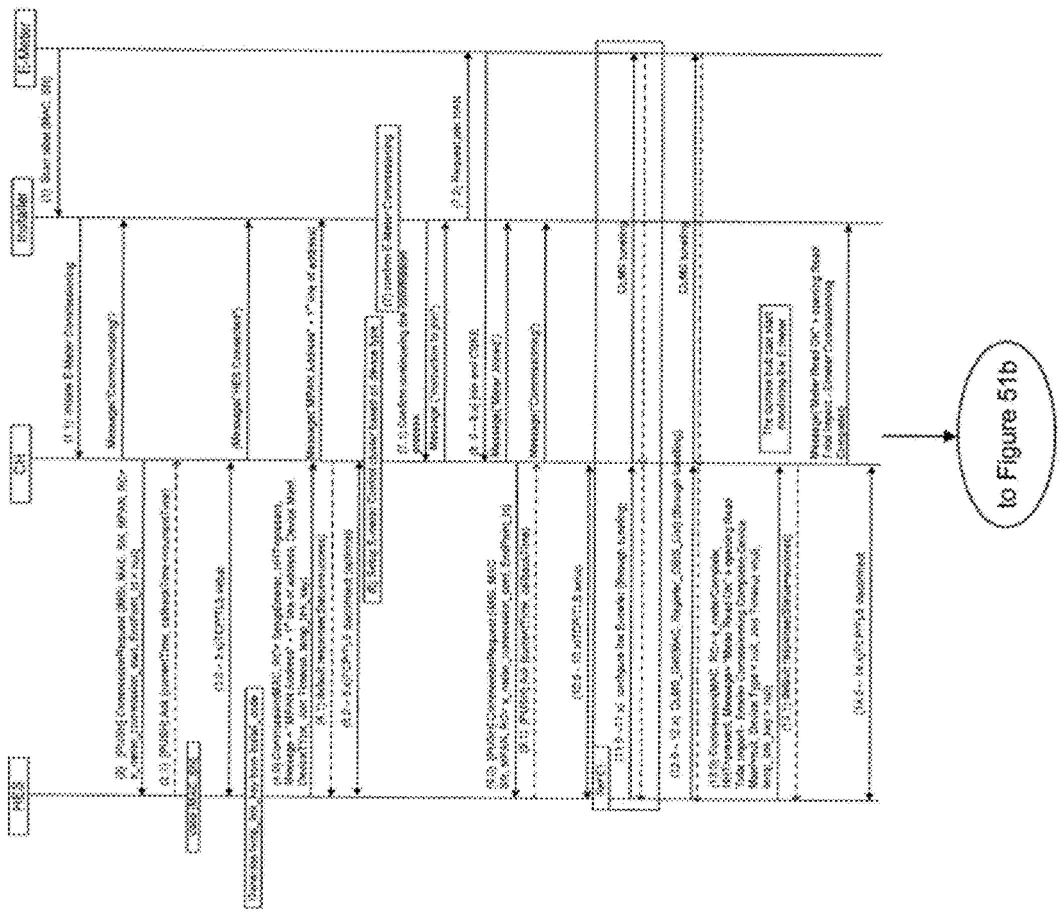
FIGS. 51a-51b show an exemplary e-meter commissioning message flow between the Comms Hub and the HES.
Figure 51B:
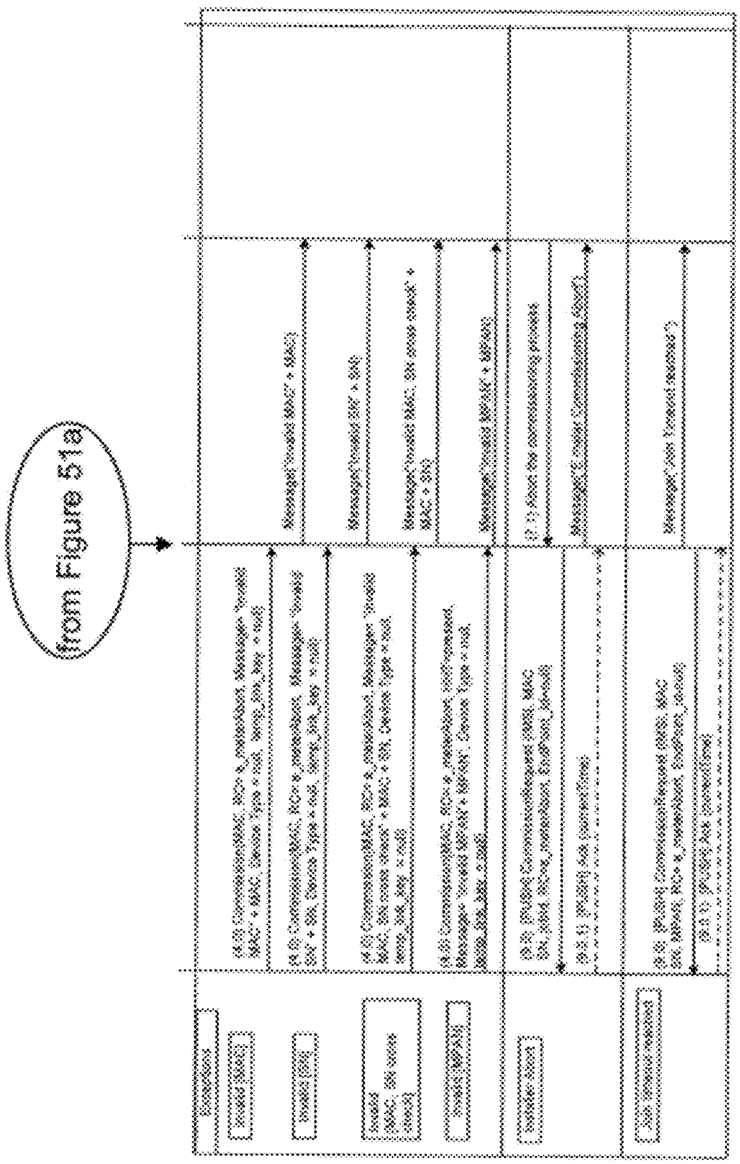

The commissioning message flow between the Comms Hub and the Head End System for commissioning an E-meter is shown in FIGS. 51*a* and 51*b*. The process shown in FIGS. 51*a* and 51*b* is for an E-meter that is not integrated with the Comms Hub. An integrated device's commissioning process is similar to that of the Comms Hub described above.

1. The process starts with the installer collecting the MAC address and serial number from the E-meter and the installation MPAN.

1.1. The installer then communicates this information to the Comms Hub. This could be via the wireless network, a keypad, or an optical port.

2. The Comms Hub sends a Push CommissionRequest to the Head End System with the meter's MAC address, serial number and MPAN.

2.1. The Head End System acknowledges the CommissionRequest message and tells the Comms Hub to stay connected for more messages.

3. to 3.x The TCP and TLS sessions are setup by the Head End System as described herein.

4. After the Head End System validates the E-meter's serial number and MAC address it sends a Commission command that tells the Comms Hub the E-meter's temporary link key and instructs the Comms Hub to setup the E-meter Control cluster.

4.1. The Comms Hub sends a ZCL default response acknowledging receipt.

5. to 5.x The Head End System optionally ends the TCP IP session while it waits for the Comms Hub to setup the control cluster and the meter to join the network.

6. The Comms Hub sets up the E-meter Control cluster.

7. The installer decides if the installation is to continue. This may be based on information sent by the Head End System to the installer.

7.1. The installer tells the Comms Hub to proceed through some process. This could be via the wireless network, a keypad, or an optical port.

7.2. The installer tells the E-meter to start the ZigBee network joining process.

8. The E-meter locates the Comms Hub, joins the network and performs the ZigBee CBKE to get the network key and a link key to the hub.

9. The Comms Hub sends a Push CommissionRequest message that confirms the establishment of the control cluster and that the E-meter has a secure link key with the hub. The CommissionRequest message contains the EndPoint ID of the meter's control cluster.

9.1. The Head End System acknowledges the CommissionRequest message and tells the Comms Hub to stay connected for more messages.

10. to 10.x The Head End establishes the TCP/TLS session if it was torn down in step 5.

11. to 11.x The Head End System sends a series of configuration write operations to the E-meter using DLMS carried over the ZigBee Gateway protocol. The Comms Hub establishes a ZigBee DLMS tunnel if the E-meter is a DLMS device.

12. The Head Ends System sends a Commission message with the ReasonCode set to EmeterCommplete when the commission process has completed successfully.

12.1. The Comms Hub responds with the default ZCL response indicating that the configuration is successful.

13. to 13.x The Head End System ends the TCP session.

The exception processing for invalid MPAN, MAC address, Serial Number all cause the Head End System to send a Commission message that aborts the commission processes in the Comms Hub. The commissioning process is also aborted if the Comms Hub reports it is not successful in step 6.0 or if the E-meter fails to join the network and get its keys in steps 8.x. The installer can abort the process in step 7.1 if the Head End System sends information to the installer that is not correct.

Figure 52A:
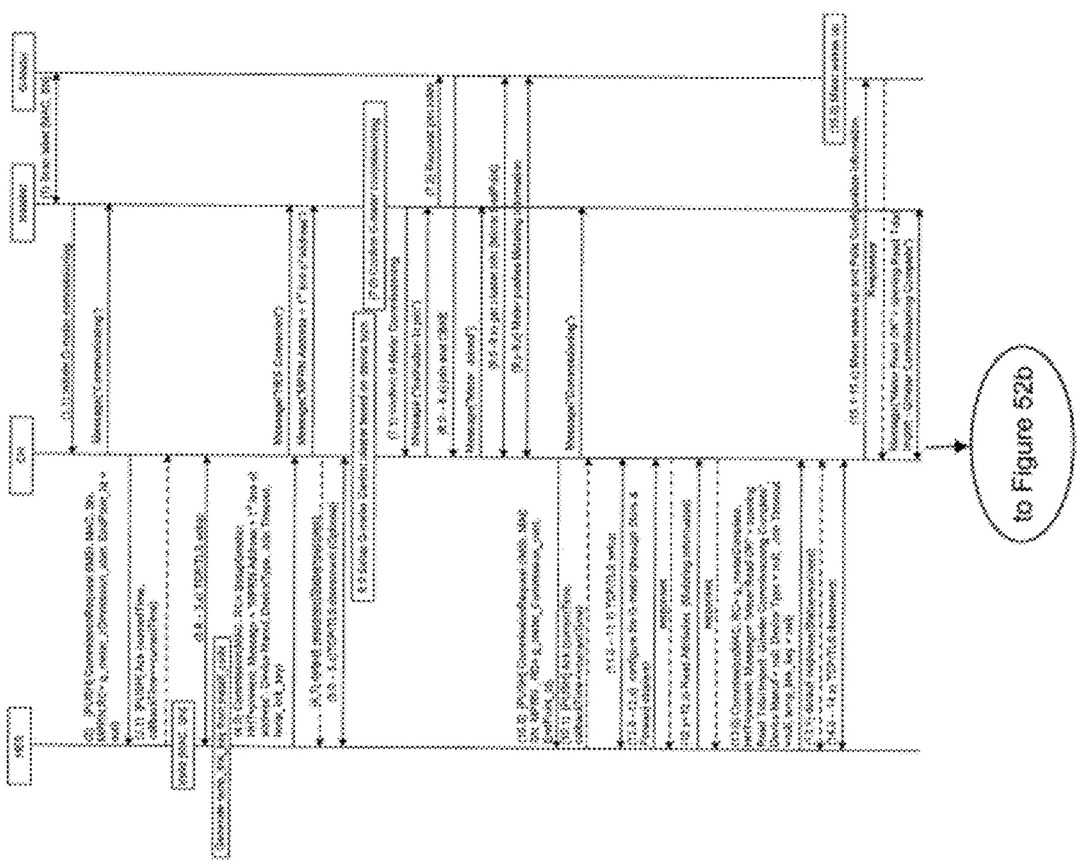
FIGS. 52a-52b show an exemplary g-meter commissioning message flow between the Comms Hub and the HES.
Figure 52B:
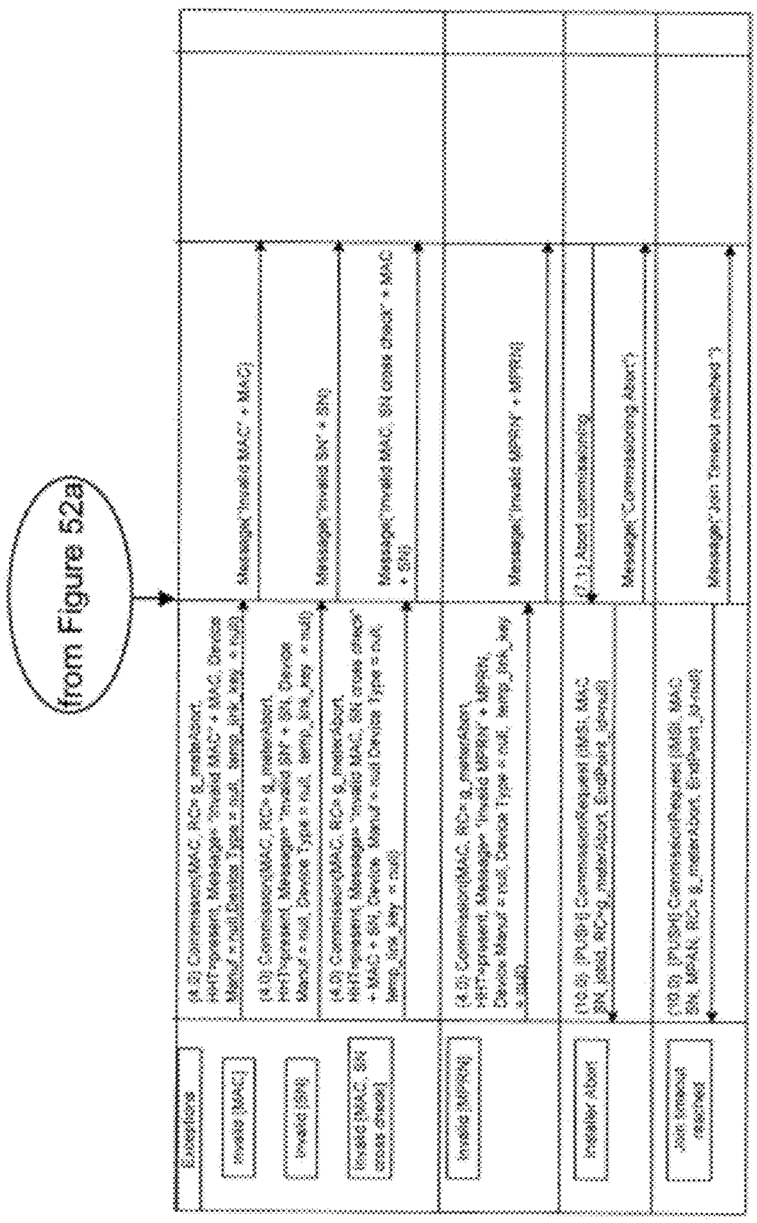

The commissioning message flow between the Comms Hub and the Head End System for commissioning a G-meter is shown in FIGS. 52*a* and 52*b*.

1. The process starts with the installer collecting the MAC address and serial number from the G-meter and the installation MPRN.

1.1. The installer then communicates this information to the Comms Hub. This could be via the wireless network, a keypad, or an optical port.

2. The Comms Hub sends a Push CommissionRequest to the Head End System with the meter's MAC address, serial number and MPRN.

2.1. The Head End System acknowledges the CommissionRequest message and tells the Comms Hub to stay awake for more messages.

3. to 3.x The TCP and TLS sessions are setup by the Head End System as described in above.

4. After the Head End System validates the G-meter's serial number and MAC address it sends a Commission command that tells the Comms Hub the G-meter's temporary link key and instructs the Comms Hub to setup the G-meter Control cluster.
   4.1. The Comms Hub sends a ZCL default response acknowledging receipt.
5. to 5.x The Head End System optionally ends the TCP IP session while it waits for the Comms Hub to setup the control cluster and the meter to join the network.
6. The Comms Hub sets up the G-meter Control cluster.
7. The installer decides if the installation is to continue. This may be based on information sent by the Head End System to the installer.
   7.1. The installer tells the Comms Hub to proceed. This could be via the wireless network, a keypad, or an optical port.
   7.2. The installer tells the G-meter to start the ZigBee network joining process.
8. The G-meter locates the Comms Hub, joins the network and performs the ZigBee CBKE to get the network key and a link key to the hub.
9. to 9.z The G-meter and the Comms Hub populates the initial meter information in the meter mirror clusters
10. The Comms Hub sends a Push CommissionRequest message that confirms the establishment of the control cluster and that the G-meter has a secure link key with the hub. The CommissionRequest message contains the EndPoint ID of the meter's control cluster.
    10.1. The Head End System acknowledges the CommissionRequest message and tells the Comms Hub to stay connected for more messages.
11. to 11.x The Head End establishes the TCP/TLS session if it was torn down in step 5.
12. to 12.y The Head End System sends a series of configuration write operations to the to the G-meter mirror using the ZigBee Gateway protocol. The Head End System also reads the information in the mirror that was populated by the G-meter in step 9. The configuration commands could include: ZCL Write commands to set G-meter Control cluster attributes; PutPrice commands to set the tariff; and PutMessage to sent text to the G-meter display.
13. The Head Ends System sends a Commission message with the ReasonCode set to GmeterCommplete when the commission process has completed successfully.
    13.1. The Comms Hub responds with the default ZCL response indicating that the configuration is successful.
14. to 13.x The Head End System ends the TCP session.
15. to 15.x The G-meter reads the configuration data in the mirror clusters and receives configuration data through publish operations such as Publish TOU. These operations have to wait for the G-meter to be awake. The meter may either stay awake after step 7.2 or go to sleep and wake up at it's regularly scheduled time in step 15.0.

The exception processing for invalid MPRN, MAC address, Serial Number all cause the Head End System to send a Commission message that aborts the commission processes in the Comms Hub. The commissioning process is also aborted if the Comms Hub reports it is not successful in step 6.0 or if the E-meter fails to join the network and get its keys in steps 8.x. The installer can abort the process in step 7.1 if the Head End System sends information to the installer that is not correct.

Figure 53A:
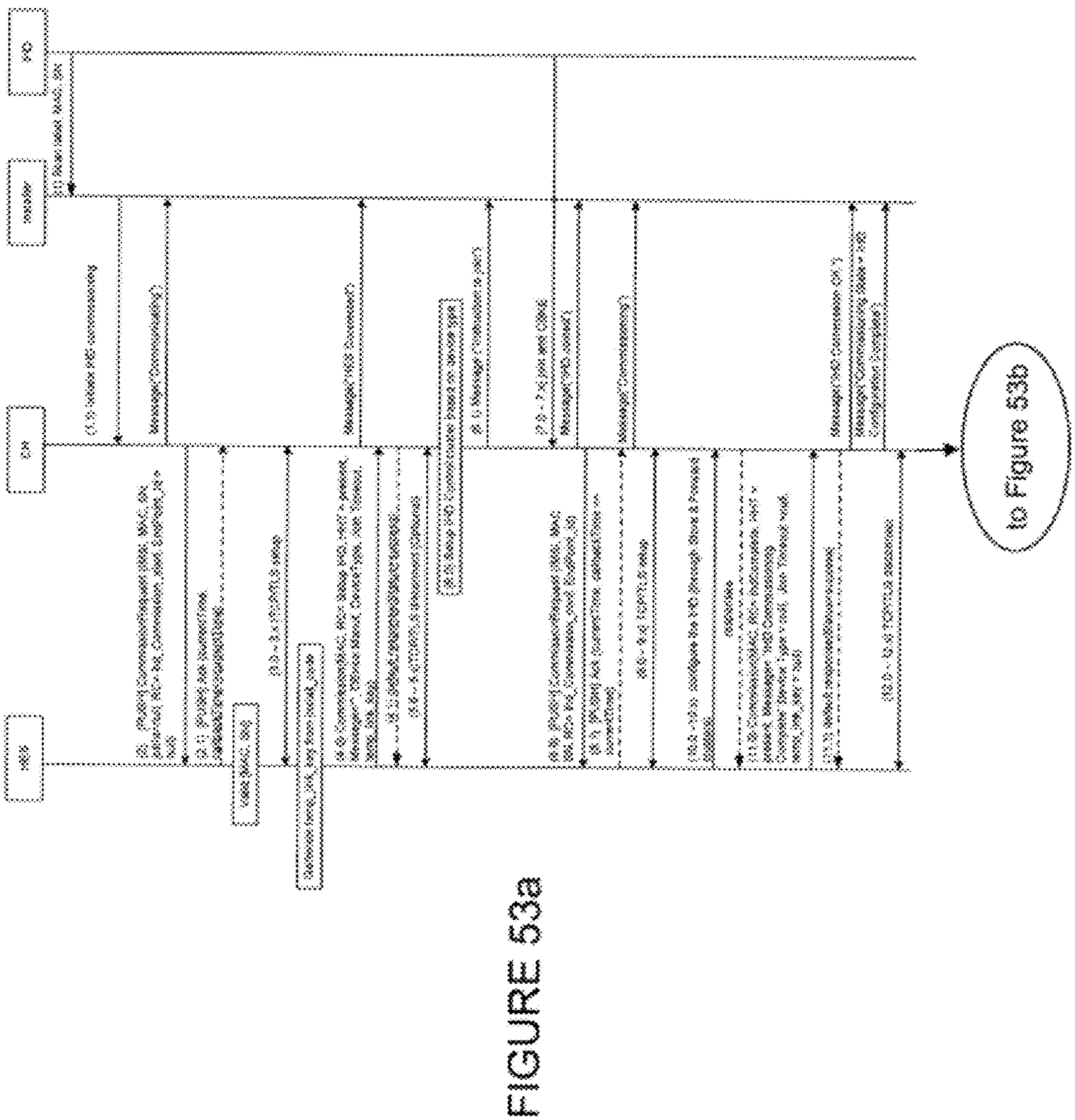
FIGS. 53a-53b show an exemplary IHD commissioning message flow between the Comms Hub and the HES.
Figure 53B:
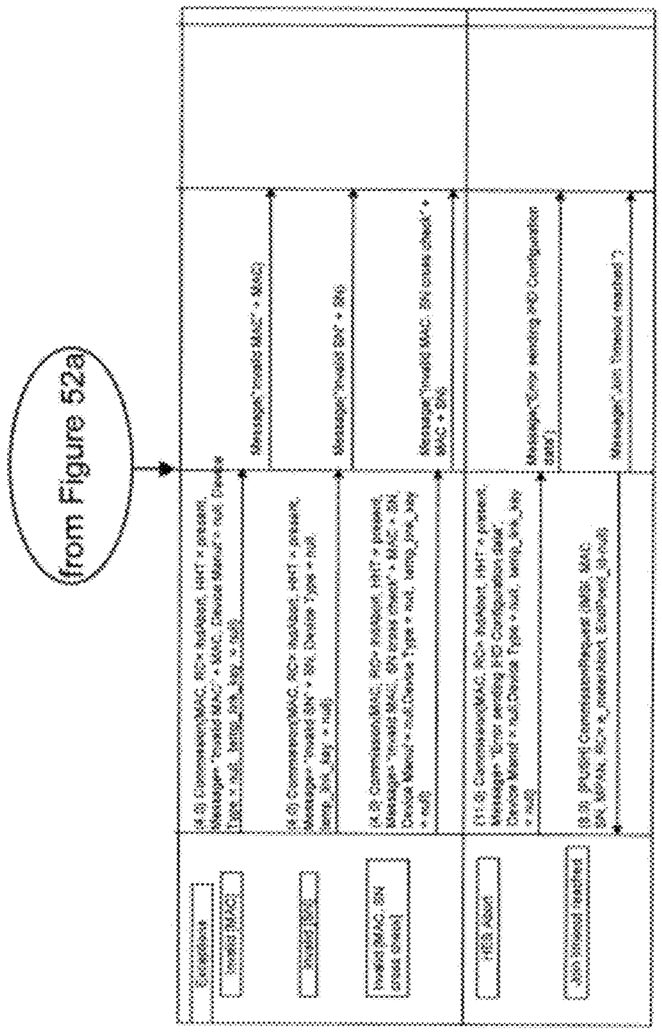

The commissioning message flow between the Comms Hub and the Head End System for commissioning an IHD is shown in FIGS. 53*a* and 53*b*.

1. The process starts with the installer collecting the MAC address and serial number from the IHD.
   1.1. The installer then communicates this information to the Comms Hub. This could be via the wireless network, a keypad, or an optical port.
2. The Comms Hub sends a Push CommissionRequest to the Head End System with the IHD's MAC address, and serial number.
   2.1. The Head End System acknowledges the CommissionRequest message and tells the Comms Hub to stay connected for more messages.
3. to 3.x The TCP and TLS sessions are setup by the Head End System as described in herein.
4. After the Head End System validates the IHD's serial number and MAC address it sends a Commission command that tells the Comms Hub the IHD's temporary link key and instructs the Comms Hub to setup the IHD Control cluster.
   4.1. The Comms Hub sends a ZCL default response acknowledging receipt.
5. to 5.x The Head End System optionally ends the TCP IP session while it waits for the Comms Hub to setup the control cluster and the meter to join the network.
6. The Comms Hub sets up the IHD Control cluster.
   6.1. The installer tells the E-meter to start the ZigBee network joining process.
7. to 7.x The IHD locates the Comms Hub, joins the network and performs the ZigBee CBKE to get the network key and a link key to the hub.
8. The Comms Hub sends a Push CommissionRequest message that confirms the establishment of the control cluster and that the IHD has a secure link key with the hub. The CommissionRequest message contains the EndPoint ID of the IHD's control cluster.
   8.1. The Head End System acknowledges the CommissionRequest message and tells the Comms Hub to stay connected for more messages.
9. to 9.x The Head End establishes the TCP/TLS session if it was torn down in step 5.
10. to 10.x The Head End System sends a series of configuration write operations to the Comms Hub using the ZigBee Gateway protocol. These are typical store and forward Put commands that configure the Comms Hub to generate ZigBee publish commands such are the Publish TOU command. The Head End System can also use RPC commands to directly configure and IHD attributes that need to be configured.
11. The Head Ends System sends a Commission message with the ReasonCode set to IHDComplete when the commission process has completed successfully.
    11.1. The Comms Hub responds with the default ZCL response indicating that the configuration is successful.
12. to 12.x The Head End System ends the TCP session.

The exception processing for invalid MAC address and Serial Number all cause the Head End System to send a Commission message that aborts the commission processes in the Comms Hub. The commissioning process is also aborted if the Comms Hub reports it is not successful in step 6.0 or if the IHD fails to join the network and get its keys in steps 7.x.

The decommissioning process removes sensitive data from the target device and the Comms Hub and then takes the device off the HAN network. The target device may or may not be in the factory default state after decommissioning. the decommission process may be initiated by either the Head End System or a service technician referred to as an installer in this section. The WAN specification does not specify how the installer starts the decommissioning and talks to the Comms Hub. The installer's interface and messaging protocol is outside of the scope of this WAN interface specification.

The flow diagrams in FIGS. 54 through 57 show the decommissioning process initiated by an installer. The same processes are followed when the decommissioning is initiated by the Head End System. In the HES case, each decommissioning flow starts with the first Decommission command from the Head End System. Also in this case, all messaging to and from the installer will not be present.

Figure 54:
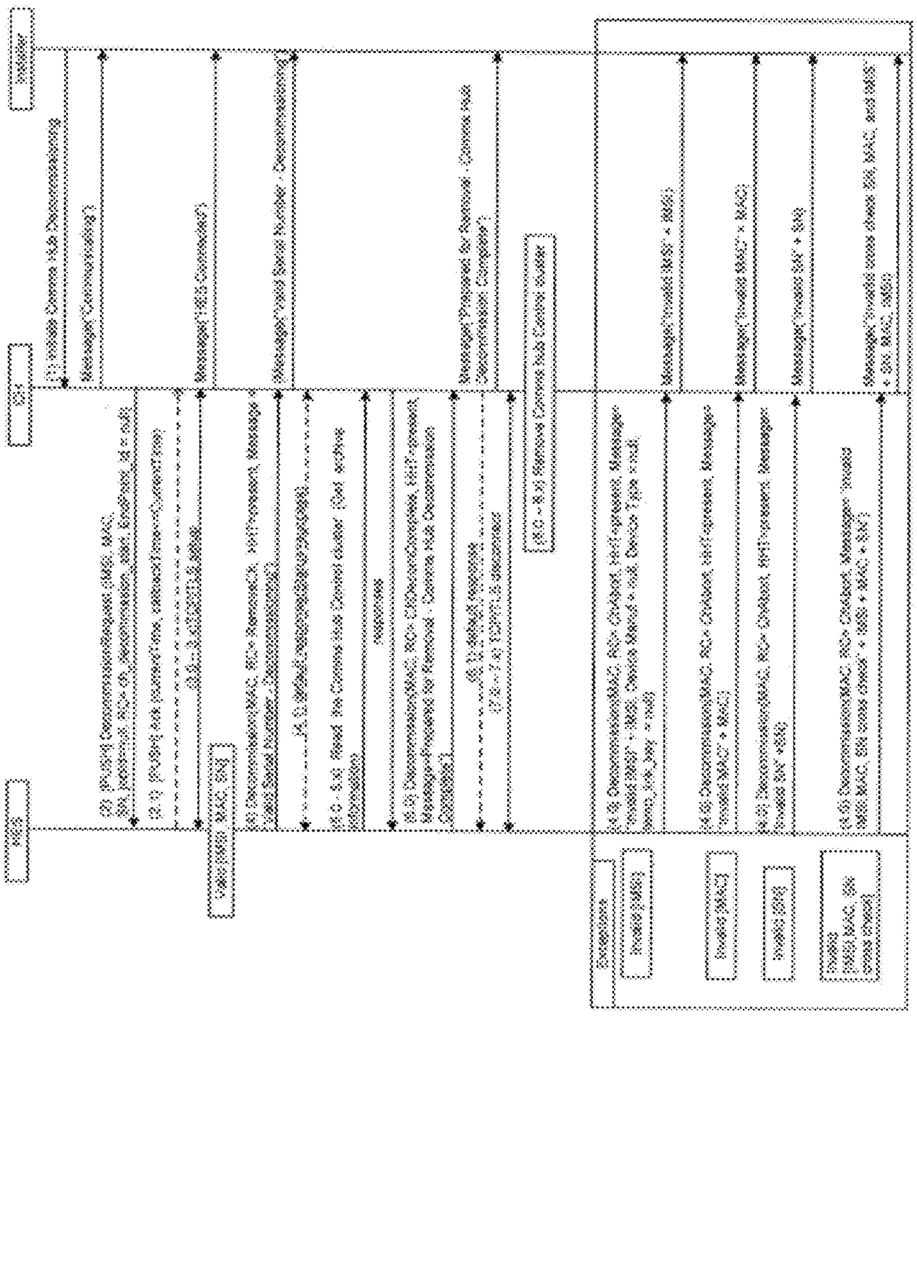
FIG. 54 shows an exemplary Comms Hub decommissioning message flow.

The Comms Hub decommissioning message flow between the Comms Hub and the Head End System is shown in FIG. 54.

1. The process can start with the installer initiating the decommissioning process or it can start with the Head End System initiating the decommissioning process in step 4.
2. The Comms Hub sends a Push DecommissionRequest to the Head End System with the Comms Hub ISMI, MAC address, and serial number.
   2.1. The Head End System acknowledges the DecommissionRequest message and tells the Comms Hub to stay connected for more messages.
3. to 3.x The TCP and TLS sessions are setup by the Head End System as described herein.
4. After the Head End System validates the Comms Hub's IMSI, serial number and MAC address it sends a Decommission command.
   4.1. The Comms Hub sends a ZCL default response acknowledging receipt.
5. to 5.x The Head End System reads the Comms Hub Control cluster and logs to archive data. It also removes any operator certificates and archives important mirrored data. The command formats are specified in the standard but selection of what to archive and remove is subject to the operator decommissioning policy.
6. The Head Ends System sends a Decommission message with the ReasonCode set to ChDecomComplete when the decommission process has completed successfully.
   6.1. The Comms Hub responds with the default ZCL response indicating that the decommissioning is successful.
7. to 7.x The Head End System ends the TCP session.
8. The Comms Hub removes the Comms Hub Control cluster.

The exception processing for invalid IMSI, MAC address, and Serial Number all cause the Head End System to send a Decommission message that aborts the decommission processes in the Comms Hub.

Figure 55:
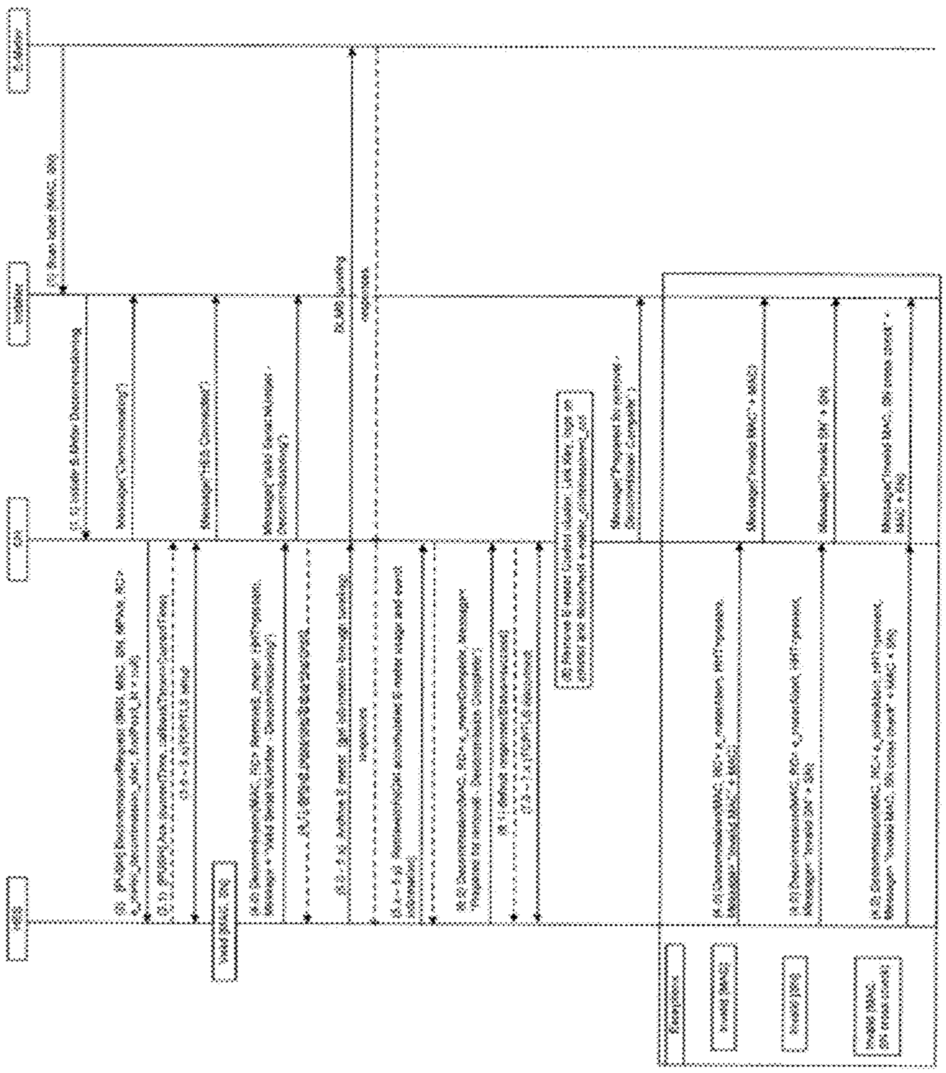
FIG. 55 shows an exemplary e-meter decommissioning message flow.

The E-meter decommissioning message flow between the Comms Hub and the Head End System is shown in FIG. 55.

1. The process can start with the installer initiating the decommissioning process or it can start with the Head End System initiating the decommissioning process in step 4.
2. The Comms Hub sends a Push DecommissionRequest to the Head End System with the E-meter's MAC address, and serial number.
   2.1. The Head End System acknowledges the DecommissionRequest message and tells the Comms Hub to stay connected for more messages.
3. to 3.x The TCP and TLS sessions are setup by the Head End System as described in Section herein.
4. After the Head End System validates the E-meter's serial number and MAC address it sends a Decommission command to the Comms Hub.
   4.1. The Comms Hub sends a ZCL default response acknowledging receipt.
5. to 5.y The Head End System reads the E-meter's Control cluster and logs to archive data. It also establishes a connection to the E-meter to meter to retrieve meter data. The command formats are specified in the standard but selection of what to archive and remove is subject to the operator decommissioning policy.
6. The Head Ends System sends a Decommission message with the ReasonCode set to EmeterDecomComplete when the decommission process has completed successfully.
   6.1. The Comms Hub responds with the default ZCL response indicating that the decommissioning is successful.
7. to 7.x The Head End System ends the TCP session.
8. The Comms Hub removes the E-meter Control cluster.

The exception processing for invalid MAC address, and Serial Number cause the Head End System to send a Decommission message that aborts the decommission processes in the Comms Hub.

Figure 56:
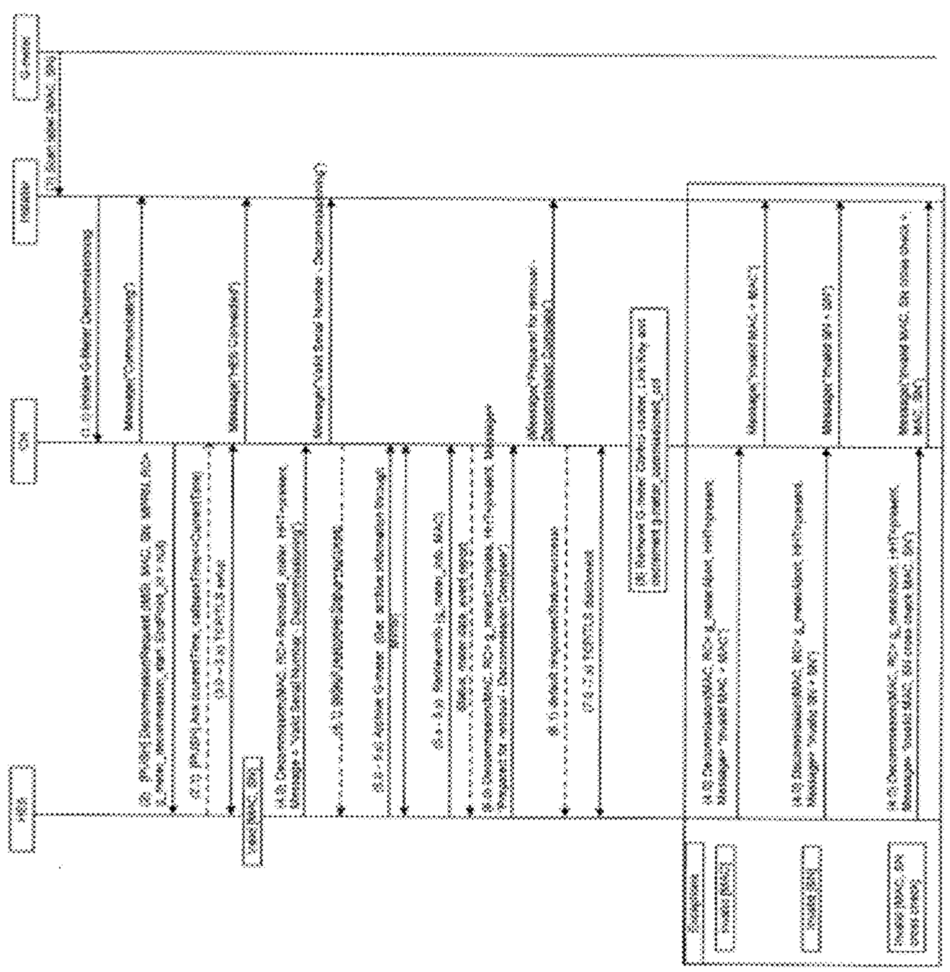
FIG. 56 shows an exemplary g-meter decommissioning message flow.

The G-meter decommissioning message flow between the Comms Hub and the Head End System is shown in FIG. 56.

1. The process can start with the installer initiating the decommissioning process or it can start with the Head End System initiating the decommissioning process in step 4.
2. The Comms Hub sends a Push DecommissionRequest to the Head End System with the G-meter's MAC address, and serial number.
   2.1. The Head End System acknowledges the DecommissionRequest message and tells the Comms Hub to stay connected for more messages.
3. to 3.x The TCP and TLS sessions are setup by the Head End System as described herein.
4. After the Head End System validates the G-meter's serial number and MAC address it sends a Decommission command to the Comms Hub.
   4.1. The Comms Hub sends a ZCL default response acknowledging receipt.
5. to 5.y The Head End System reads the G-meter's Control cluster and logs to archive data. It also archives the G-meter mirror data. The command formats are specified in the standard but selection of what to archive and remove is subject to the operator decommissioning policy.
6. The Head Ends System sends a Decommission message with the ReasonCode set to GmeterDecomComplete when the decommission process has completed successfully.
   6.1. The Comms Hub responds with the default ZCL response indicating that the decommissioning is successful.
7. to 7.x The Head End System ends the TCP session.
8. The Comms Hub removes the G-meter Control cluster and mirrors.

The exception processing for invalid MAC address, and Serial Number cause the Head End System to send a Decommission message that aborts the decommission processes in the Comms Hub.

Figure 57:
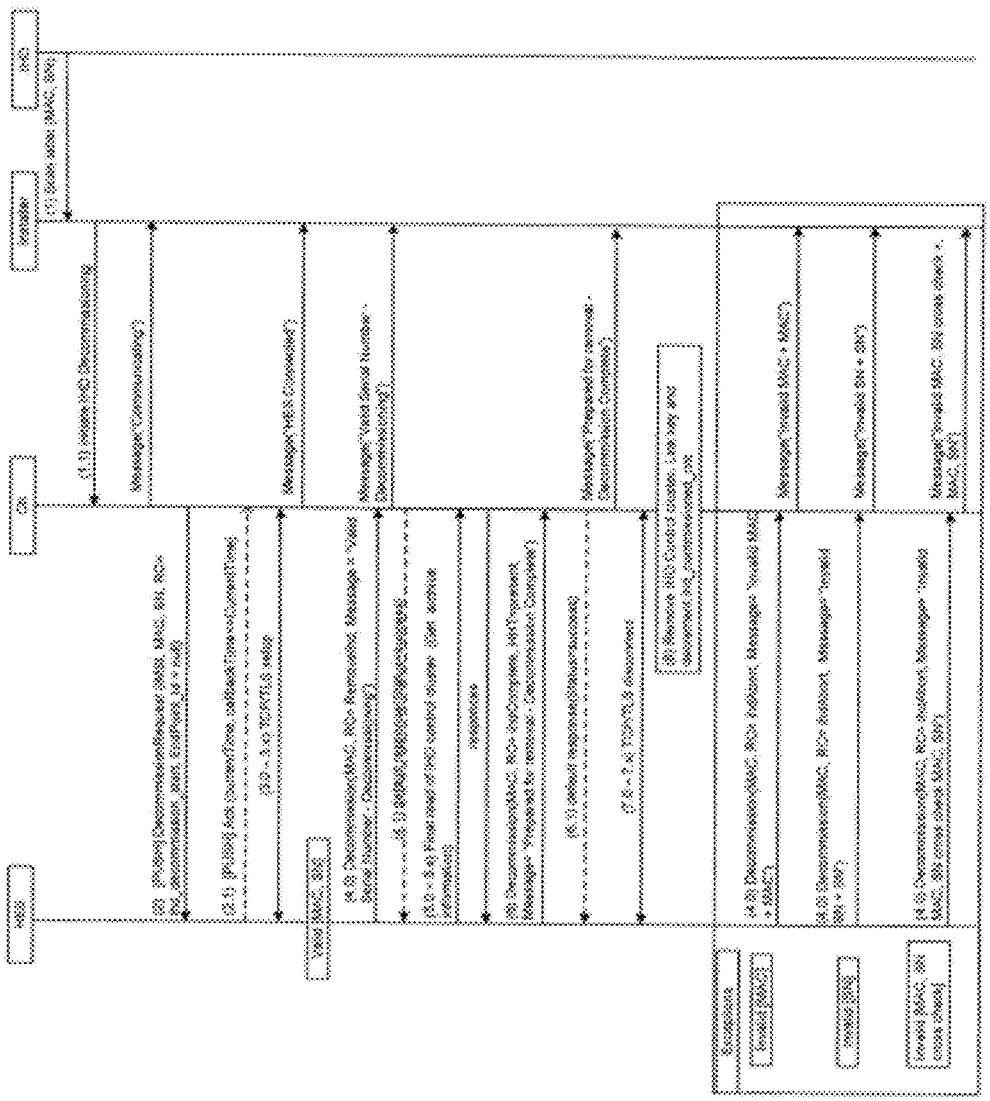
FIG. 57 shows an exemplary IHD decommissioning message flow.

The IHD decommissioning message flow between the Comms Hub and the Head End System is shown in FIG. 57.

1. The process can start with the installer initiating the decommissioning process or it can start with the Head End System initiating the decommissioning process in step 4.
2. The Comms Hub sends a Push DecommissionRequest to the Head End System with the IHD's MAC address, and serial number.
   2.1. The Head End System acknowledges the DecommissionRequest message and tells the Comms Hub to stay connected for more messages.
3. to 3.x The TCP and TLS sessions are setup by the Head End System as described herein.

4. After the Head End System validates the IHD's serial number and MAC address it sends a Decommission command to the Comms Hub.
   4.1. The Comms Hub sends a ZCL default response acknowledging receipt.
5. to 5.y The Head End System reads the IHD's Control cluster and logs to archive data. The command formats are specified in the standard but selection of what to archive and remove is subject to the operator decommissioning policy.
6. The Head Ends System sends a Decommission message with the ReasonCode set to IhdDecomComplete when the decommission process has completed successfully.
   6.1. The Comms Hub responds with the default ZCL response indicating that the decommissioning is successful.
7. to 7.x The Head End System ends the TCP session.
8. The Comms Hub removes the IHD Control cluster.

The exception processing for invalid MAC address, and Serial Number cause the Head End System to send a Decommission message that aborts the decommission processes in the Comms Hub The client application processes for the Comms Hub are organized as processes in ZigBee clusters. Each device in the HAN has a control cluster with the virtual devices attributes and the associated methods. The control clusters are defined by the cluster ID and endpoint ID. Meters of the same type have a common cluster ID. The Comms Hub has one control cluster that the HES uses to manage and monitor it. The Comms Hub clusters provide: control and monitoring for each HAN device: G-meter(s), E-meter(s), IHD(s) and the Comms Hub; OTA updates using the extensions to the OTA Upgrade cluster set up image sets for Comms Hub to download for each HAN device and provide firmware updates for all the HAN devices; scheduling of the Comms Hub activities, such as pushing meter reports to the HES and getting E-meter data; Push message processing which is the process that collects meter information that is pushed at the scheduled time, e.g., includes events that are reported but don't have to be pushed to the HES in real-time; Communication stack management which configures the communication stack layers using the Comms Hub Control cluster attributes for TCP-UDP, IPv4, PPP setup, and GPRS modem setup; Security via the Security Control cluster that controls the WAN and HAN security, setting up certificates, updating keys and controlling white lists and black lists; Log maintenance via the Log Control cluster is used to configure events for logging and reporting and to manage the logs maintained for each of the HAN devices and the Comms Hub; Time management via the ZigBee Time Control cluster manages the Comms Hub clock synchronization process with the HES and sets the parameters used by the ZigBee Time cluster used by the HAN devices; Device commissioning and decommissioning via the Commissioning Control cluster which defines the processes used by the Comms Hub to commission HAN devices (these processes are used by the HHT to initiate and monitor the commissioning and decommissioning actions and by the HES to control the commissioning of devices); Storage and forwarding of ZigBee Smart Energy information via extensions to the Smart Energy clusters which allow the HES to send tariff and price calculation information to the ZigBee meter and display devices.

In the preferred embodiments described herein, the Comms Hub communicates with the HAN devices using the ZigBee network stack. These communications' application payloads can be either DLMS/COSEM payloads or ZigBee application payloads. There are two ZigBee network stacks: one stack with a full APS for HAN device communications, and one with Inter-PAN and a stub APS that is used only by the HHT. The HHT forms a simple point-to-point connection with the Comms Hub. The messages sent use the IEEE 802.15.4 physical layer, the data link layer, and the ZigBee network layer. At the network layer the HHT messages are diverted to a stub Application Protocol Sub-layer that provides an application interface, which allows transmission of messages without the formation of a HAN network.

Figure 58:
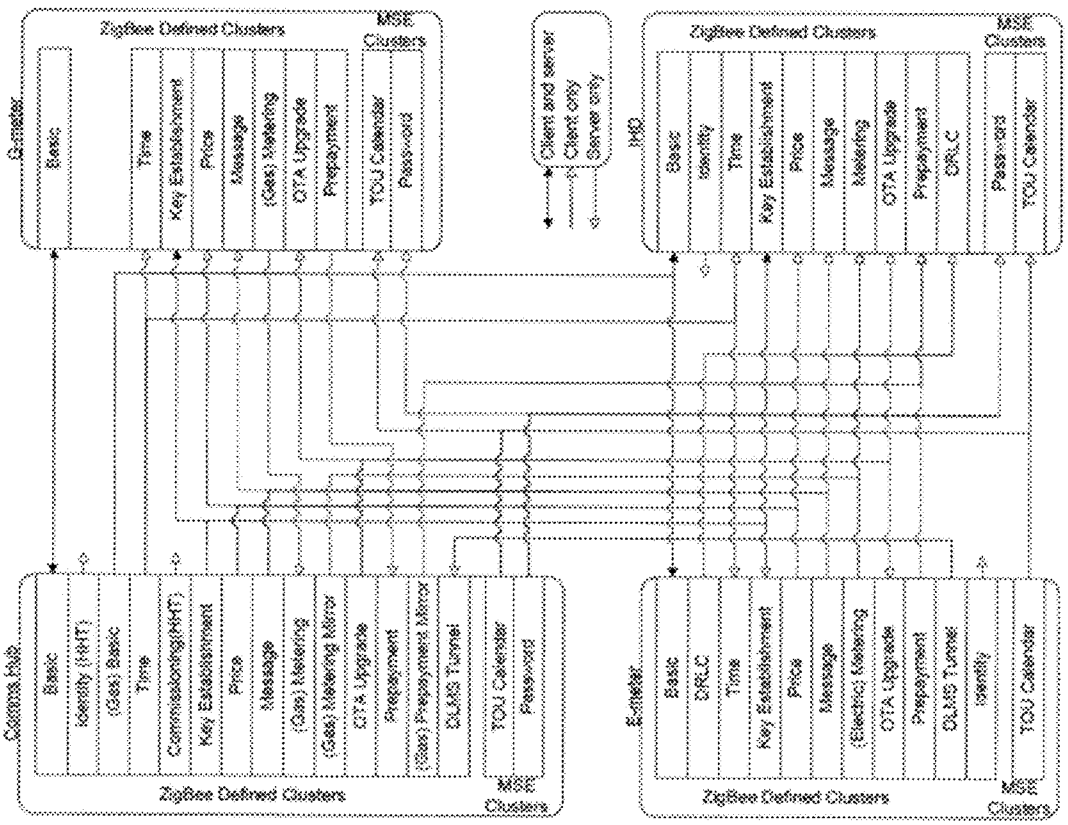
FIG. 58 shows exemplary application data flows between the clusters of the Comms Hub, E-meter, G-meter and IHD.

The HAN network architecture is based on the IEEE 802.15.4 physical layer using the 2.4 GHz DSSS radio, the IEEE 802.15.4-2006 MAC, the ZigBee network layer, the ZigBee Smart Energy Profile Specification, ELS cluster extensions, and relevant ZigBee application clusters. Detailed descriptions of these specifications are known to those skilled in the art and are thus considered part of this application. The application data flows between the clusters of the Comms Hub, E-meter, G-meter and IHD are shown in FIG. 58. Each cluster in a device has an interface for a client, a server, or both. The clusters communicate to the clusters of other devices using the ZigBee network stack.

Most clusters communicate directly with their corresponding cluster in other devices. However, the G-meter is a battery operated device that keeps its radio turned off most of the time. It is configured to generate periodic metering messages to the Comms Hub. To support regular access to the G-meter data by the IHD, the Comms Hub provides a mirror cluster, the Gas Mirror. The Gas Mirror is based on the ZigBee Metering client. It presents the G-meter data to other HAN devices. The mirror allows battery devices to store data in the Comms Hub for other devices to retrieve. To accomplish this, the G-meter's Gas Metering server cluster is bound to the Gas Metering client cluster in the Comms Hub. The IHD then binds its Metering client cluster to the Comms Hub's Gas Metering Mirror server cluster that has the stored mirror information. Occasionally the G-meter is also required to get information stored in the Comms Hub. The Comms Hub indicates what information should be retrieved using the Notification status bits that are periodically read by the G-meter.

The IHD may also bind its Meter client cluster to the E-meter's Electric Meter server cluster so that it can collect electrical usage data. The E-meter may implement ZigBee Clusters to support its communications on the ZigBee network and its DLMS communication to the HES using a ZigBee DLMS Tunnel to the Comms Hub.

Various additional communication flows between the HES, Comms Hub and HAN devices are described below.

Figure 59:
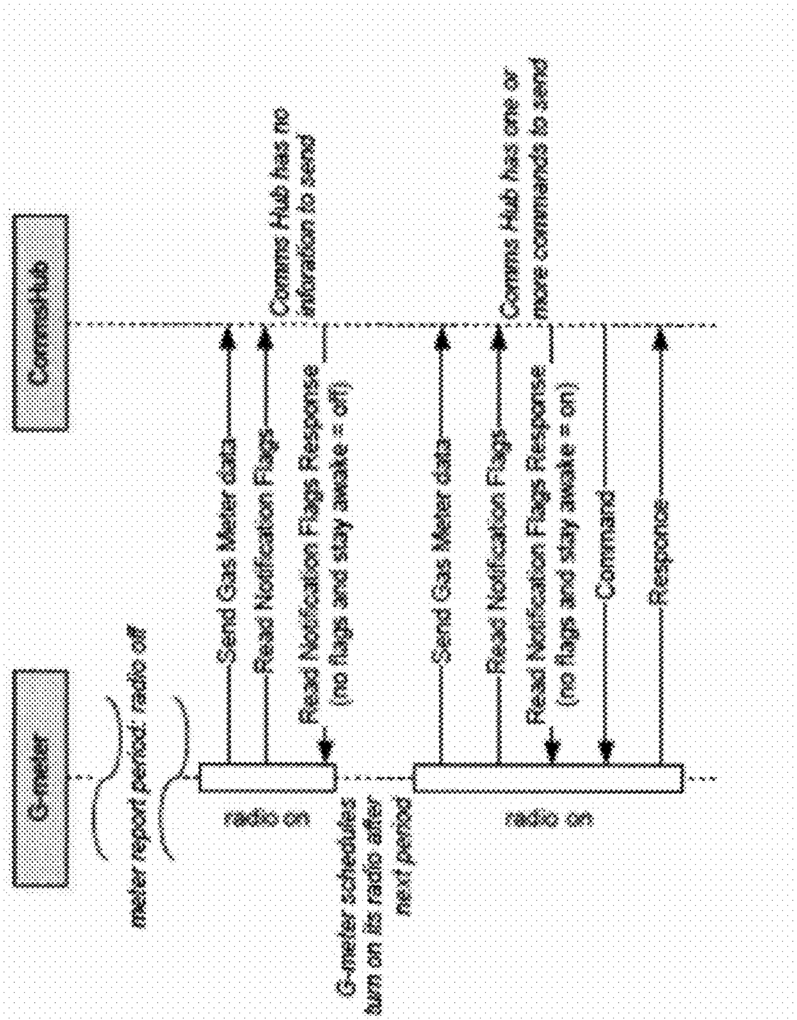
FIG. 59 shows an exemplary communication flow from a sleepy g-meter.

Referring to FIG. 59, an exemplary communication for a gas meter (G-meter) is shown. The G-meter is a sleepy device that communicates only with the Comms Hub. It uses a data push model wherein at scheduled times, it transmits data to the Comms Hub or reads data from the Comms Hub. The Comms Hub does not initiate communications with the G-meter and it does not do unsolicited reads or writes. In FIG. 59, the G-meter initiates a scheduled transmission by turning on its radio and sending its Meter cluster data to the Comms Hub. The G-meter then reads the Notification register in the Comms Hub. The register has flags that tell the G-meter to gets different types of data or to just stay awake and receive commands from the Comms Hub. The first time this register has no flags set and the G-meter goes to sleep. The second time the G-meter wakes up it reads the Notification and sees the flag that asks it to stay awake. The Comms Hub then sends what every command it has ready after which the G-meter's radio goes to sleep. If any of the Notification register flag bits for operations are set, the G-meter can perform those operations now or later. The G-meter clears the Notification bits as operations are performed. The stay-awake flag in the Get Notification Flags Response remains active so long as the Comms Hub has commands to send to the G-meter.

Figure 60:
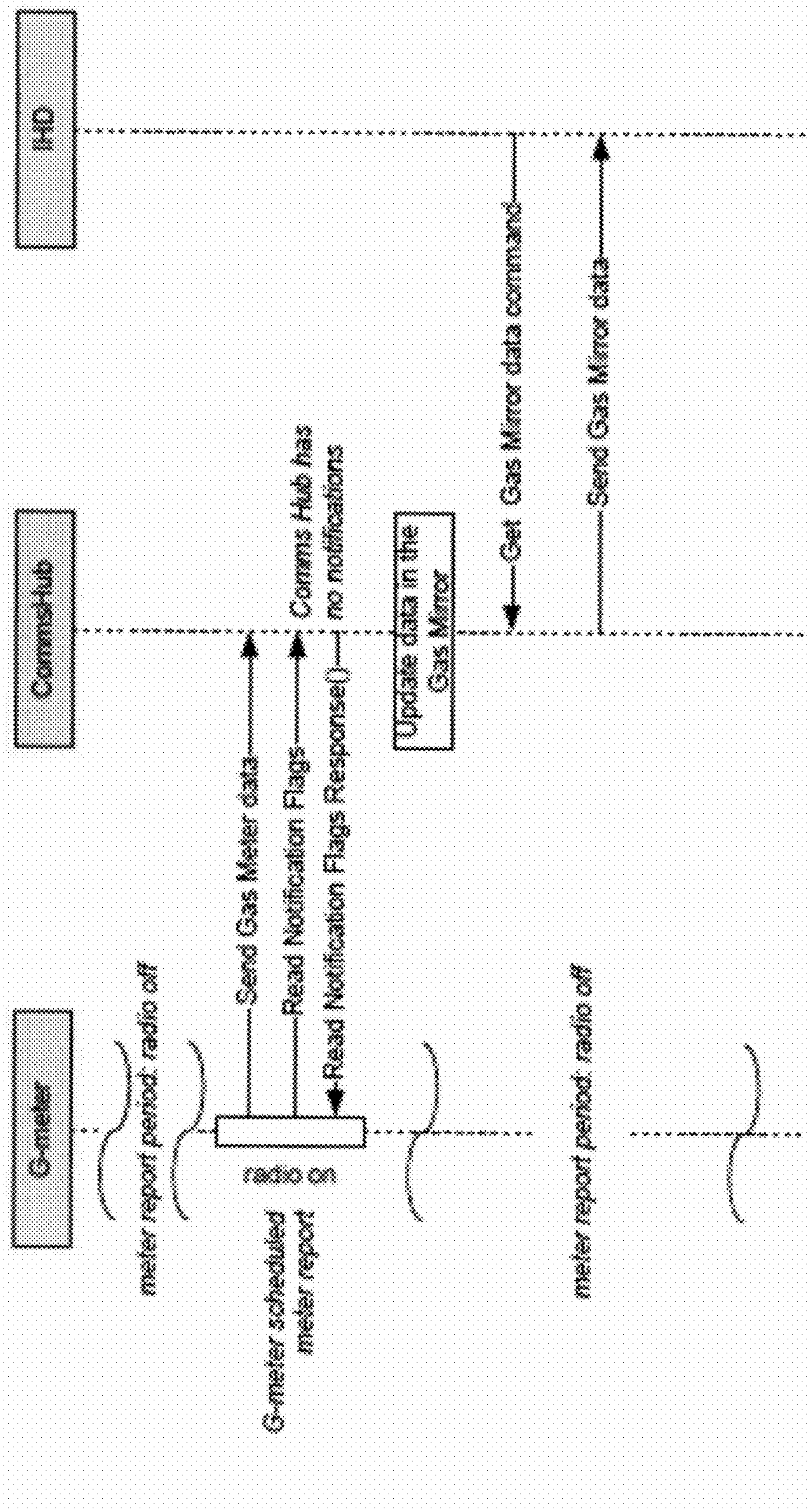
FIG. 60 shows an exemplary communication flow from a sleepy g-meter to an IHD using the Comms Hub as a proxy.

The Gas Mirror cluster in the Comms Hub acts like a proxy for the G-meter's Gas Meter cluster. The G-meter is a battery operated device that only turns its radio on when it needs to communicate with the Comms Hub. The Comms Hub cannot initiate communications with the G-meter. As shown in FIG. 60, the G-meter turns on its radio and sends its Gas Meter clusters data to the Comms Hub at scheduled intervals where it is stored in the Gas Mirror. This enables the IHD to retrieve gas usage data from the Comms Hub at any time as if it was communicating with the G-meter.

Figure 61:
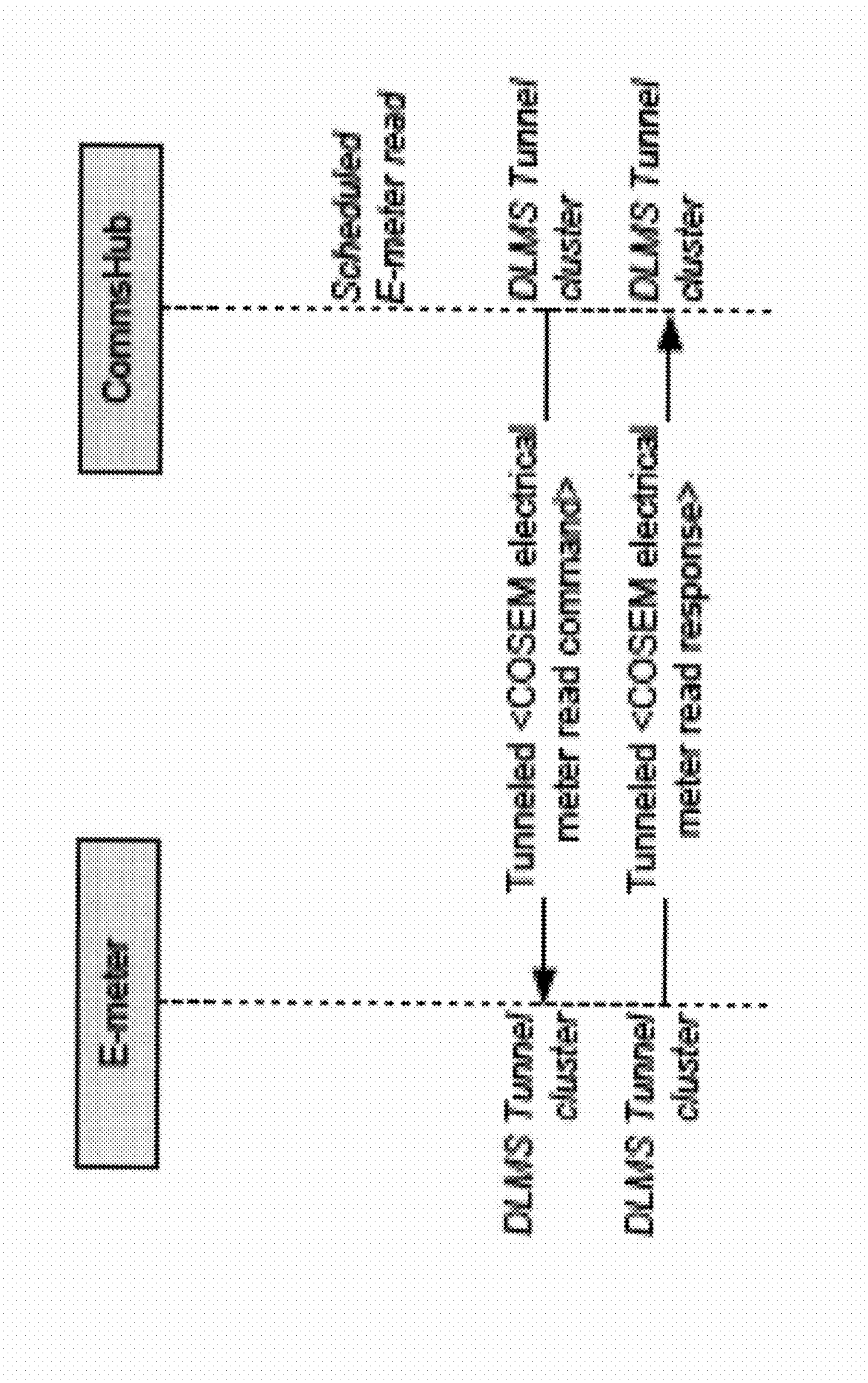
FIG. 61 shows an exemplary communication flow from Comms Hub to e-meter.

The Comms Hub communicates with the E-meter using DLMS/COSEM. The COSEM messages are sent using the ZigBee DLMS Tunnel cluster. These communications are initiated by the Comms Hub to get meter usage data and management information for the E-meter. This process is shown in FIG. 61. The read operation is started by Comms Hub. It first establishes a tunnel with the E-meter and then does a DLMS association with the E-meter before doing any DLMS operations. The tunnel setup and association is not shown in FIG. 61. The read sequence shown is a simple two-way message transaction that may be repeated several times to gather all the data the Comms Hub needs.

The Comms Hub communicates with the E-meter using the ZigBee application layer clusters associated with joining, binding, and commissioning. The ZigBee cluster connections between the Comms Hub and the E-meter are shown in FIG. 58. Most operations like those associated with the TOU calendar, price calculation and time maintenance are done using DLMS and ZigBee.

The Comms Hub polls each E-meter for alai ms and events at a configurable rate that can be as fast as once per 7.5 seconds. The Comms Hub also polls each E-meter for meter metrics at a configurable rate that is typically set to be once a day just after midnight. All the scheduled polls by the Comms are randomized in a small window to prevent data flooding in a neighborhood containing many Comms Hubs.

Both the Head End System's COSEM applications and the Comms Hub's COSEM applications can communicate over the HAN network with the E-meter using the ZigBee DLMS Tunnel cluster.

The DLMS defined WPDU contains the DLMS Wrapper Header and the DLMS APDU. The ZigBee OTA Tunnel TransferData command carries the WPDU as shown in Table 15 below.

TABLE 15

| | ZigBee | DLMS WPDU | | | | |
|---|---|---|---|---|---|---|
| Size | 2 bytes | 2 bytes | 2 bytes | 2 bytes | 2 bytes | — |
| Field Name | TunnelID | version | Source wPort | Destination wPort | Length | APDU (payload) |

Figure 62:
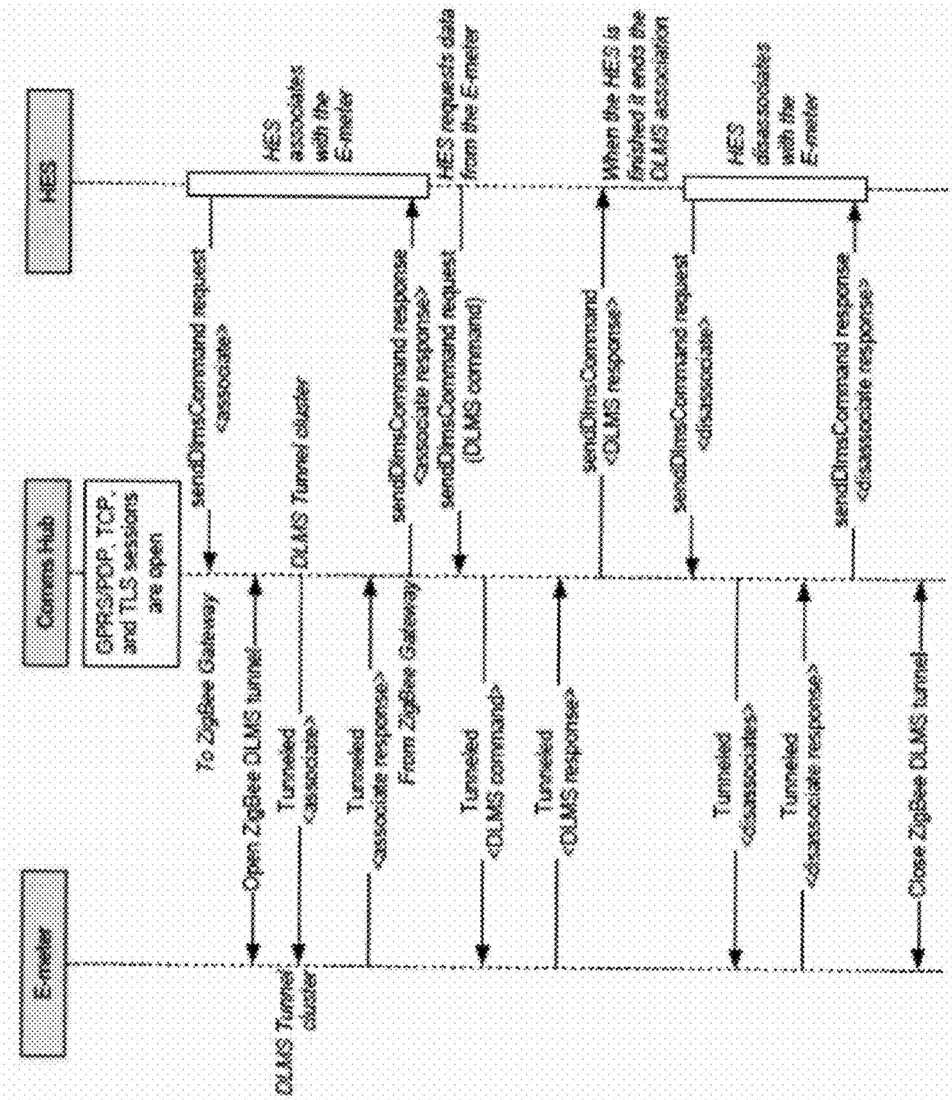
FIG. 62 shows an exemplary communication flow from HES to e-meter.

FIG. 62 illustrates the flow for the Head End System that sends a COSEM command to the E-meter using the DLMS Tunnel over ZigBee. In this example, the Head End System already has a WAN connection, TCP session, and TLS session established with the Comms Hub. The Head End System requests data from the E-meter by doing a ZigBee gateway sendDlmsCommand request to the Comms Hub that targets the E-meter's MAC address. This command contains a DLMS association with the E-Meter. The Comms Hub then uses the ZigBee DLMS Tunnel cluster to establish a DLMS tunnel to the E-meter after which it sends the association command. The Comms Hub returns the E-meter's association response to the Head End System. The Head End System is now able to communicate to the E-meter using the ZigBee Gateway sendDlmsCommand request and response commands and the ZigBee Tunnel cluster. The E-meter receives DLMS commands over the ZigBee Tunnel and generates a DLMS response which it returns over the same tunnel. The Comms Hub takes the responses and sends them to the Head End System using the ZigBee Gateway sendDlmsCommand response command. When the Head End System is finished it terminates the DLMS association. After the E-meter has responded to the association termination the Comms Hub goes through the process to terminate the ZigBee Tunnel with the E-meter.

The Head End System sends various sets of information to the HAN devices using the ZigBee Message, Price, TOU Calendar, and Password cluster put commands. The Head End System accomplishes this by setting the appropriate information in the appropriate Comms Hub cluster. The HAN devices either poll the Comms Hub clusters for the information, or are sent it use the ZigBee Publish commands. The modes are shown in Table 16.

TABLE 16

| Cluster | E-meter, IHD | G-meter | HHT |
|---|---|---|---|
| Message | Pushed by the Comms Hub to the IHD. DLMS is used to send messages to the E-meter | Notification is sent following a G-meter communication. G-meter then polls | Publish |
| Price | Pushed by the Comms Hub to the IHD. DLMS is used to send price information to the E-meter | Notification is sent following a G-meter communication. G-meter then polls | N/A |
| TOU Calendar | Pushed by the Comms Hub to the IHD. DLMS is used to send TOU information to the E-meter | Notification is sent following a G-meter communication. G-meter then polls | N/A |
| Password | Pushed by the Comms Hub to the IHD. DLMS is used to send password information to the E-meter | Notification is sent to the G-meter to stay awake and then the password is published. | N/A |

Figure 63:
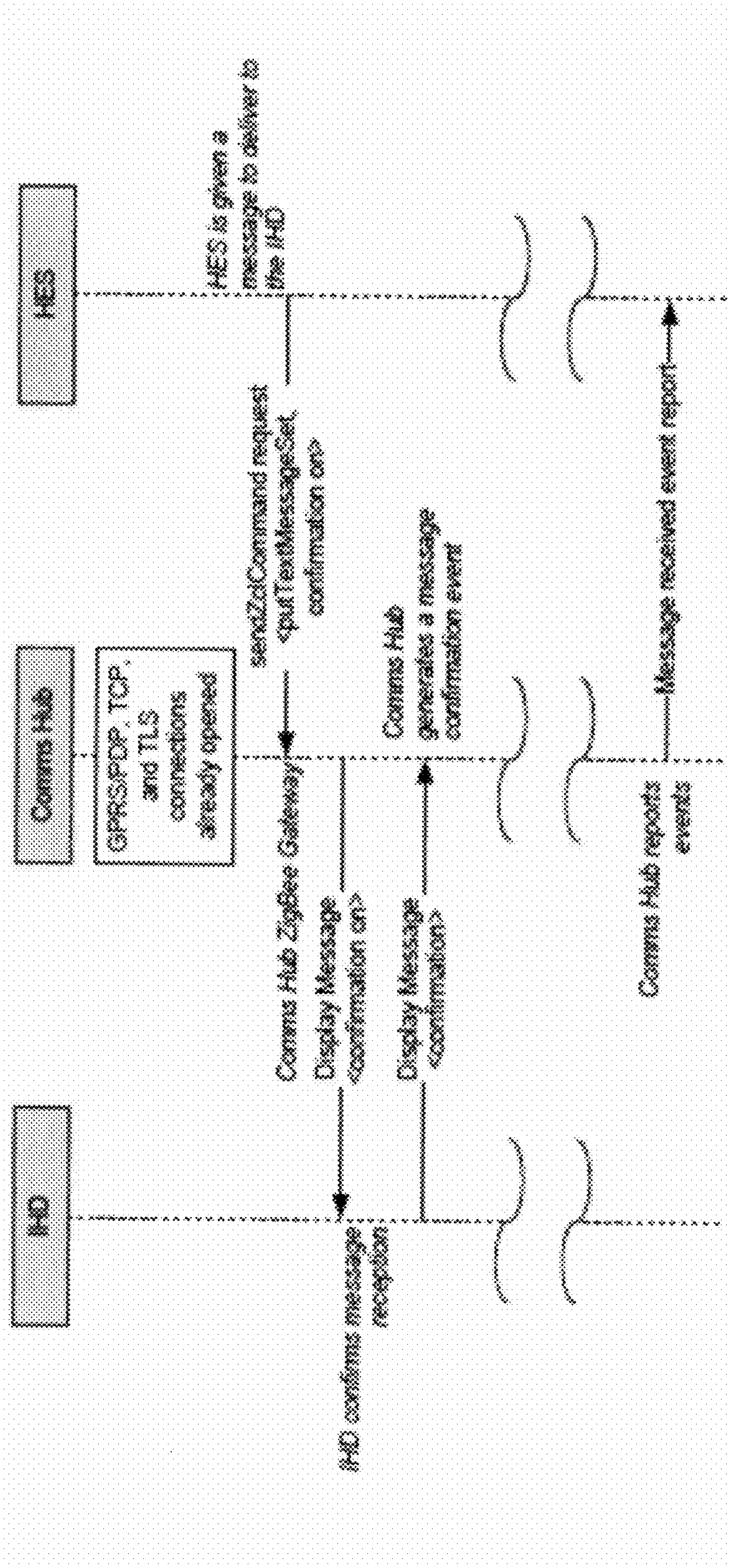
FIG. 63 shows an exemplary communication flow from HES to IHD.

In the example shown in FIG. 63, the Head End System sends a display message to the IHD's ZigBee Message Cluster. In this example the Head End System already has a WAN connection to the Comms Hub, so it sends the a ZigBee gateway sendZclCommand containing the putTextMessageSet command to the Comms Hub using the MAC address of the IHD. This Head End System message is acknowledged by the IHD if the putTextMessageSet command requests a confirmation. The Comms Hub receives the Head End System ZigBee gateway message and generates a ZigBee DisplayMessage command addressed to the IHD. Since the confirmation control field is set, the IHD sends a response back and the Comms Hub. The Comms Hub then creates an alert to the Head End System informing it that the message has been delivered. This alert may be sent in real-time or at the end of the day.

A point-to-point connection between a hand-held terminal ("HHT") and the Comms Hub is established and used for commissioning the Comms Hub. The authority given the HHT depends on a certificate it is issued by the manufacturer or operator. The connection may be established as described in U.S. patent application Ser. No. 13/296,552 filed on Nov. 15, 2011, entitled "METHOD FOR SECURELY COMMUNICATING ACROSS MULTIPLE NETWORKS USING A SINGLE RADIO," wherein the HHT is able to find the Comms Hub and to communicate with it, without having to join the HAN network. The '552 Application is incorporated herein by reference in its entirety.

Figure 64:
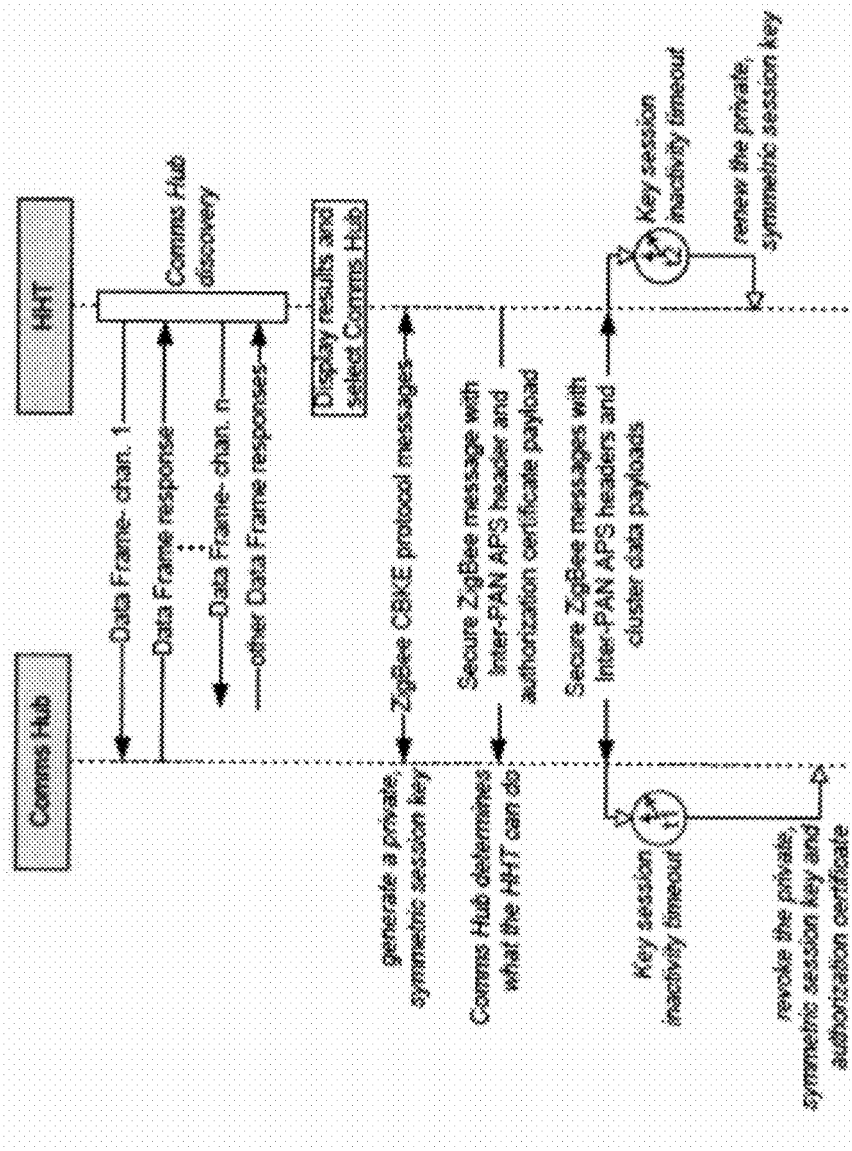
FIG. 64 shows an exemplary Inter-PAN commissioning flow from HHT to Comms Hub.

An exemplary HHT Inter-PAN flow is shown in FIG. 64. It represents the flow used for commissioning. The HHT first discovers the devices in its vicinity by sending Data Frame requests on the configured channels and listening for responses. The Data Frame includes response filtering information which may include a MAC address and allowed RSSI level. These messages may be unicast in which case only the targeted Comms Hub replies or they may be broadcast and the HAN devices will determine if they respond based on the payload information. This information can be used to limit the response to that of the target Comms Hub. The Comms Hub uses its configured MAC address list to decide if it should respond to the Data Frame request. Typically this will be a MAC address black list used to block known bad devices. On receipt of the Data Frame response, the HHT operator selects the target Comms Hub. This selection can be confirmed by the operator matching the source MAC address of a response to the MAC address on the Comms Hub label.

The HHT then contacts the Comms Hub to initiate the ZigBee CBKE protocol. This message exchange generates a private, symmetric key shared between the two devices. With the symmetric key in place, both devices can now send secure ZigBee messages. The Comms Hub receives messages from many sources in the HAN network. It knows to apply the Inter-PAN key to the messages received with the APS Frame Type field set to 0b11. The first message received by the Comms Hub is the HHT's certificate. This certificate identifies the activities the HHT is authorized to perform.

The HHT is now authorized to send commands to the Comms Hub and receive responses. The HHT operates an inactivity timer t2 that alerts it when to renew the symmetric key and a certificate. When the HHT decides that it is finished it does not renew the key. The Comms Hub's inactivity timer is set to t1. When the t1 timer expires the Comms Hub revokes the key and the certificate. The value of t2 is set to be less than the value of t1.

The invention claimed is:

1. A process for communicating utility-related data over at least one network comprising:

- collecting utility-related data at a hub device during a first predetermined period of time;
- securing the utility-related data at the hub device using digital envelopes during the first predetermined period of time;
- initiating by the hub device an autonomous wake up process during a second predetermined period of time; sending the secure utility-related data over a first network to a designated server via at least one User Datagram protocol (UDP) message during the second predetermined period of time; and
- receiving an acknowledgement of receipt message of the at least one UDP message from the designated server, wherein the hub device sends multiple UDP messages in a single bulk push to the designated server during the second predetermined period of time and wherein each of the multiple UDP messages includes a header having a code therein for facilitating sorting of each of the multiple UDP messages into predetermined storage buckets by the designated server during the second predetermined time period.

2. The process according to claim 1, wherein the hub device receives the utility-related data from at least one dwelling device.

3. The process to claim 2, wherein the hub device and the at least one dwelling device are a single device.

4. The process according to claim 2, wherein the hub device is not located within the dwelling.

5. The process according to claim 1, wherein the first and second determined periods of time do not overlap.

6. The process according to claim 1, wherein the first and second predetermined periods of time at least partially overlap.

7. The process according to claim 1, wherein the designated server processes each of the multiple UDP messages to retrieve utility-related data at a third predetermined time period, wherein the second and third predetermined time periods do not overlap.

8. The process according to claim 1, wherein the designated server processes each of the multiple UDP messages in the predetermined storage buckets to retrieve utility-related data at a third predetermined time period, wherein the second and third predetermined time periods do not overlap.

9. The process according to claim 1, wherein the designated server processes each of the multiple UDP messages in the predetermined storage buckets to retrieve utility-related data at a third predetermined time period, wherein the second and third predetermined time periods at least partially overlap.

10. The process according to claim 1, wherein the predetermined storage buckets include at least two of an electricity usage message bucket, a gas usage message bucket, an electricity generation message bucket, and an alarm message bucket.

11. The process according to claim 1, wherein the header is secured with integrity protection and a non-header portion of each of the multiple UDP messages is secured with both integrity protection and privacy encryption.

12. The process according to claim 1, wherein the first network is a wide area network (WAN).

13. The process according to claim 1, wherein the first network is a cellular network.

14. The process according to claim 1, wherein the acknowledgement of receipt message is a UDP message.

15. The process to claim 1, wherein the designated server processes the at least one UDP message to retrieve utility data at a third predetermined time period, wherein the second and third predetermined time periods do not overlap.

16. The process according to claim 1, wherein securing the utility data further comprises securing a first part of the at least one UDP message with integrity protection and securing a second part of the at least one UDP message with both integrity protection and privacy encryption.

17. The process according to claim 16, wherein the first part of the last one UDP message includes a reason code for facilitating sorting of the at least one UDP message by the designated server into one of multiple predetermined storage buckets and the second part of the at least one UDP message includes the utility-related data.

18. The process according to claim 1, wherein the acknowledgment of receipt message from the designated server includes clock synchronization information.

19. The process according to claim 1, wherein the designated server sends periodic clock synchronization messages to the hub device.

20. The process according to claim 1, wherein utility-related data includes one or more of utility meter reading data, utility meter alarm data and firmware upgrade status data.

21. A process for communicating utility-related data over at least one network comprising:

collecting utility-related data from a first network at a hub device during a first predetermined period of time;

securing the utility-related data at the hub device using digital envelopes during the first predetermined period of time;

initiating by the hub device an autonomous wake up process during a second predetermined period of time;

sending the secure utility-related data from the hub device over a second network to a designated server via at least one User Datagram protocol (UDP) message during the second predetermined period of time; and receiving an acknowledgement of receipt message of the at least one UDP message from the designated server, wherein the hub device sends multiple UDP messages in a single bulk push to the designated server during the second predetermined period of time and wherein each of the multiple UDP messages includes a header having a code therein for facilitating sorting of each of the multiple UDP messages into predetermined storage buckets by the designated server during the second predetermined time period.

22. The process according to claim 21, wherein the hub device receives the utility-related data from at least one reporting device on the first network.

23. The process according to claim 22, wherein the hub device and the at least one reporting device are a single device.

24. The process according to claim 22, wherein the hub device is not located on the first network.

25. The process according to claim 22, wherein the at least one reporting device is selected from the group consisting of electricity meter, gas meter and in-home device (IHD).

26. The process according to claim 21, wherein the first and second predetermined periods of time do not overlap.

27. The process according to claim 21, wherein the first and second predetermined periods of time at least partially overlap.

28. The process 21, wherein the second network is a cellular network.

29. The process according to claim 21, wherein the designated server processes each of the multiple UDP messages to retrieve utility-related data at a third predetermined time period, wherein the second and third predetermined time periods do not overlap.

30. The process according to claim 21, wherein the designated server processes each of the multiple UDP messages in the predetermined storage buckets to retrieve utility-related data at a third predetermined time period, wherein the second and third predetermined time periods do not overlap.

31. The process according to claim 21, wherein the header is secured with integrity protection and a non-header portion of each of the multiple UDP messages is secured with both integrity protection and privacy encryption.

32. The process according to claim 21, wherein the acknowledgment of receipt message from the designated server includes clock synchronization information.

33. The process according to claim 21, wherein the designated server sends periodic clock synchronization messages to the hub device.

34. The process according to claim 21, wherein utility-related data includes one or more of utility meter reading data, utility meter alarm data and firmware upgrade data.

35. A system for communicating utility data over a wide area network (WAN) comprising:

means for collecting utility data;

means for securing the utility data using digital envelopes;

means for sending the secure utility data over a WAN via at least one UDP message;

means for receiving the secure utility data;

means for receiving an acknowledgement of receipt of the at least one UDP message from the means for receiving the secure utility data; means for receiving clock synchronization information; and means for retransmitting secure utility data that is not acknowledged, wherein the means for sending the secure utility data over a WAN via at least one UDP message, sends multiple UDP messages in a single bulk push to the designated server during the second predetermined period of time and wherein each of the multiple UDP messages includes a header having a code therein for facilitating sorting of each of the multiple UDP messages into predetermined storage buckets by the designated server during the second predetermined time period.

* * * * *